(12) United States Patent
Kaul

(10) Patent No.: US 12,706,501 B2
(45) Date of Patent: Aug. 11, 2026

(54) SELF PROPELLING SYSTEM AND REACTION WHEEL DEVICE

(71) Applicant: Pathfinder Propulsion LLC, Denver, CO (US)

(72) Inventor: Anoup Kaul, Edmonton (CA)

( * ) Notice: Subject to any disclaimer, the term of this patent is extended or adjusted under 35 U.S.C. 154(b) by 320 days.

(21) Appl. No.: 18/041,001

(22) PCT Filed: Aug. 16, 2021

(86) PCT No.: PCT/US2021/071193
§ 371 (c)(1),
(2) Date: Feb. 8, 2023

(87) PCT Pub. No.: WO2022/061321
PCT Pub. Date: Mar. 24, 2022

(65) Prior Publication Data

US 2023/0268787 A1 Aug. 24, 2023

(51) Int. Cl.
*H02K 3/04* (2006.01)
*B64G 1/40* (2006.01)
(Continued)

(52) U.S. Cl.
CPC ................. *H02K 3/04* (2013.01); *F03G 7/00* (2013.01); *H02K 1/12* (2013.01); *H02K 1/22* (2013.01);
(Continued)

(58) Field of Classification Search
CPC .. H02K 3/04; H02K 1/12; H02K 1/22; H02K 7/003; H02K 7/116; F03G 7/00;
(Continued)

(56) References Cited

U.S. PATENT DOCUMENTS 3,895,245 A 7/1975 Bode
5,172,784 A 12/1992 Varela, Jr.
(Continued)

FOREIGN PATENT DOCUMENTS

WO 2013045676 A2 4/2013
WO WO2019145942 8/2019

OTHER PUBLICATIONS

International Search Report and Written Opinion of the International Search Authority for International Application No. PCT/US2020/028943, mailed Jul. 27, 2020.
International Search Report for International Application No. PCT/US2021/071193 (Mar. 9, 2022).

*Primary Examiner* — Tulsidas C Patel
*Assistant Examiner* — Joshua M Rodriguez
(74) *Attorney, Agent, or Firm* — Robinson IP Law, PLLC

(57) ABSTRACT

A propulsion assembly includes: a housing; a first central shaft mounted to the housing; a first ring rotor; a first central hub rotatably mounted on the central shaft; a plurality of tethers positioned between the central hub and the first ring rotor such that the first ring rotor is mounted to the central hub with the plurality of tethers; a drive mechanism mounted on the housing, the drive mechanism positioned to impart a force on a portion of the first ring rotor. A thrust is imparted on the housing by the first ring rotor through one or more of the plurality of tethers, and a direction of thrust corresponds to a location on the first ring rotor on which the drive mechanism imparts a force.

10 Claims, 60 Drawing Sheets

(51) Int. Cl.

| | |
|---|---|
| ***F03G 7/00*** | (2006.01) |
| ***H02K 1/12*** | (2006.01) |
| ***H02K 1/22*** | (2006.01) |
| ***H02K 7/00*** | (2006.01) |
| ***H02K 7/116*** | (2006.01) |

(52) U.S. Cl.
CPC ............ *H02K 7/003* (2013.01); *H02K 7/116* (2013.01); *B64G 1/409* (2013.01)

(58) Field of Classification Search
CPC .. B64G 1/409; H04R 1/023; H04R 2201/401; H04R 2430/01; H04R 1/403; H04R 3/14; H04R 1/24
See application file for complete search history.

(56) References Cited

U.S. PATENT DOCUMENTS

| | | | | |
|---|---|---|---|---|
| 5,233,251 | A | 8/1993 | Nehmer | |
| 6,231,011 | B1 | 5/2001 | Chu et al. | |
| 7,791,441 | B1 | 9/2010 | Jefferson | |
| 2008/0024017 | A1 | 1/2008 | Chen | |
| 2011/0241460 | A1* | 10/2011 | Mebarki | H02K 1/20 29/598 |
| 2012/0120516 | A1 | 5/2012 | Harrell et al. | |
| 2013/0147298 | A1 | 6/2013 | Giummo | |
| 2014/0203678 | A1 | 7/2014 | Haggard | |
| 2019/0089235 | A1 | 3/2019 | Kaul | |
| 2020/0089235 | A1 | 3/2020 | Tang | |
| 2020/0251941 | A1 | 8/2020 | Kaul | |

* cited by examiner

2403

2402

2401

2504
y_A
x_A
+
2503
y_A
x_A
2506
y_A
x_A
2505
y_A
x_A
=
2507
2502
y_A
x_A
2501

4702

4701

Section A-A
5502
5501
5504
5503

5602
5601
Section A-A

SELF PROPELLING SYSTEM AND REACTION WHEEL DEVICE

CROSS-REFERENCE TO RELATED APPLICATION(S)

This application claims priority to U.S. Provisional Patent Application Ser. No. 63/065,536 for a "Combined Propellant-less Propulsion and Reaction Wheel Device" filed on Aug. 14, 2020, the contents of which are incorporated herein by reference in its entirety.

FIELD OF THE DISCLOSURE

This disclosure relates generally to vehicle attitude control and propulsion and more specifically relates to vehicles traveling in the vacuum of space or on bodies of water. Additionally, embodiments of this disclosure describe improvements over current spacecraft attitude control and propulsion technology such as: launch mass, scalability, reaction wheel de-spinning and overall system design simplification.

BACKGROUND

Spacecraft Propulsion

Spacecraft have been used to conduct research on the earth and other celestial bodies, provide communication services that cover the globe, and even carry man to the moon. While there have been many advances in systems required to accomplish a given space mission, the in-space propulsion system has remained largely unchanged since the first launches of spacecraft.

A critical short coming of the current propulsion technology is the need to use a propellant to generate thrust. This reliance on propellant has led to added complexity and cost to spacecraft design specifically the need to include fuel tanks and fuel line routing, filtering, valves and flow gauges. These system elements add substantially to the spacecraft mass. Because spacecraft launch mass is a critical component in determining launch costs, current in-space propulsion solutions are not only technically complex but, also economically inefficient. In addition, the operational life of most spacecraft is dictated primarily by fuel consumption because once the fuel tank is empty there is no way to refill it in orbit.

Recently, satellite bus structures have decreased in size and operators have leveraged the maturation of reliable, mass produced electronics, sensors and radio components used in smart phone technology. Unfortunately, while small in size these vehicles can still provide a powerful platform for communications, earth observation and interplanetary missions traditional propellant based propulsion systems do not scale down in size well which has left small/micro/nano spacecraft without thruster capabilities. Without means of propulsion, smaller buses operating lifetimes are limited. When in low earth orbit, they may experience drag due to the earth's upper atmosphere. This drag continually slows the vehicles down reducing its speed and orbital altitude until the vehicles become inoperable and burn up in the atmosphere. Embodiments disclosed herein aim to address both excessive launch mass and scalability problems associated with current propellant based propulsion systems by providing thrust without propellant that is capable of providing drag makeup thrust and maintain the spacecraft's desired orbital altitude while also being scalable in design to work with satellites of all sizes.

In addition, individual propellant based thruster units are limited to generating thrust in only one direction. Accordingly, there exists a need for a spacecraft thruster can address bidirectionality as well. An optimum solution would allow straightforward mechanical and electrical integration into the current satellite designs.

Spacecraft Attitude Control

In some spacecraft attitude control is achieved through the use of reaction wheels. Typically a reaction wheel includes an electric motor attached to a flywheel. Reaction forces created while spinning up the flywheel are utilized to achieve changes in angular orientation of the vehicle and controlled to reach a desired pointing direction. Once the flywheel is spun up there is no straightforward way to de-spin it. Some spacecraft can utilize their propulsion system to provide counter torques in conjunction with motor commands. Embodiments described herein not only provide attitude control through reaction wheel mechanisms but can also de-energize and de-spin its own flywheel internally through elastic strain losses in its bearings. The combination of all these features will provide both propulsion and attitude control in a single unit, thereby significantly simplifying spacecraft system architecture.

SUMMARY

Briefly and in general terms, the present disclosure is directed towards spacecraft by providing a new form of propellant-less propulsion. A general description of this disclosure involves in one aspect an arrangement of a multiplicity of permanent magnets mounted on at least one pair of synchronized coplanar counter rotating structures/rotors (in one aspect one rotates clockwise CW while the other rotates counterclockwise CCW) such that net positive linear momentum is generated through ball bearing traction. This traction is transferred to the assembly through rigid body attachment of the inner race of the ball bears to the shafts and then onto the support platform and platform attachment points to the vehicle at large creating a translational force on the system. Therein, thrust or linear momentum is achieved by the vehicle.

In one aspect of this disclosure the rotation may be created and maintained by an electric powered motor. This motor may be integral to the rotating structures or a separate entity to itself.

In one aspect of this disclosure there may be a multiplicity of synchronized rotor pairs sharing the same shaft pairs.

In one aspect of this disclosure system torques can be created through interaction between the electro-magnetic coils and magnets mounted on one or other rotor. A variety of control architectures can be implemented to achieve rotation of a desired angle or angular rate. A basic control loop may entail operating a single electro-magnetic coil on a single rotor for a small duration of time. Reactionary forces will create a torque on the coil and the body it is attached to. A second electro-magnetic coil on the neighboring rotor may be operated for an equivalent duration such that an equivalent reactionary torque is created in the opposite direction thereby arresting the system rotational motion. A relationship between the spacecraft mass and distance from the center of mass of the individual coils must be accounted for to achieve the desired angular displacement.

DETAILED DESCRIPTION

A self-propelling propulsion system powered with electricity and generating thrust through either unbalanced centripetal force acting through tethered joints possibly in conjunction with 'pendulum-like' forces acting through rigid pinned joints possible or in conjunction with forces acting at right angles through a shared pinned joint possible or in conjunction with friction as traction forces embodied in either a paired single tethered ring rotor configuration or a paired tethered ring rotor with rigid disk rotor configuration or paired rigid disk rotors configuration each with a multiplicity of electro-magnets or permanent magnets mounted along each rotor's perimeter which interact with the other rotor's magnets through attracting or repelling forces. In some embodiments the rotors can be spun through use of a set of integral electromagnetic coils or through separate electric motors connected with a gear box. Embodiments of this device can be used to changed vehicle orientation through reactionary torques produced on the integral coil or separate electric motor stator elements. In the following description, numerous example and specific details are set forth. However, it is understood that embodiments may be practiced without these specific details. In other instances, well-known materials, structures, and techniques have not been shown in detail in order not to obscure the understanding of this description.

The terms, "for example," "e.g.," "in one/another aspect," "in one/another scenario," "in one/another version," "in some configurations," "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components.

Turning now to the drawings, which are included by way of example, and which are not intended to be limiting, embodiments of the present disclosure are directed towards single pair of interacting synchronized rotors having an equivalent number of permanent magnets mounted on each respectively.

Furthermore, in some embodiments of the self-propelling apparatus the magnets mounted on the rotor will utilize different magnetic orientation, size, shape and number. Other embodiments may make use of magnetic sensors instead of optical sensors for electrical commutation of coil current.

Single Tethered Ring Rotor Configuration

Figure 1:
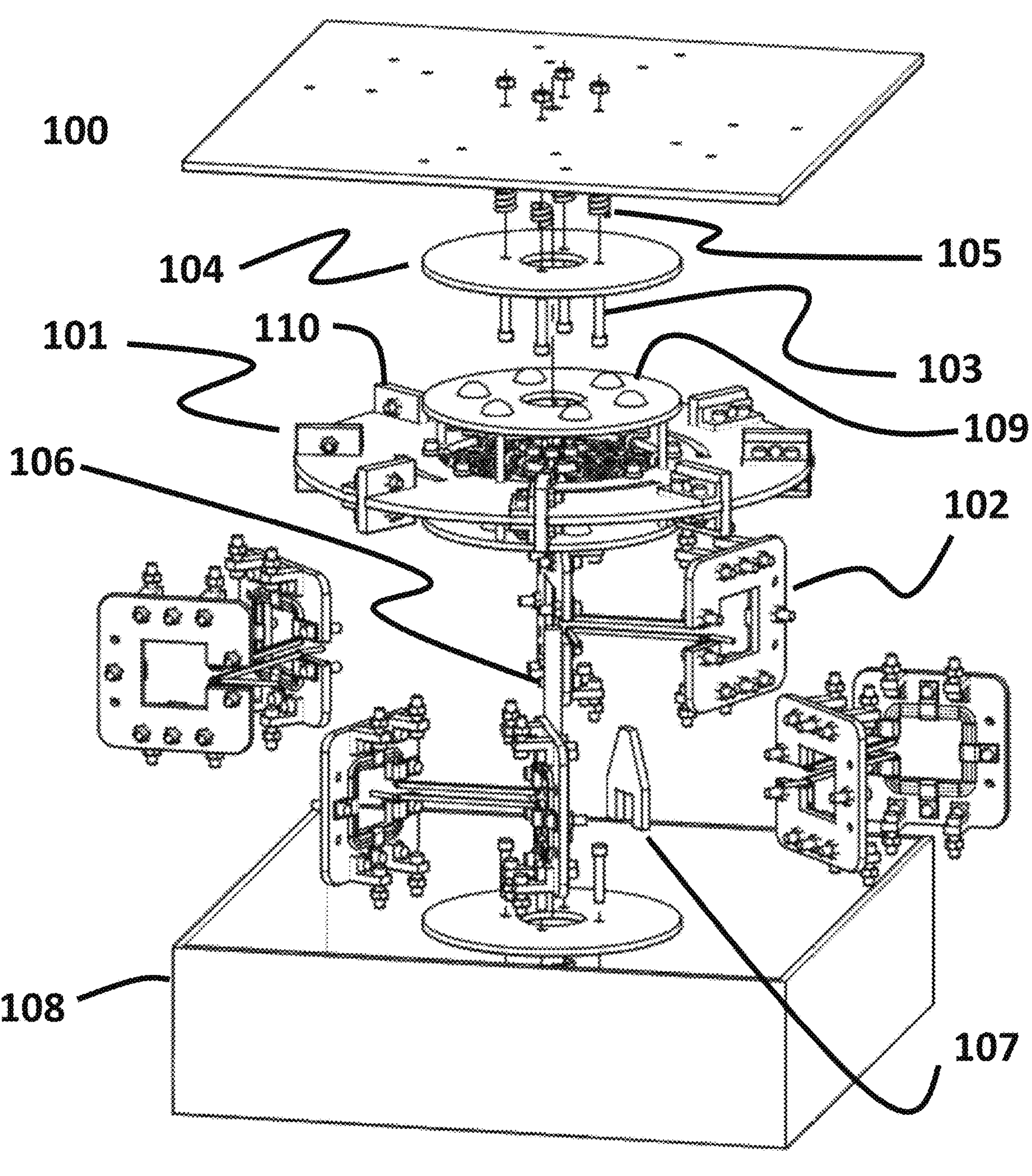
FIG. 1 is an isometric exploded view of a self-propelling apparatus with integral electro-magnetic coils and permanent magnets mounted at the mid-plane of a tethered ring rotor with integrated thrust bearings according to one embodiment of the present disclosure.

FIG. 1 shows an exploded view of a propulsion device assembly 100. Also shown in FIG. 1 is a single ring rotor 101 with integrated tethers and top and bottom thrust bearing elements 109 along with a center hub attachment to a central shaft 106. Mounted on the ring are transversely mounted permanent magnets 110. Surrounding the tethered ring are independent electromagnetic C-coils 102. Two thrust bearing roller plates 104 are shown mounted to the top and bottom of the device enclosure 108 with bolts 103 and springs elements 105. For commutation of the coil current, an optical sensor 107 is also shown.

Figure 2:
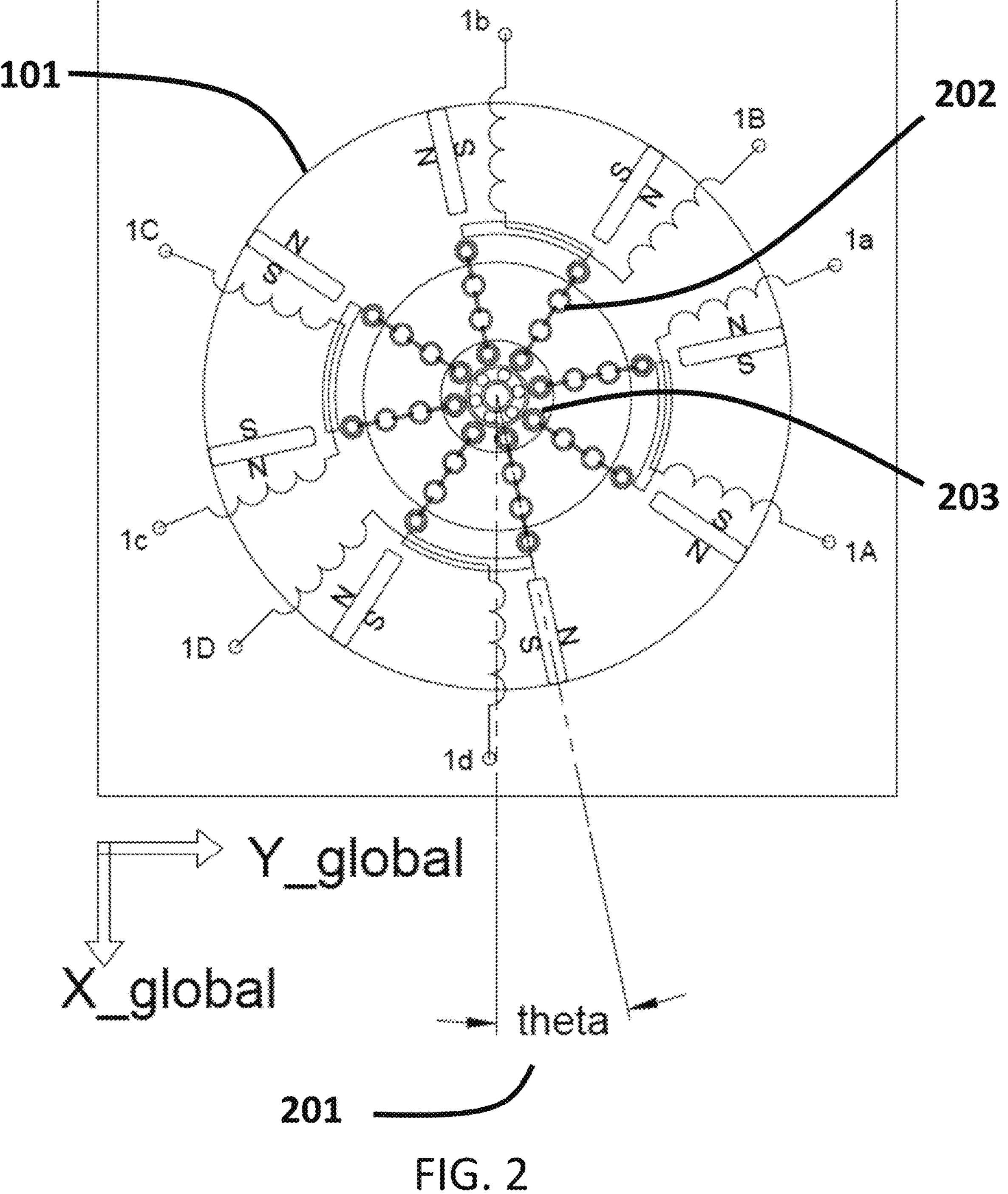
FIG. 2 is schematic top view of a tethered ring rotor according to one embodiment of the present disclosure.

A schematic view of the single ring rotor 101 is seen in FIG. 2. The individual tether elements are shown as 202 and the central hub attachment with ball bearings are denoted as 203. Tethers can be chains, or carbon fibers or other pliant material that can only carry loads in tension. Tethers can be attached to the ring rotor and central hub through a pinned joint like bolted screw with a bushing. In order to understand the operation of the device, an angle theta 201 is defined in the x-y plane with its origin taken from the center of the central shaft 106.

Figure 3:
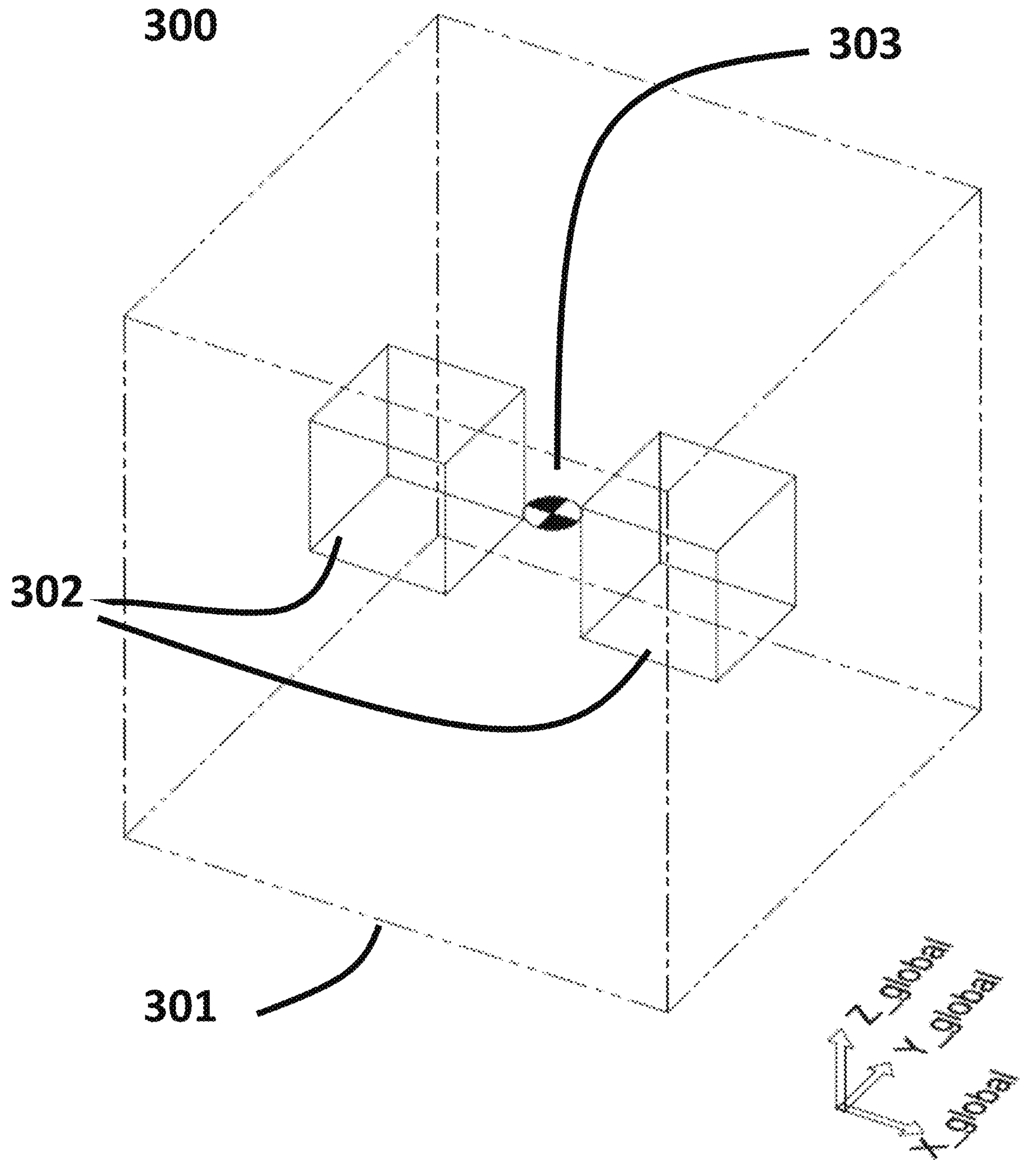
FIG. 3 is an isometric view of a spacecraft with two self propelling devices positioned equidistant from its center of mass according to one embodiment of the present disclosure.

FIG. 3 shows an exemplary embodiment of a spacecraft system level assembly 300. Element 301 is the outer boundary of the spacecraft for reference. Element 303 is a center of mass of the spacecraft. Two propulsion devices 302 are shown positioned equidistant from the spacecraft center of mass 303. The pairing of two devices arranged on either side of the spacecraft center of mass will allow for system torque adjustments during operation by throttling thrust of the propulsion devices 302.

Figure 4:
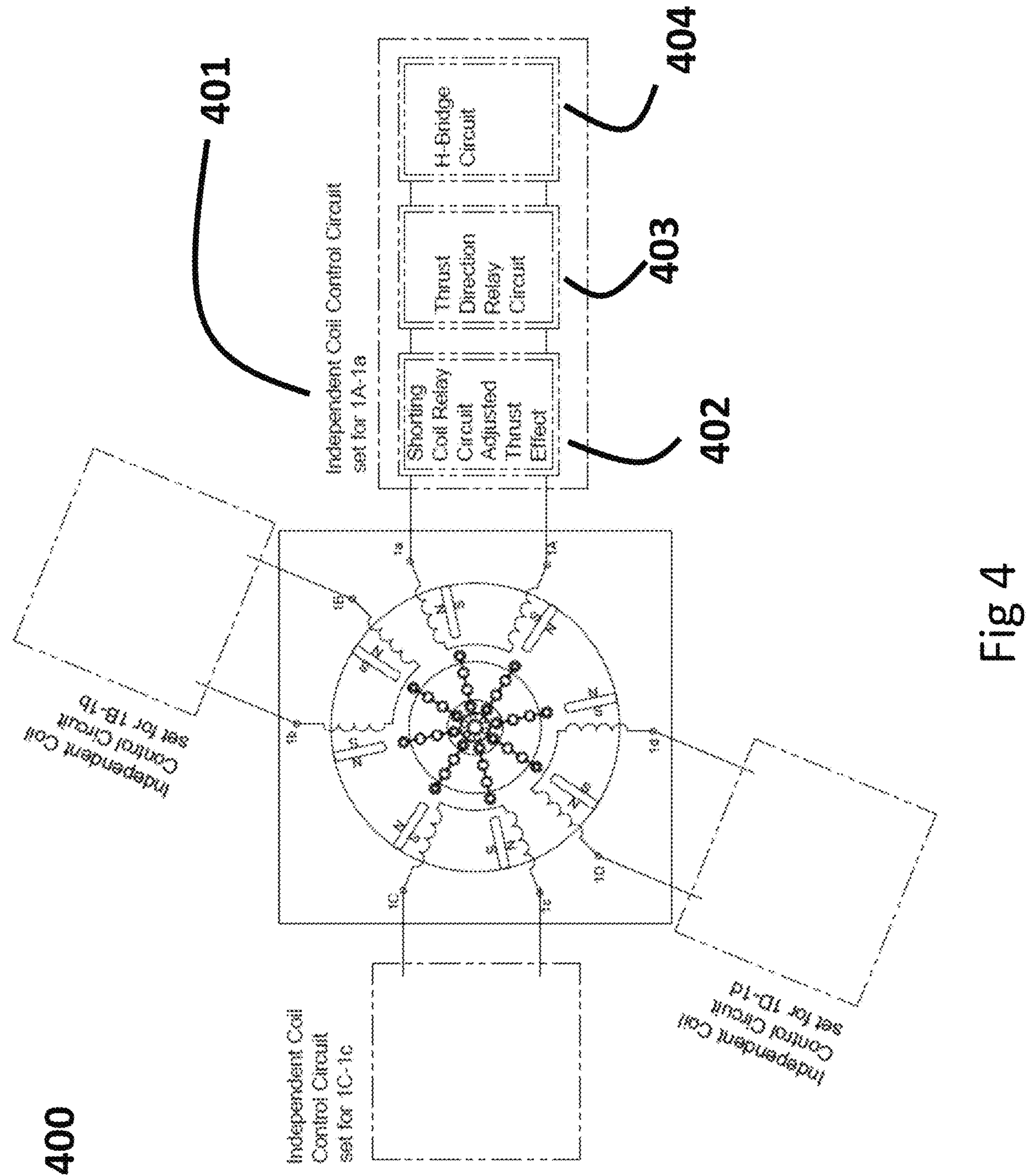
FIG. 4 is a block diagram of independent integral electromagnetic coil circuit elements according to one embodiment of the present disclosure.

FIG. 4 shows a block diagram 400 of an embodiment including four independent control circuits elements for each ring rotor C-coil. In this embodiment, each circuit control set 401 includes three elements; a shorting coil relay for adjusted thrust effect block element 402, a thrust direction relay circuit control block 403 and an H-bridge circuit control block 404.

Single Tethered Ring Rotor Operation

Figure 5:
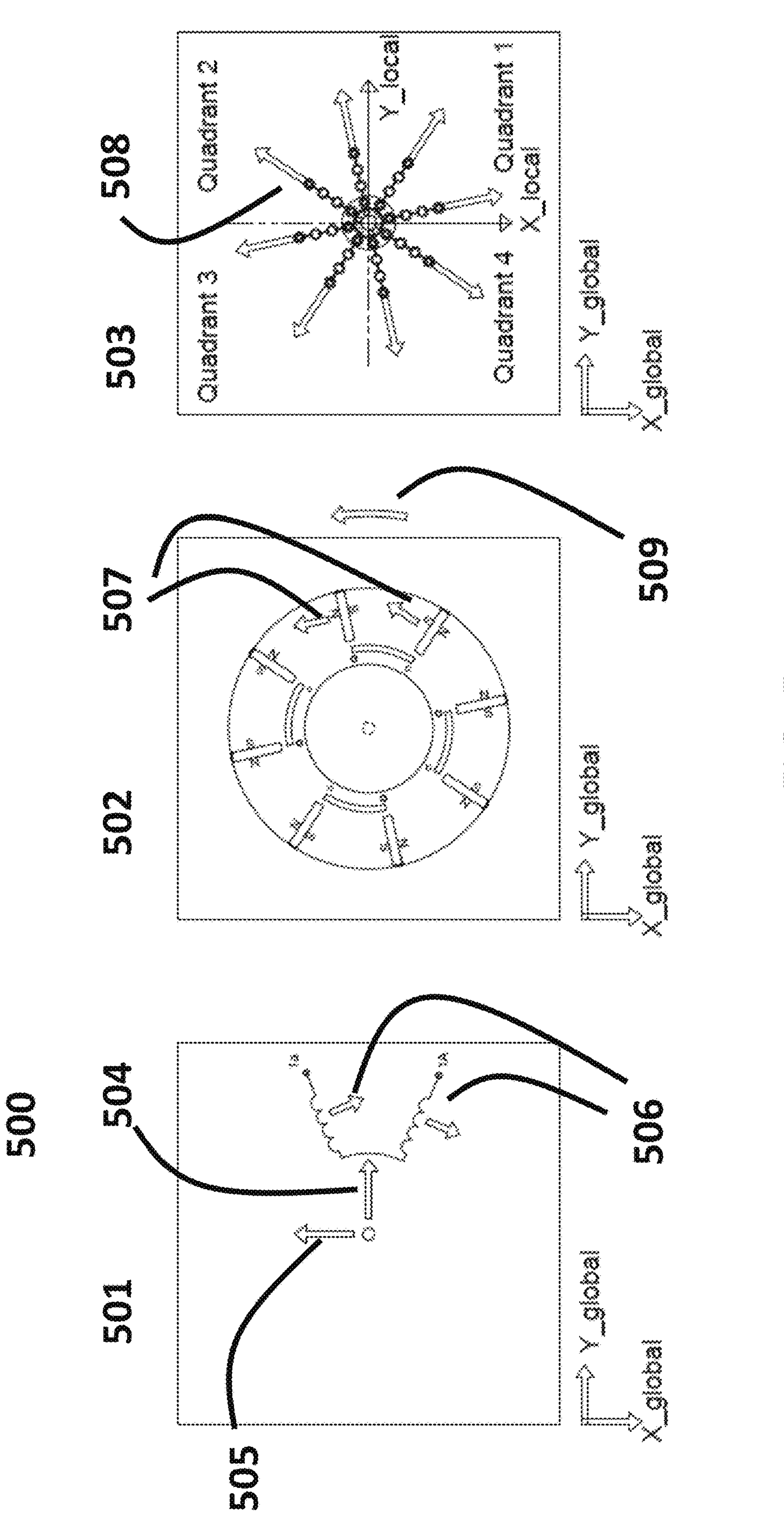
FIG. 5 is a free body diagram of a single tethered ring rotor apparatus in three elements according to one embodiment of the present disclosure.

FIG. 5 shows an embodiment of the system described herein broken into three elements 500 to illustrate operation of embodiments described herein. Element 501 shows enclosure bottom plates along with an active set of coils 1A-la along with a direction of the reactive force 506 acting on the coils from the rotor magnets pushing or pulling the coils. Also seen in element 501 are net component 504 and 505 forces acting on the central shaft in the y direction 504 and in the −x direction 505. Element 502 illustrates the ring rotor and the direction of forces acting on two magnets 507 due to the coil current flowing through a single active coil 1A-1a. Also shown in element 502 is the rotor spinning direction 509 which is counterclockwise with respect to a global coordinate system as shown in the drawings. The central shaft hub attachment and direction of the centripetal forces acting on each tether 508 are shown in element 503.

Figure 6:
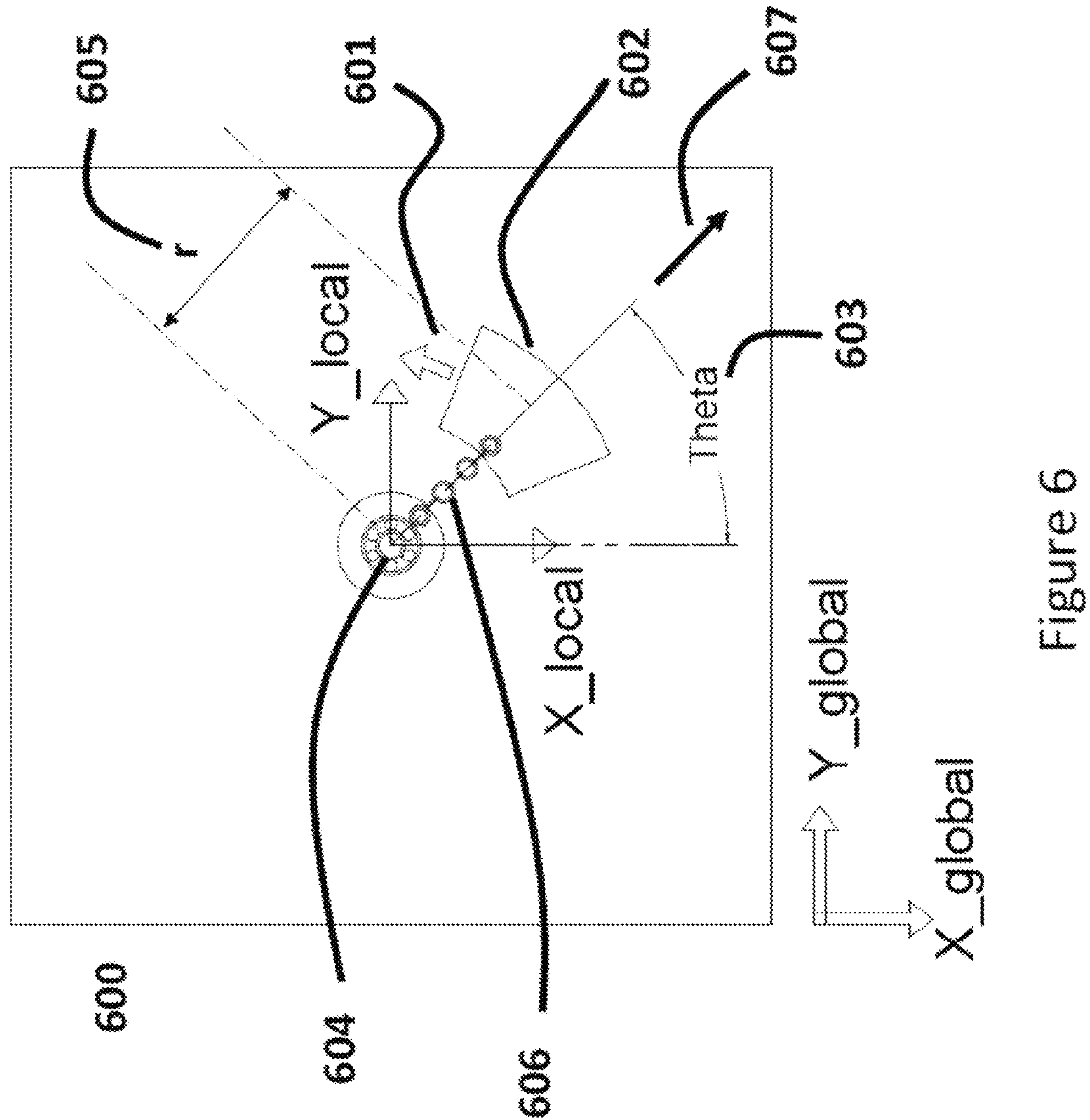
FIG. 6 is a free body diagram of a tethered mass experiencing centripetal force while spinning according to one embodiment of the present disclosure.

To understand how embodiments of the single ring rotor assembly generate thrust, reference is made to FIG. 6 showing a tethered mass system 600 with mass 602 attached to a central shaft 604 by a single chain tether 606. When the mass is rotating about the central shaft at a distance r 605 with instantaneous linear velocity v 601 and mass m there will be a centripetal force acting with magnitude defined as follows:

$$F\_centripetal=m*v^2/r$$

This centripetal force will act on the shaft in an outward radial direction 607 defined by the tether angle theta 603. The instantaneous linear velocity and angular speed ω are related by v=ω*r so the magnitude of the centripetal force can be rewritten as:

$$F\_centripetal=m*\omega^2*r$$

As the mass 602 rotates it will transfer an impulse to the central shaft 604 and base frame. For a period of time denoted by Δt, the impulse can be written as:

$$Impulse = F\_net * \Delta t$$

For a mass rotating at constant angular speed omega or ω the mass's angular position theta or θ can be described by $$\theta = \omega * t$$

To analytically evaluate the impulse created the period of time Δt can be infinitesimal dt. Which allows for integration between time steps t1 and t2.

$$Impulse = \int m*\omega^2*r*dt; \text{ integrated between time steps t1 and t2}$$

This expression can be broken down into component forces acting in the X and Y direction respectively.

$$Impulse = Fx + Fy$$

Where $Fx=m*\omega^2*r*\cos(\theta)$ and $Fy=m*\omega^2*r*\sin(\theta)$

So the component impulses are $$Impulse\_x = \int m*\omega^2*r*\cos(\theta)dt = \int m*\omega^2*r*\cos(\omega*t)dt$$

$$Impulse\_y = \int m*\omega^2*r*\sin(\theta)dt = \int m*\omega^2*\sin(\omega*t)dt$$

Integrating this for quadrant one 0≤θ≤90 deg provides $$Impulse\_x = m*w*r$$

$$Impulse\_y = m*w*r$$

| Interval | Impulse X | Impulse Y |
|---|---|---|
| Quadrant 1 | +m*w*r | +m*w*r |
| Quadrant 2 | −m*w*r | +m*w*r |
| Quadrant 3 | −m*w*r | −m*w*r |
| Quadrant 4 | +m*w*r | −m*w*r |

Returning to the tethered ring rotor assembly, as the rotor spins the tethers attached to the central shaft will create an outward pulling centripetal force. The previous centripetal force formula needs to be adjusted because there is more than one tether acting during each revolution. This effect may be accounted for by using a variable epsilon_i, εi for each ring tether and write the centripetal force carried by the $i^{th}$ tether is:

$$f\_tether\_i = \varepsilon i * m * \omega^2 * r; \text{ Where } 0 < \varepsilon i < 1$$

And the total net force acting on the central shaft is a summation of all the tethers acting at once.

$$F\_net = \Sigma f\_tether\_i; \text{ for i=1 to N; where N is the total number of tethers.}$$

In order to relate this theoretical formula to this embodiment, an efficiency term is defined per quadrant; η_quad1, η_quad_2, η_quad_3 and η_quad4

Net Impulse_x per revolution=m*w*r*(η_quad1−η_quad_2−η_quad_3+η_quad4)

Net Impulse_y per revolution=m*w*r*(η_quad1+η_quad_2−η_quad_3−η_quad4)

As noted above each $i^{th}$ tether element will carry some portion of the mass as it rotates characterized above as εi. Each tether's tension will vary as it completes a single turn. For this embodiment, the net of all the tether effects will average out per quadrant.

Figure 7:
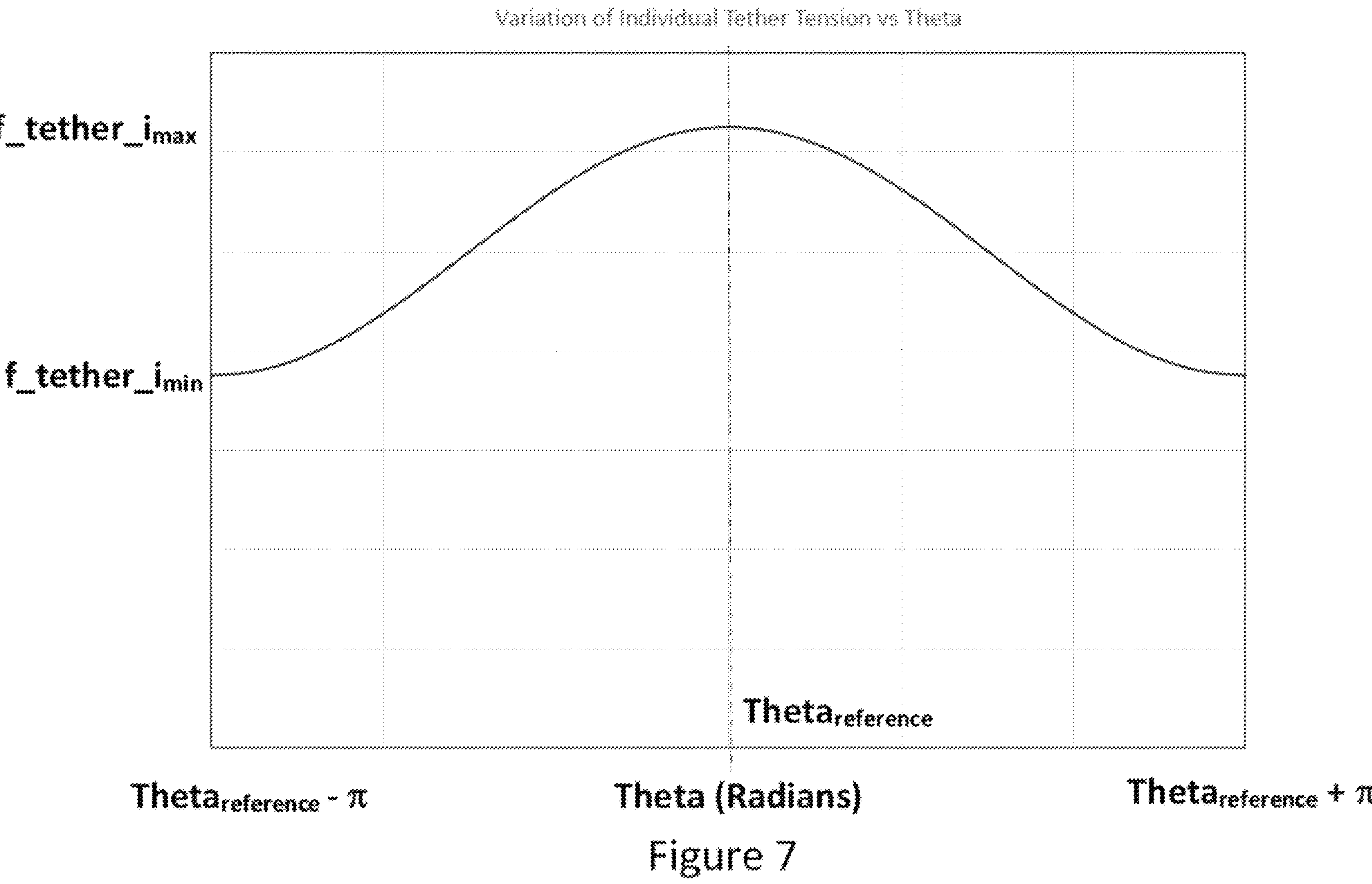
FIG. 7 is a plot of magnitude of centripetal force as a function of angle theta for single ring rotor tether according to one embodiment of the present disclosure.

During typical operation current will flow through only a single electromagnetic coil. The ring rotor will experience a tangential force at a single fixed point as it rotates. The centripetal force experienced by the shaft will not be symmetric. To illustrate, consider operation when only coil 1A-la has current flowing through it. The tension in each tether element will increase in quadrant 1, 2 and 3 compared to its magnitude in quadrant 4. FIG. 7 shows a plot of the magnitude an individual tethers centripetal force as it completes a single revolution. The difference in load transferred to the shaft will create movement/thrust in the +Y direction in this example.

$$\eta\_quad1 + \eta\_quad\_2 > \eta\_quad\_3 + \eta\_quad4$$

For this unbalanced centripetal acceleration device to provide controllable thrust for a spacecraft or vehicle it needs to be paired with at least one other similar device as shown in FIG. 3. These devices may preferably be mounted equidistant from the vehicles center of mass in the plane of desired thrust. Rotors should be counter rotated to cancel out unwanted reactionary torques.

Figure 8:
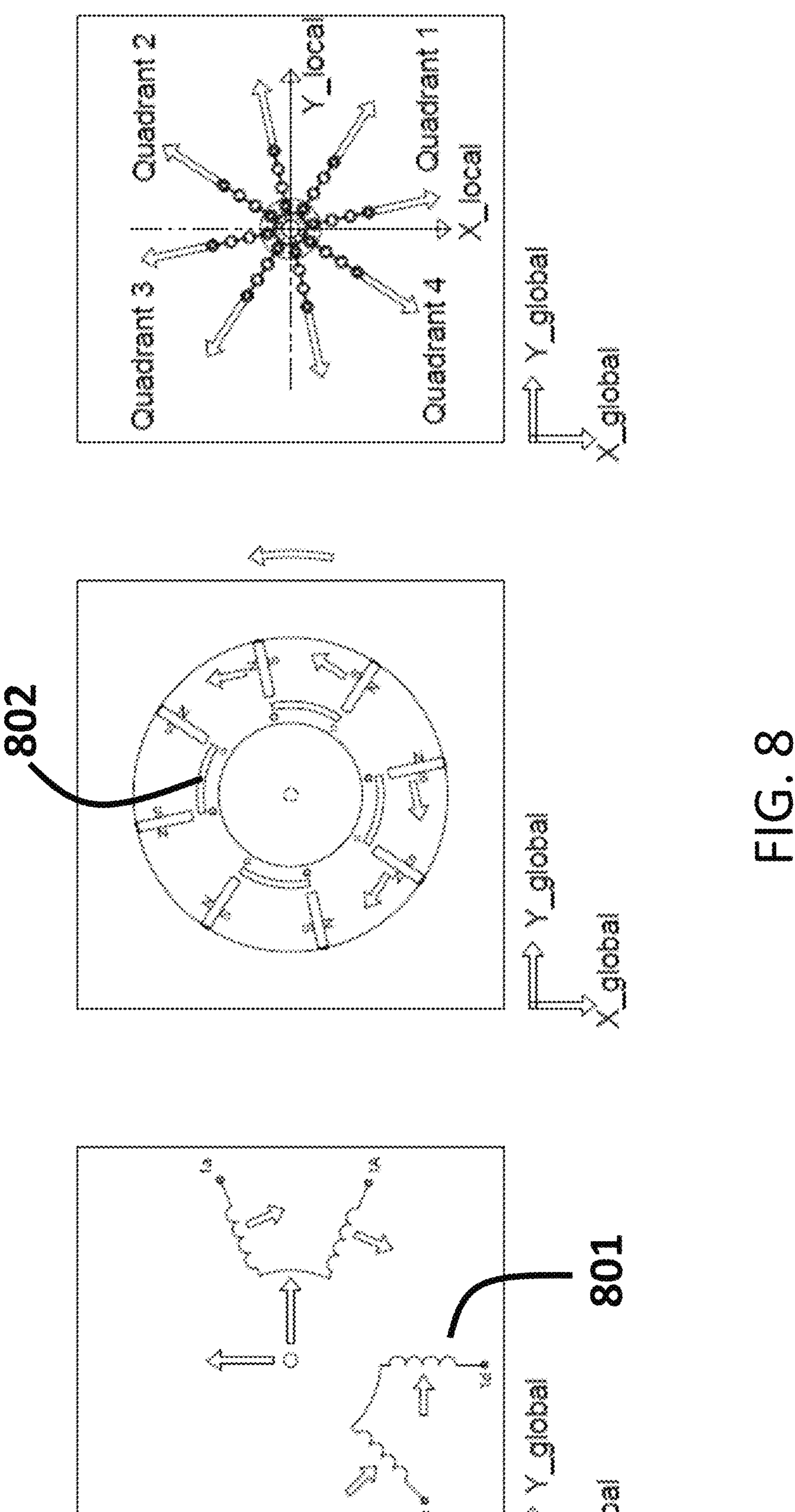
FIG. 8 is a free body diagram of a single tethered ring rotor apparatus with enhanced regenerative coil mode in three elements according to one embodiment of the present disclosure.

The additional electromagnetic coils can be used to create thrust in alternate direction in that plane. Alternatively, a coil could be shorted to provide an alternate path for unbalanced momentum transfer. As an illustration, FIG. 8 shows three elements of the system with electromagnetic coil 1D-1*d* 801 shorted. As the rotor magnets travel through this shorted coil they will push and then pull on the coil. The rigid ring will then experience a centripetal force in the negative radial direction. For this configuration that would increase tether tension in quadrant 2.

Uni-Polar Motor Circuit Configuration and Operation

Figure 9:
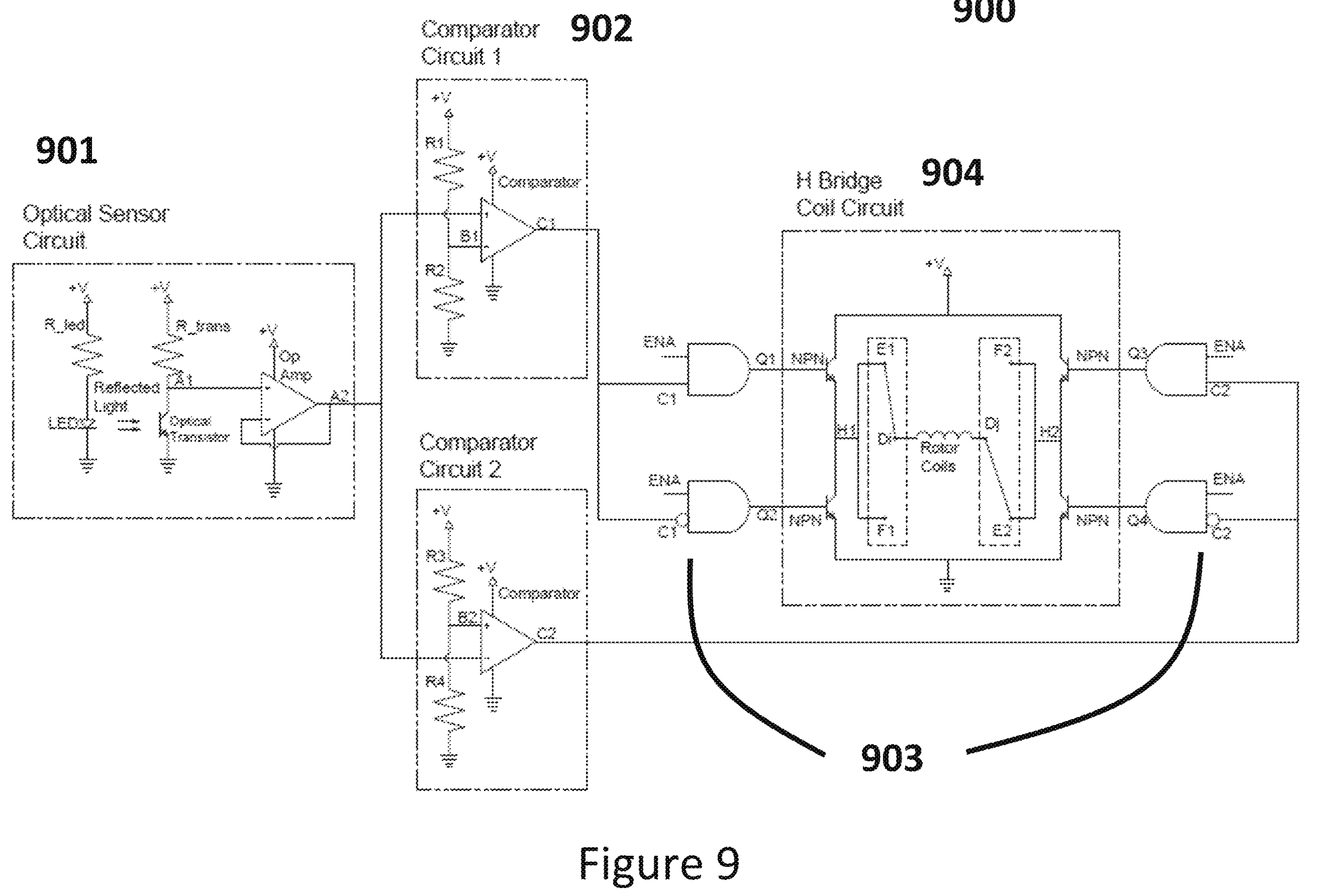
FIG. 9 is a circuit diagram for electrical commutation utilizing optical sensor input according to one embodiment of the present disclosure.

FIG. 9 shows a typical uni-polar control circuit configuration 900 for a single electromagnetic coil mounted around the perimeter of a ring rotor. This electronic commutator circuit embodiment has four sections: an optical sensor circuit 901, a pair of comparator circuits 902, a set of AND gates 903 and an H bridge transistor circuit 904. The optical sensor circuit 901 includes a resistor (R_led) that adjusts the current delivered to the light source (e.g., LED) along with a resistor (R_trans) that limits current through the optical transistor. The light emitted from the light source will either reflect off the rotor or travel through the optical slots 802 (see FIG. 8) cut into each rotor. When the light is reflected the optical transistor will turn ON and pull the voltage at point A1 low. When the light is not reflected the voltage at point A1 will remain high. The low voltage signal A1 is buffered through an operational amplifier and sent from point A2 into the positive input terminal of comparator circuit 1 op amp and the negative input terminal of comparator circuit 2 op amp.

Each comparator circuit includes two resistors (e.g., R1 and R2) and an Op Amp. In comparator circuit 1 resistors R1 and R2 are configured in a voltage divider arrangement such that the voltage at point B1 is lower than point A2 when light is not reflected and greater than A2 when light is reflected. In comparator circuit 2 resistors R3 and R4 are configured in a voltage divider arrangement such that the voltage at point B2 is higher than point A2 when light is not reflected and lower than A2 when light is reflected. The outputs from the comparator circuits C1 and C2 are feed into a set of AND gates and then into an H-bridge circuit. Each AND gate also provides for an ENA command that can be controlled with a pulse width signal that will allow control for the rotor speed. When the voltage at C1 is high and C2 is low Q1 and Q4 will allow current to flow through the NPN transistor in the upper left corner and lower right corner of the H-bridge circuit ie current will flow from point E1 to E2. When voltage at C1 is low and C2 is high Q2 and Q3 will allow current to flow through the NPN transistor in the lower left corner and upper right corner of the H-bridge circuit ie current will flow from point E2 to E1. The optical slots and sensors are arranged to coincide with the rotor magnets reaching the middle of each C-coil element of a single-phase set of coils.

Figure 10:
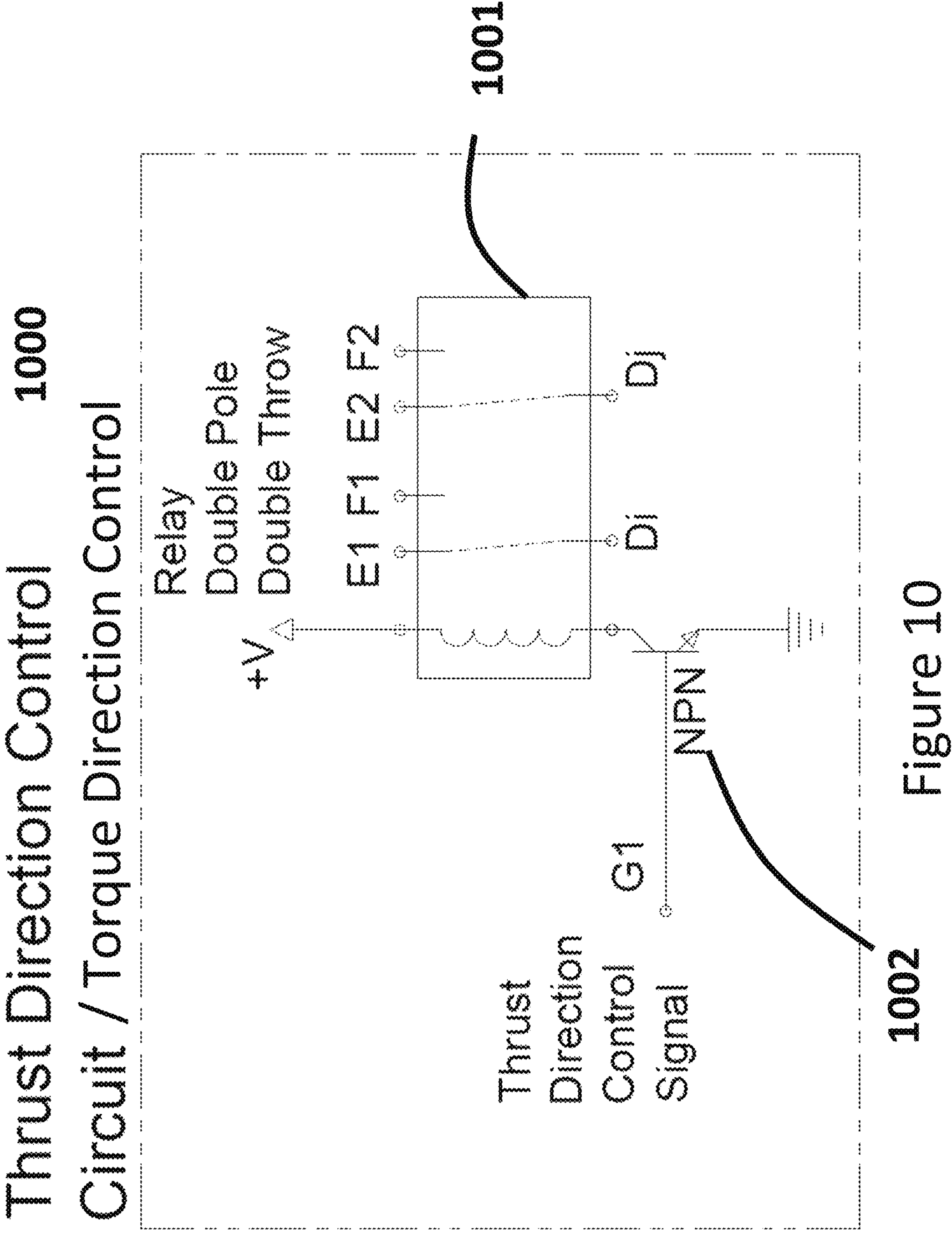
FIG. 10 is a circuit diagram of a relay configuration to control rotor spinning direction according to one embodiment of the present disclosure.

Referring to FIG. 10, the rotor ring spinning direction control is provided by sending a HI signal at G1 to the NPN transistor 1002 that will allow current to flow through the coil of a double pole double throw relay 1001 as shown in circuit schematic 1000.

Adjusted Thrust Mode/Enhanced Reaction Wheel Circuit

Figure 11:
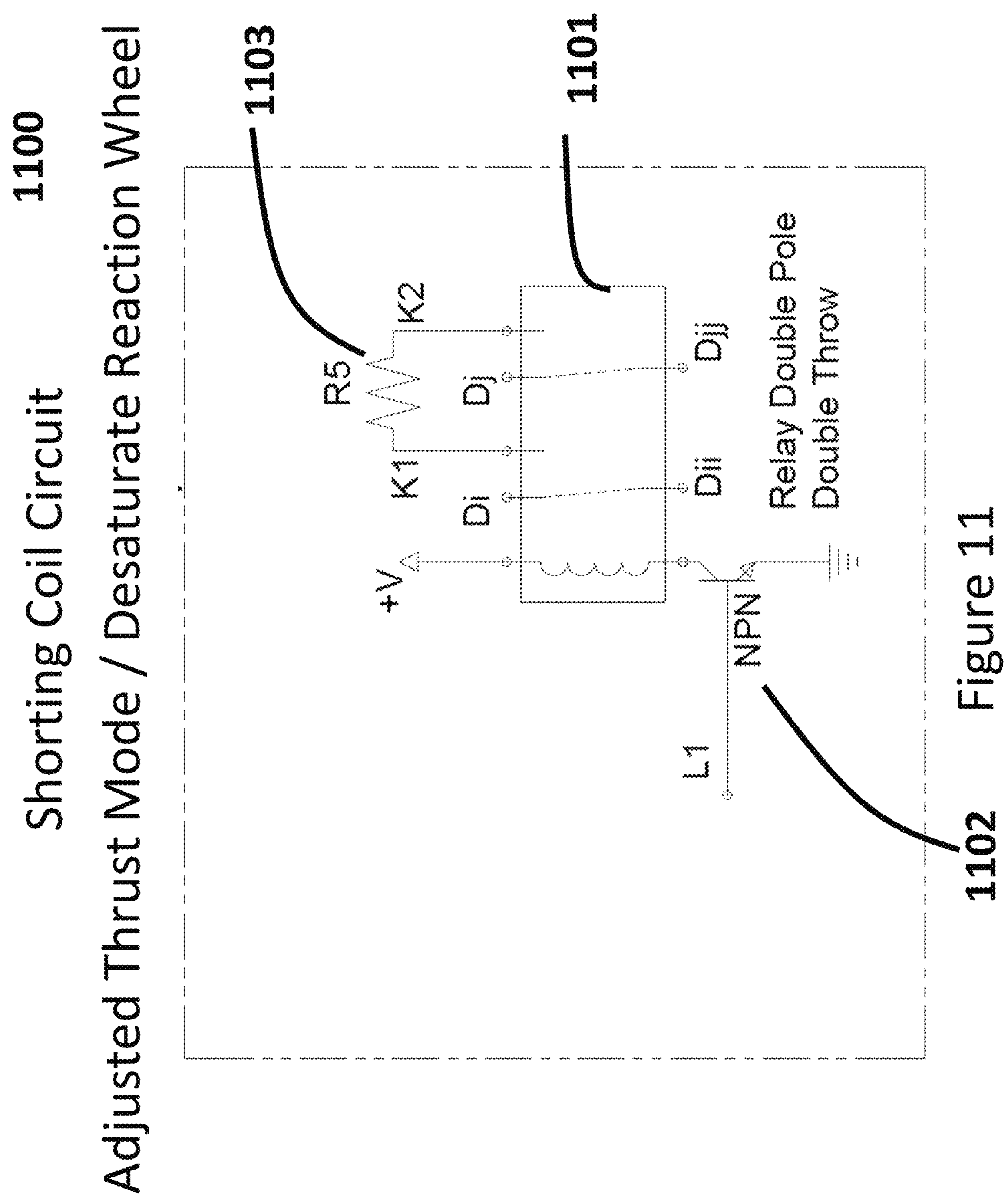
FIG. 11 is a circuit diagram of a relay configuration to control adjusted thrust mode according to one embodiment of the present disclosure.

By using independent electronic controller to drive each individual electromagnetic coil an adjusted thrust mode can be realized. In FIG. 11 a relay circuit 1100 allows each coil to be shorted to itself though a resistor R5 1103 when it is activated. Sending a HI signal at L1 to the NPN transistor 1102 will allow current to flow through the coil of a double pole double throw relay 1101 allowing the coil configuration to be adjusted as necessary.

Alternate Tethered Ring Rotor With Tethered Ring Rotor Configuration

Figure 12:
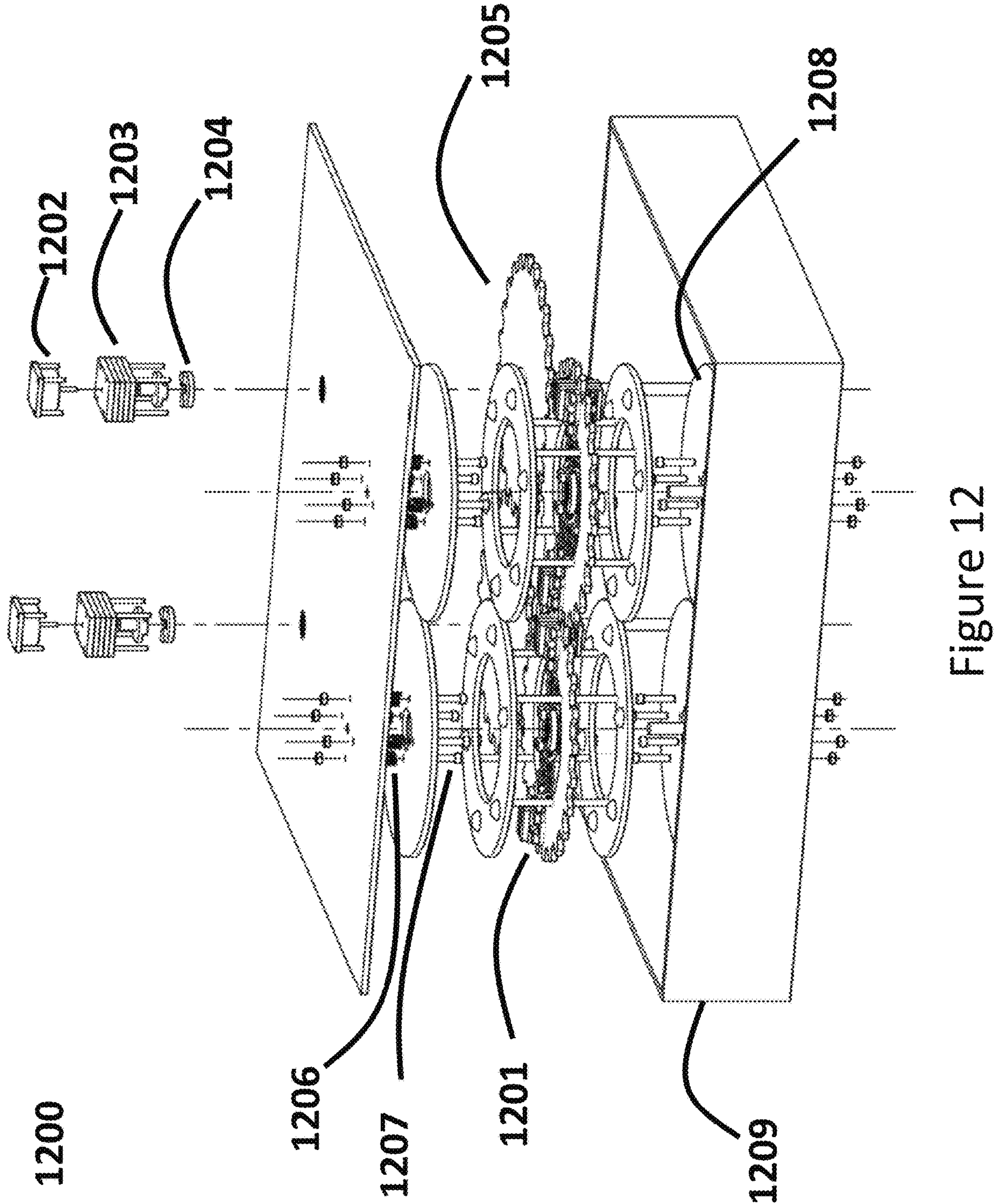
FIG. 12 is an isometric exploded view of an alternate embodiment of a self-propelling apparatus utilizing two tethered ring rotors each with a pair of permanent magnet ferrous material sandwich arrangement mounted along their perimeters with external electrical motors according to one embodiment of the present disclosure.

An exploded view of a paired ring rotor assembly 1200 is shown in FIG. 12. Shown are two tethered ring rotors with integrated thrust bearing elements 1201, thrust bearing roller plates 1208, a set of roller plate mounting bolts 1207, a set of roller plate springs 1206. Also shown in FIG. 12 are a pair of electric motors 1202, planetary gear boxes 1203, spider hubs 1204 and driving gear plates 1205. An enclosure 1209 is shown in FIG. 12 as well.

In this embodiment the rotors have four tethers per ring. There are a pair of permanent magnet ferrous material sandwich elements mounted along each rings' perimeter. Two tethers are attached close to each permanent magnet ferrous material sandwich mounting point.

Figures 14A, 14B:
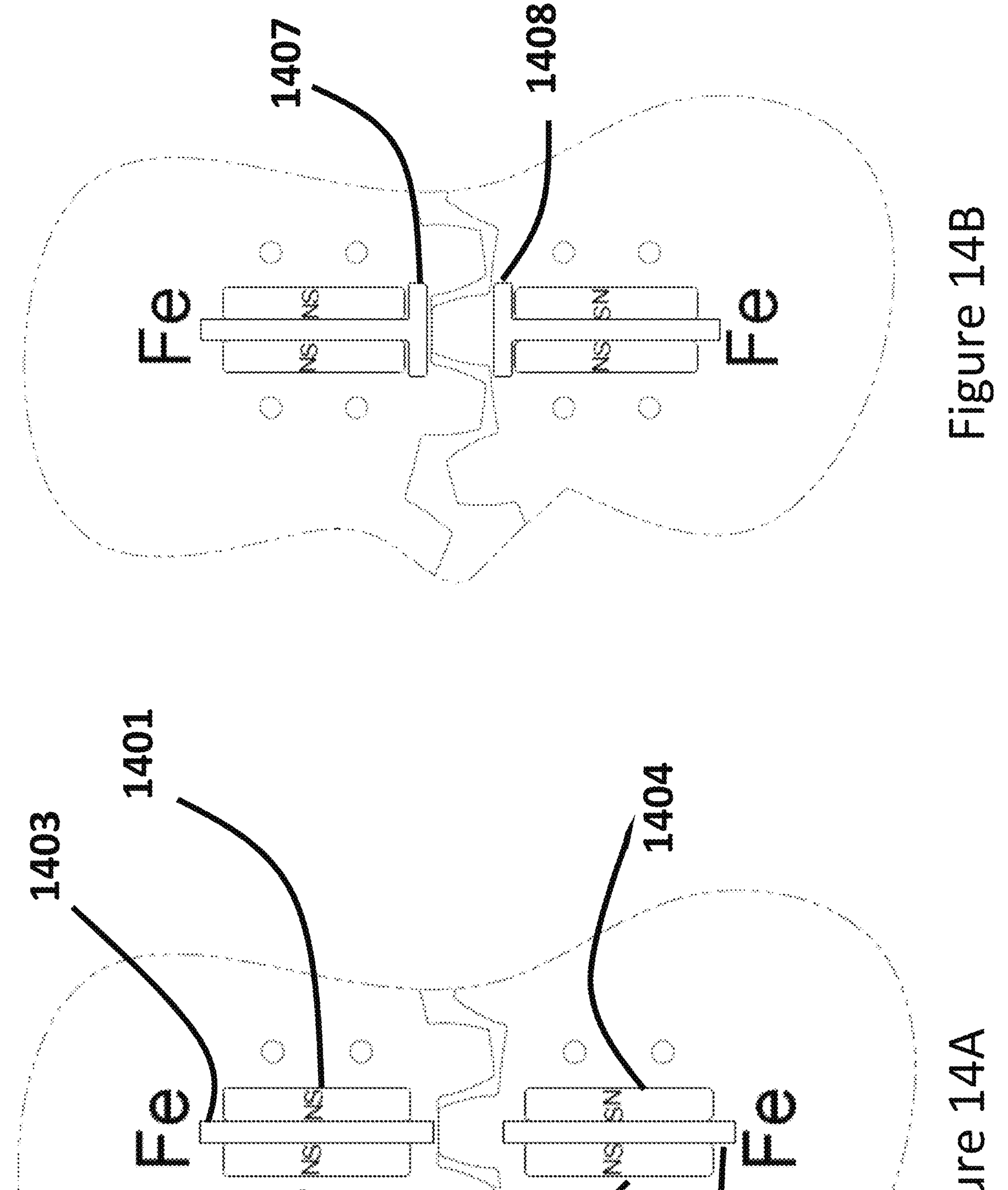
FIG. 14A is a close up view of the permanent magnet ferrous material sandwich arrangement according to one embodiment of the present disclosure.
FIG. 14B is a close up view of an alternate permanent magnet ferrous material sandwich arrangement according to one embodiment of the present disclosure.

A close up of this permanent magnet ferrous material sandwich arrangement is shown in FIGS. 14A and 14B. On one ring rotor the permanent magnet ferrous sandwich alignment provides a south facing pole 1401 away from the center ferrous material 1403 and a north facing pole 1402 facing away from the center ferrous element on the other side. On the other ring rotor the permanent magnet ferrous sandwich alignment provides a north facing pole 1404 away from the center ferrous material 1406 and a north facing pole 1405 facing away from the center ferrous element on the other side. The shape of the center ferrous material may include extensions, bends or T shapes in order to bend the permanent magnetic fields and achieve a desired rotor to rotor torque interaction effect. A pair of T-shaped center ferrous element are shown in FIG. 14B as 1407 and 1408.

Figure 13:
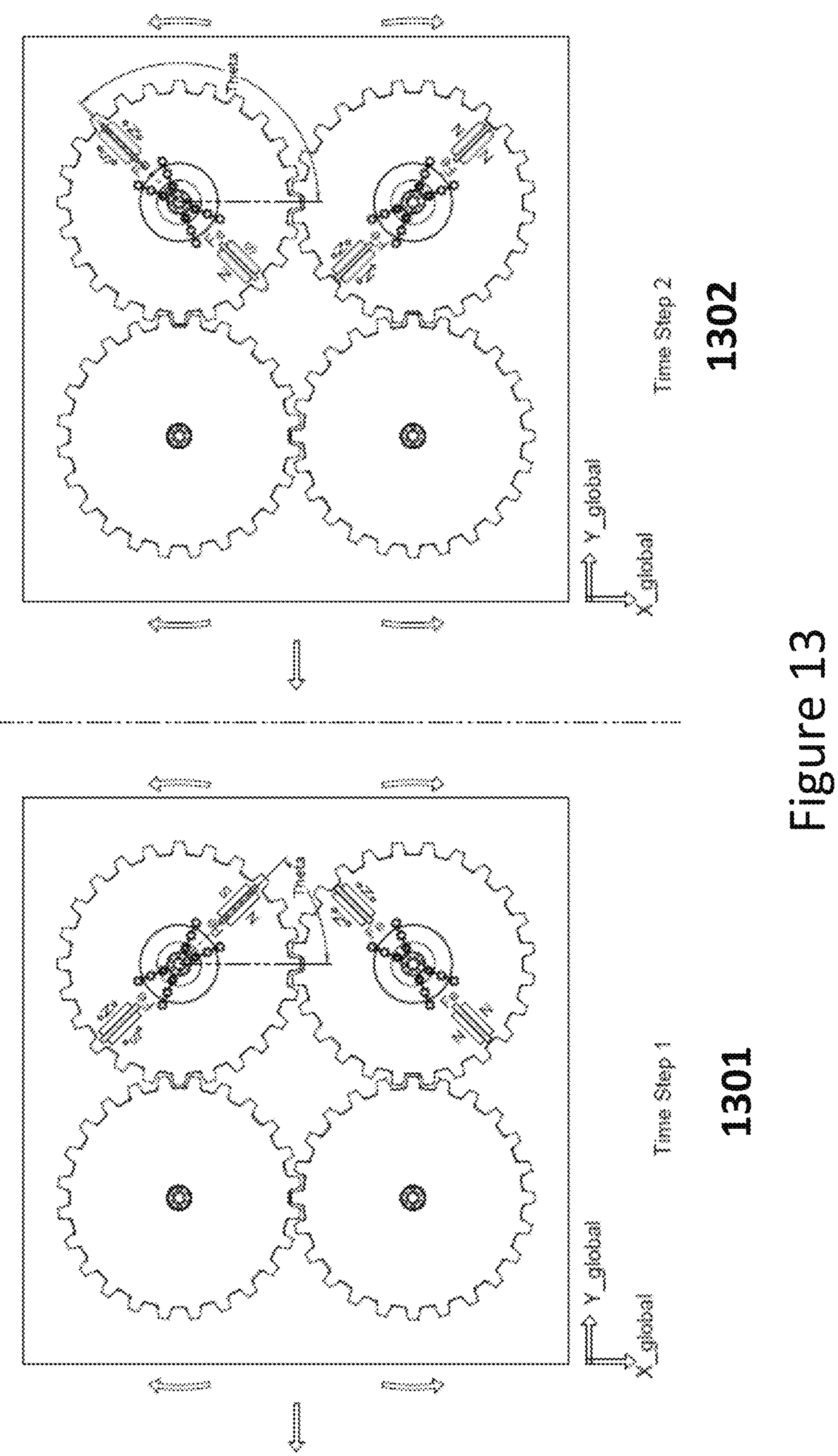
FIG. 13 is a schematic top view of the two tethered ring rotors each with a pair of permanent magnet ferrous material sandwich arrangement mounted along their perimeter's embodiment at two different time steps according to one embodiment of the present disclosure.

During operation of the paired ring rotor embodiment shown in FIG. 12, each electric motor should be powered and counter rotating. FIG. 13 shows a top schematic view of the paired ring rotor embodiment during two time steps of operation. Due to the permanent magnet ferrous material sandwich arrangement, at time step 1 1301 the rotor magnets will be repelling each other. The tether joints will carry this repelling force in quadrant 3 for rotor 1 and quadrant 4 for rotor 2. At time step 2 1302, the magnet orientation will create attraction between the rotors. The tether joints will carry this attraction in quadrant 4 on rotor 1 and quadrant 3 on rotor 2. The net centripetal force acting on each ring rotor shaft will be unbalanced and a net positive propelling force will act in the −y direction.

Figure 15:
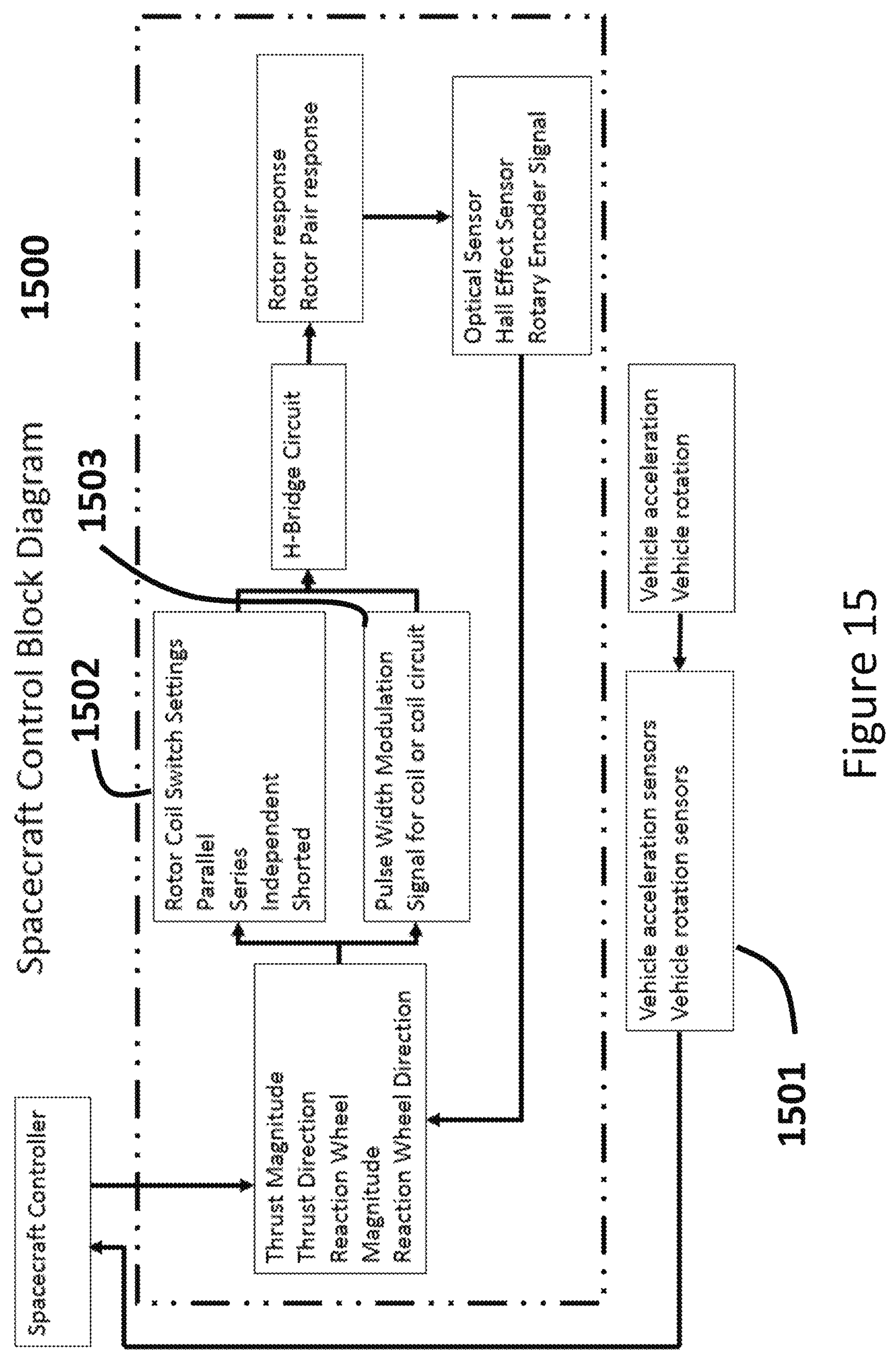
FIG. 15 is a spacecraft control block diagram according to one embodiment of the present disclosure.

FIG. 15 illustrates a possible spacecraft control block diagram 1500. Elements include combining vehicle acceleration and gyro sensors 1501 to determine desired rotor spinning direction 1502, pulse width modulation amount 1503 for rotor speed control.

Alternate Tethered Ring Rotor With Rigid Rotor Hybrid Embodiment

Figure 16:
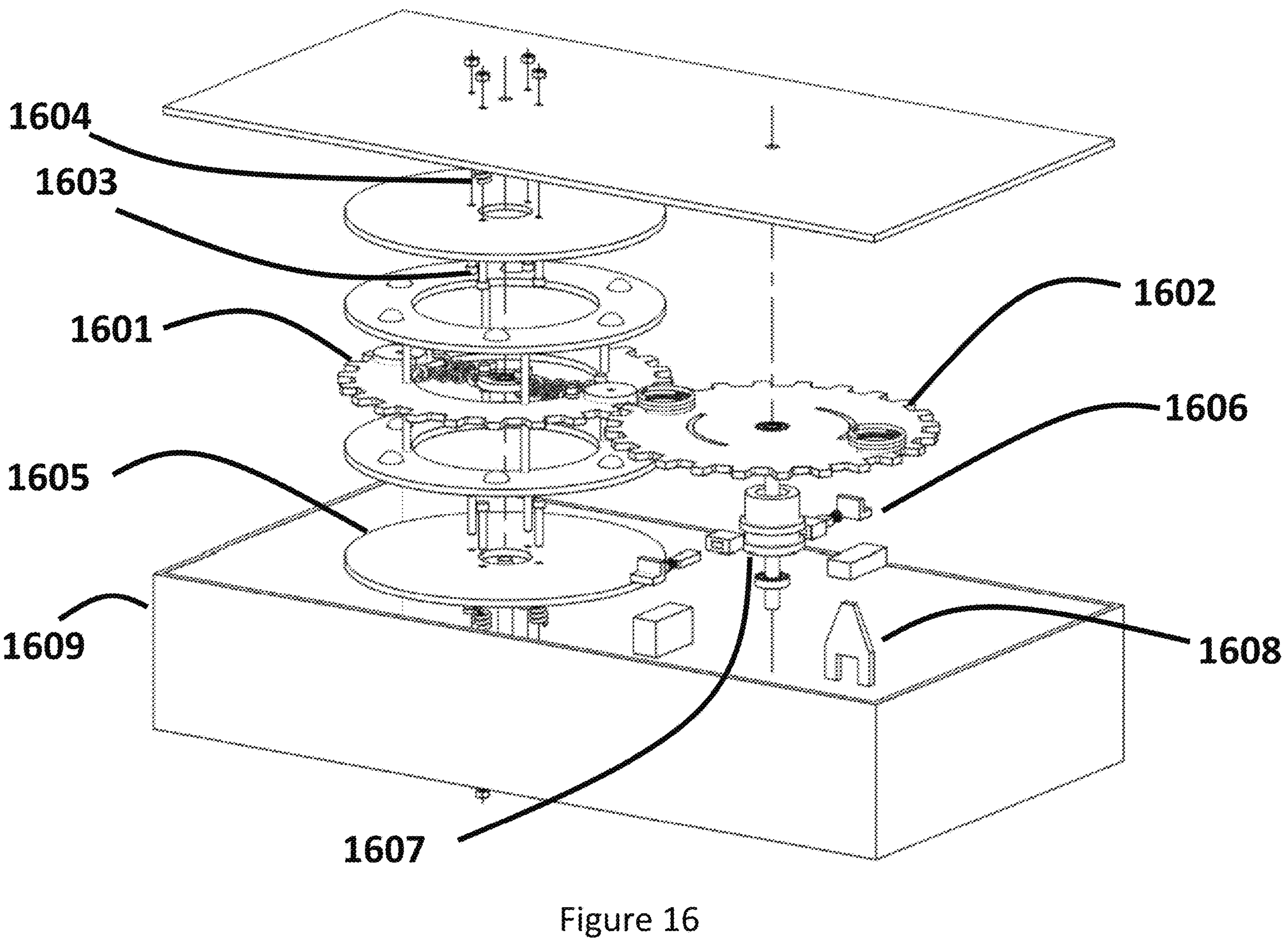
FIG. 16 is an isometric exploded view of an alternate embodiment of a self-propelling apparatus utilizing a tethered ring rotor with a pair of permanent magnets mounted along its perimeters acting in conjunction with a rigid disk rotor with a pair of electromagnets mounted along its perimeter according to one embodiment of the present disclosure.

FIG. 16 shows an embodiment with a paired tethered ring rotor 1601 and a rigid rotor 1602. Also shown in FIG. 16 are a set of thruster rolling plates 1605, a set of thruster rolling plate bolts 1603, and a set of thruster rolling plate bolt springs 1604. The rigid rotor has two electro-magnetic coils mounted symmetrically which are powered through a slip ring element 1607 attached to the rigid rotor along with carbon brush assemblies 1606 mounted on opposite sides of the central shaft. The electro-magnetic coils are controlled using an electric commutator which in this embodiment utilizes an optical reflective sensor 1608. An enclosure 1609 is shown in FIG. 16 as well.

Figure 17:
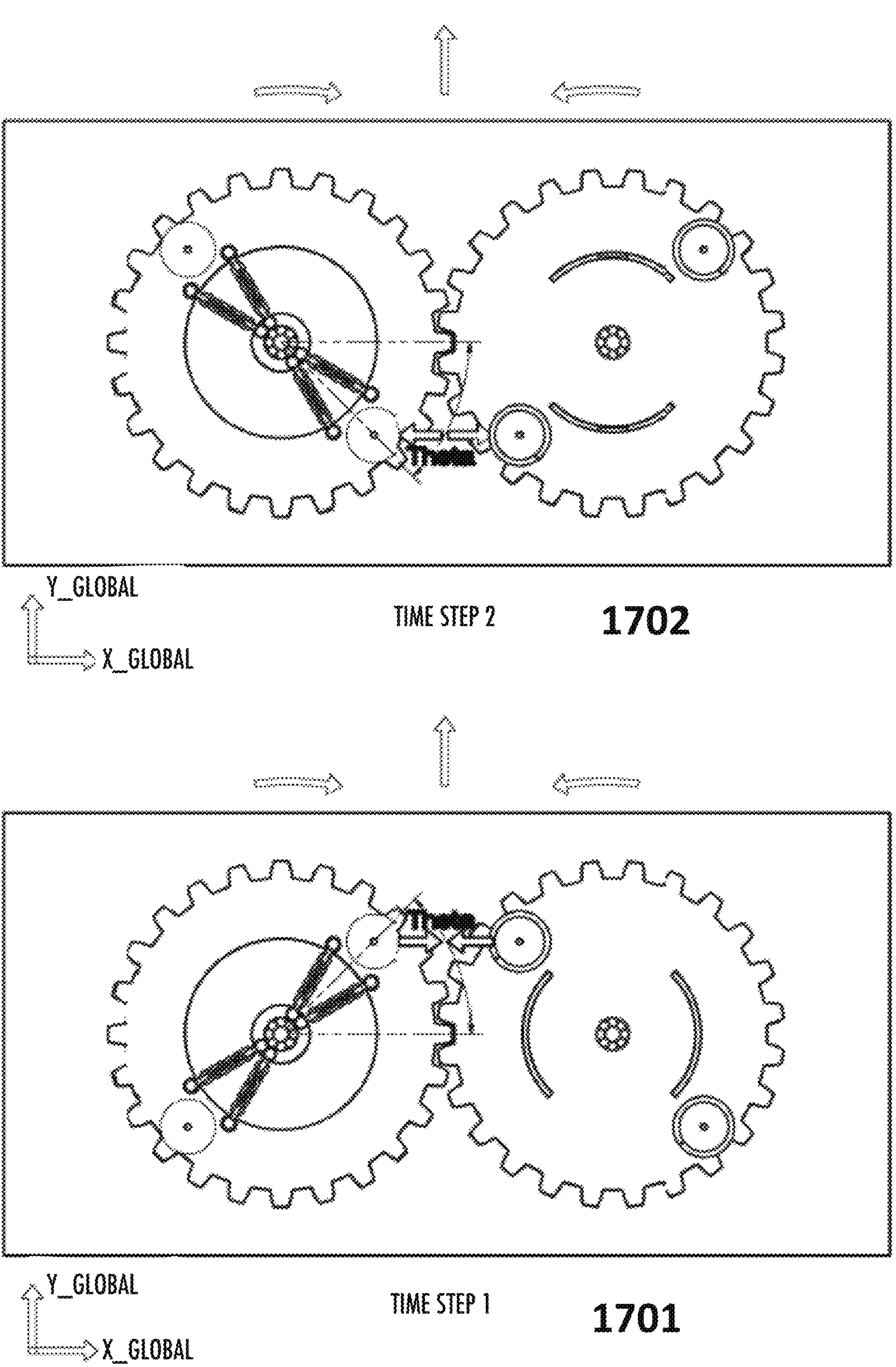
FIG. 17 is a schematic top view of the paired tethered ring rotor with permanent magnets and rigid rotor with electromagnets embodiment at two different time steps according to one embodiment of the present disclosure.

FIG. 17 shows a top schematic view during operation of this hybrid ring rotor rigid rotor pair embodiment at two different time steps. During time step 1 1701 the electric commutator controller will send current through the electromagnets to provide attraction with the permanent magnet mounted on the neighboring ring rotor. This attractive force will create a torque on both rotors that will create rotation motion. The tethers of the ring rotor will experience tension in quadrant 1 while those tethers in quadrant 3 will be slack. The centripetal force experienced by the central shaft will be in the ty direction. During time step 2 1702 the electric commutator controller will reverse the direction of the current through the electro-magnets to repel the permanent magnet mounted on the neighboring ring rotor. This repelling force will maintain the torque on both rotors that will maintain rotational motion. The tethers of the ring rotor will experience tension in quadrant 2 while the tethers in quadrant 4 will be slack. The centripetal force experienced by the central shaft will be in the +y direction. The net effect during a single rotation will be thrust in the +y direction. Because the current can be controlled through electric controller, the thrust direction can be controlled to in either the +Y or −Y direction by changing the direction of rotation of the rotors. The magnitude of the thrust can also be controlled by adjusting the spin rate by changing the pulse width duty cycle of the current or by increasing or decreasing the voltage across the commutator leads.

In this embodiment, the rigid rotor will experience a pendulum like effect that will produce thrust as well.

Alternate Tethered Ring Rotor Paired With Rigid Rotor Hybrid Embodiment

Figure 18:
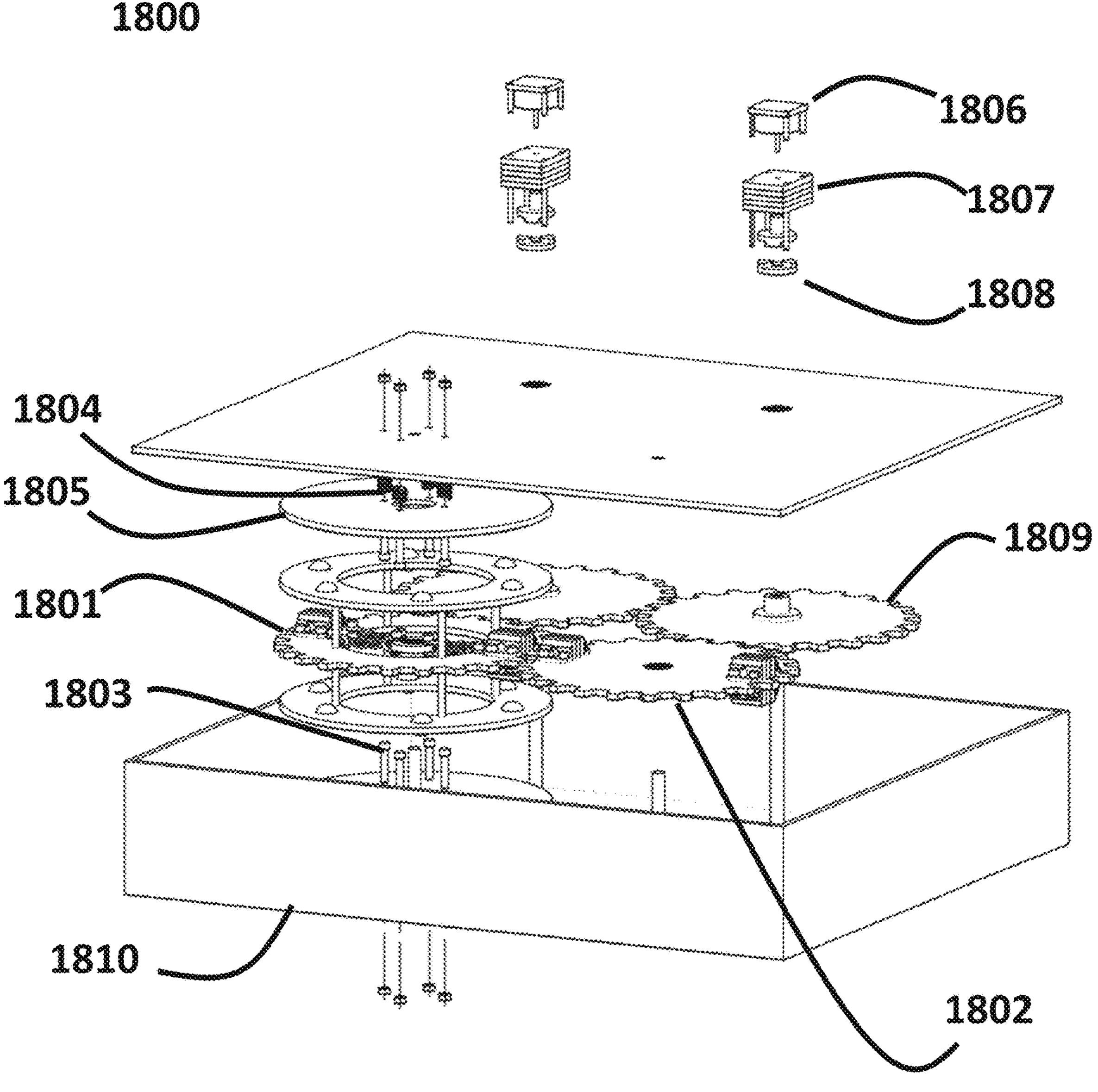
FIG. 18 is an isometric exploded view of an alternate embodiment of a self-propelling apparatus utilizing a tethered ring rotor with a pair of permanent magnet ferrous material sandwich arrangement mounted along their perimeter acting in conjunction with a rigid disk rotor with a pair of permanent magnet ferrous material sandwich arrangement mounted along their perimeter with external electrical motors according to one embodiment of the present disclosure.

FIG. 18 shows an exploded assembly view 1800 of an embodiment with a paired tethered ring rotor 1801 and a rigid rotor 1802. Also shown in FIG. 18 are a set of thruster bearing rolling plates 1805, a set of thruster rolling plate bolts 1803, and a set of thruster rolling plate bolt springs 1804. The rigid rotor has a pair of permanent ferrous material sandwich elements mounted symmetrically. Also shown in FIG. 18 are a pair of electric motors 1806, planetary gear boxes 1807, spider hubs 1808 and driving gear plates 1809. An enclosure 1810 is shown in FIG. 18 as well.

Figure 19:
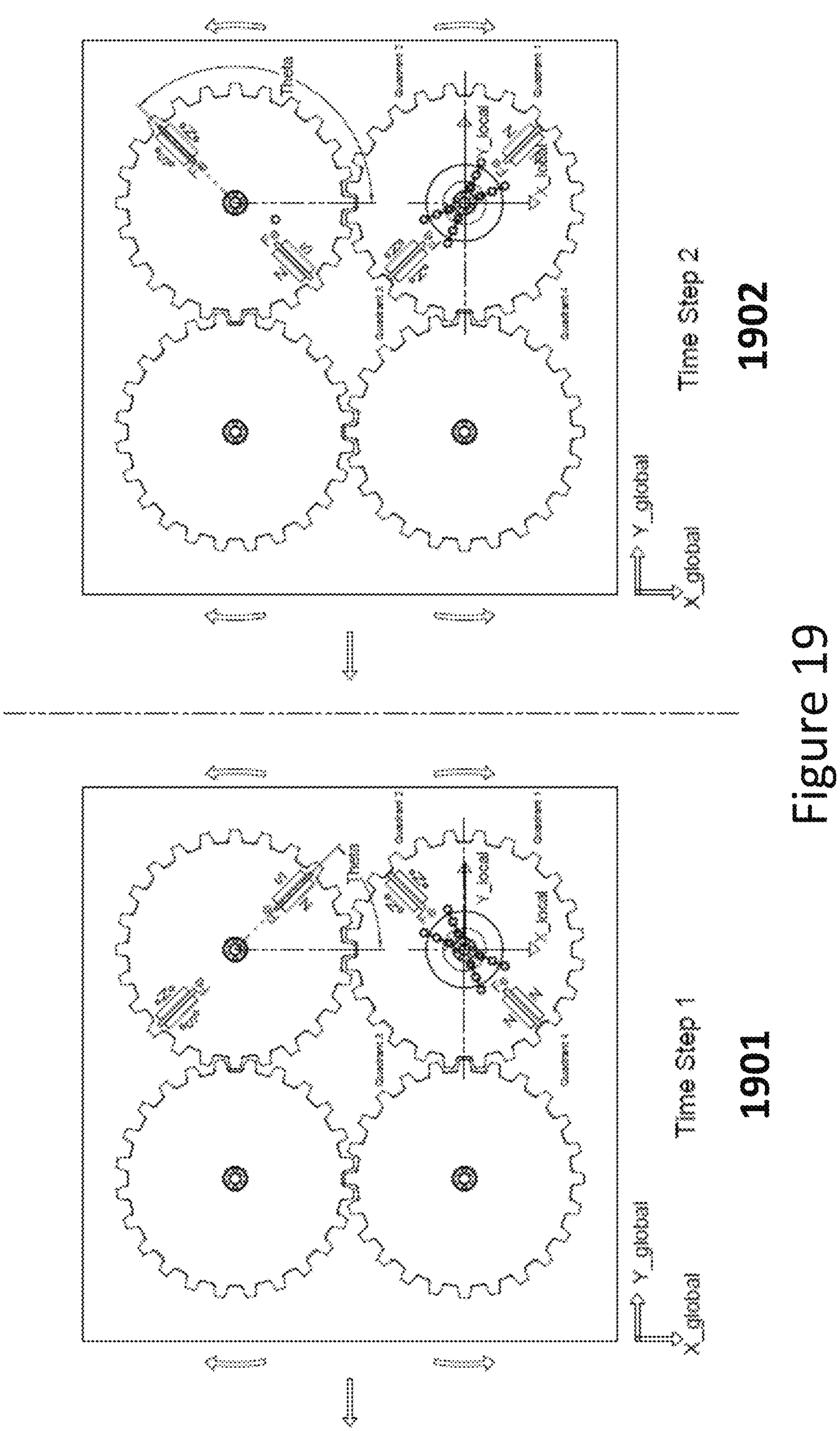
FIG. 19 is a schematic top view of the alternate embodiment of a self-propelling apparatus utilizing a tethered ring rotor with a pair of permanent magnet ferrous material sandwich arrangement mounted along their perimeter acting in conjunction with a rigid disk rotor with a pair of permanent magnet ferrous material sandwich arrangement mounted along their perimeter at two different time steps according to one embodiment of the present disclosure.

FIG. 19 shows a top schematic view during operation of this hybrid ring rotor rigid rotor pair embodiment at two different time steps. During time step 1 1901 there will be a repelling force between the permanent magnet elements. This repelling force will create a torque on both rotors that will create rotation motion. The tethers of the ring rotor will experience tension in quadrant 3 while those tethers in quadrant 1 will be slack. The centripetal force experienced by the central shaft will be in the −y direction. During time step 2 1901 there will be an attractive force between the permanent magnet elements of each rotor. This attractive force will create a torque on both rotors that will create rotation motion. The tethers of the ring rotor will experience tension in quadrant 2 while those tethers in quadrant 4 will be slack. The centripetal force experienced by the central shaft will be in the −y direction. The net effect during a single rotation will be thrust in the +y direction. The speed of the electric motors can be adjusted to throttle the thrust produced to the desired amount.

In this embodiment the rigid rotor will experience a pendulum like effect that will produce thrust as well.

Pulling Through A Pinned Joint or Pendulum-like Thrust Mechanism

Figure 21:
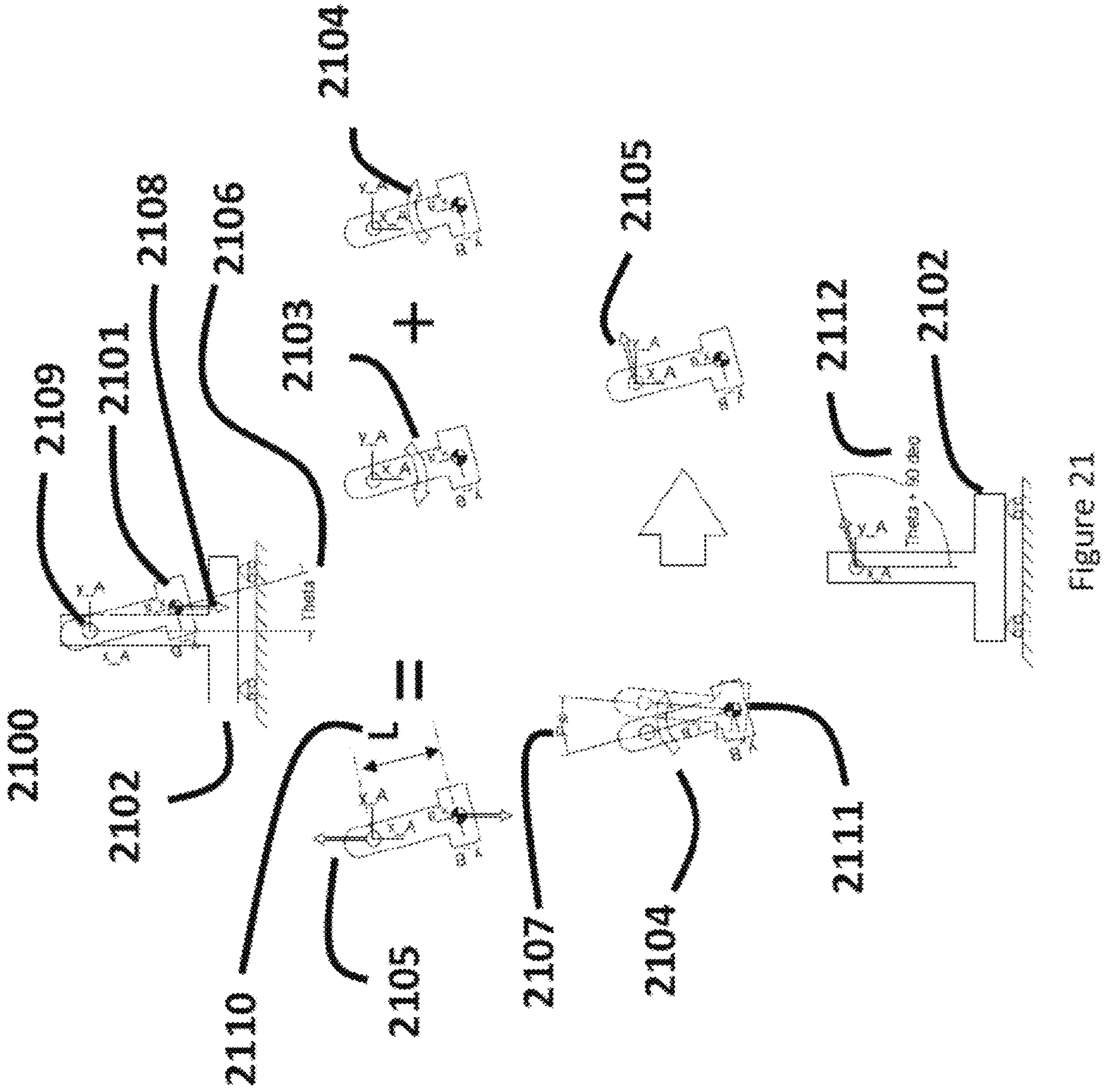
FIG. 21 is a free body diagram of a rigid pendulum mounted on a base with rollers according to one embodiment of the present disclosure.

Another mechanism of thrust can be described as pendulum like action. Referring to FIG. 21, to understand how pendulum like motion works, a pendulum mounted on a base with rollers is shown as 2100. Also shown in FIG. 21 is a free body diagram of the pendulum arm and bob 2101 and its base 2102. The rotation 2103 about the pendulum pinned point A 2109 due to gravity acting on the bob mass 2108 is understood. Because the base is mounted on rollers, the base will move as well.

Figure 20:
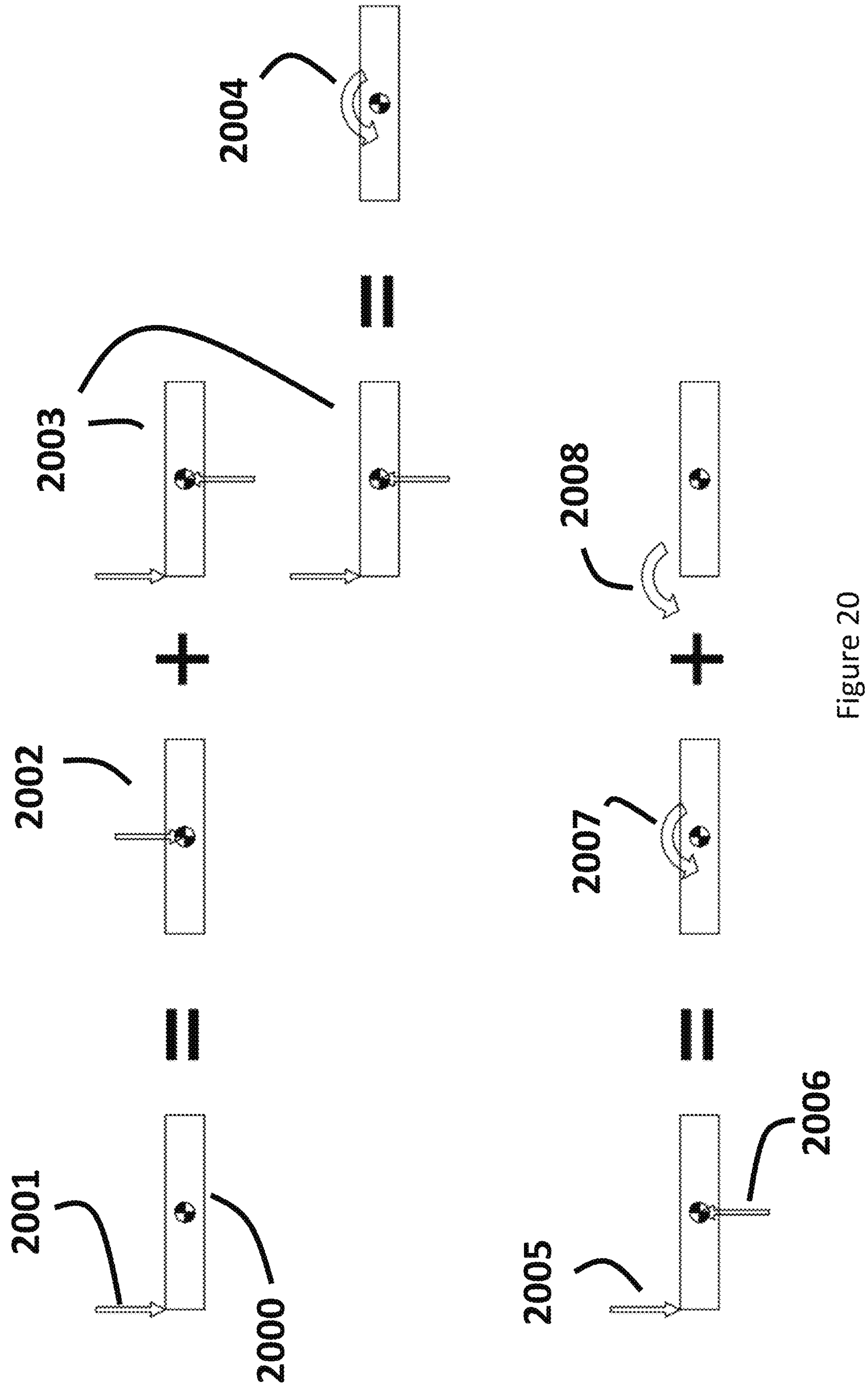
FIG. 20 is a free body diagram of rigid bodies undergoing a single force and a force couple according to one embodiment of the present disclosure.

To explain the motion of the base, it is known that for a rigid body 2000 that has a line of force acting on it but not through its center of mass 2001 that the rigid body will experience a superposition of linear motion as if the line of force was acting though the center of mass 2002 and rotation due to a force couple 2003 as shown in FIG. 20. This force couple can be seen as rotation about the rigid body's center of mass 2004.

Turning back to the pendulum assembly 2100, due to the reaction force 2105 acting in the −X direction at the pendulum arm pinning point A there will be rotation 2104 about the bob center of mass 2111 denoted as point B. The magnitude of the torque ($\tau_{center\ of\ mass}$) about the bob center of mass created by the constraining force about point B is $$\tau_{center\ of\ mass}=r\times F.$$

Where F is bob mass m multiplied by the gravitational acceleration constant g $$F=m*g$$

and r is moment arm the bob mass is acting at which is the pendulum arm length L 2110 times the sine of the angle of the bob denoted as theta (θ) 2106.

$$\tau_{center\ of\ mass}=m*g*L*\sin(\theta)$$

The angle at which the bob rotates about is center of mass is denoted by Psi (ψ) 2107. During rotation of the pendulum the angle theta (θ) will be comprised of rotation about the pinned point A denoted as lambda (λ) and rotation about the pendulum bob center of mass point B denoted as Psi (ψ), which can be written as $$\theta=\lambda+\psi$$

The angular acceleration about B is the second derivative with respect to time of Psi or $d\psi^2/dt^2$. The torque is equal to the angular acceleration times the moment of inertia with respect to point B (I_B).

$$\tau_{center\ of\ mass}=I\_B*d\psi^2/dt^2$$

It is this rotation about the bob that produces motion of the pendulum base 2102. The instantaneous linear acceleration of the base is related to the angle Psi by $$\text{Instantaneous Linear Acceleration}=L*d\psi^2/dt^2$$

The direction this linear acceleration acts in is shown by arrow 2105 and will be for clockwise rotation about point B Theta+90 degrees 2112. For this system the base acceleration is a function of the bob mass and that angle of the bob theta.

Expressing angular acceleration as a function of torque and moment of inertia provides $$d\psi^2/dt^2=\tau_{center\ of\ mass}/I\_B$$

and substituting this expression into the instantaneous linear acceleration becomes $$\text{Instantaneous Linear Acceleration}=m*g*L^2*\sin(\theta)/I\_B$$

The component of this linear acceleration that will be observable will be its component in the y direction which is related to the instantaneous linear acceleration through the cosine of theta $$\text{Instantaneous Linear Acceleration\_y}=m*g*L^2*\sin(\theta)*\cos(\theta)/I\_B$$

For this system the base acceleration is a function of the bob mass and the reference angle theta.

Figure 22:
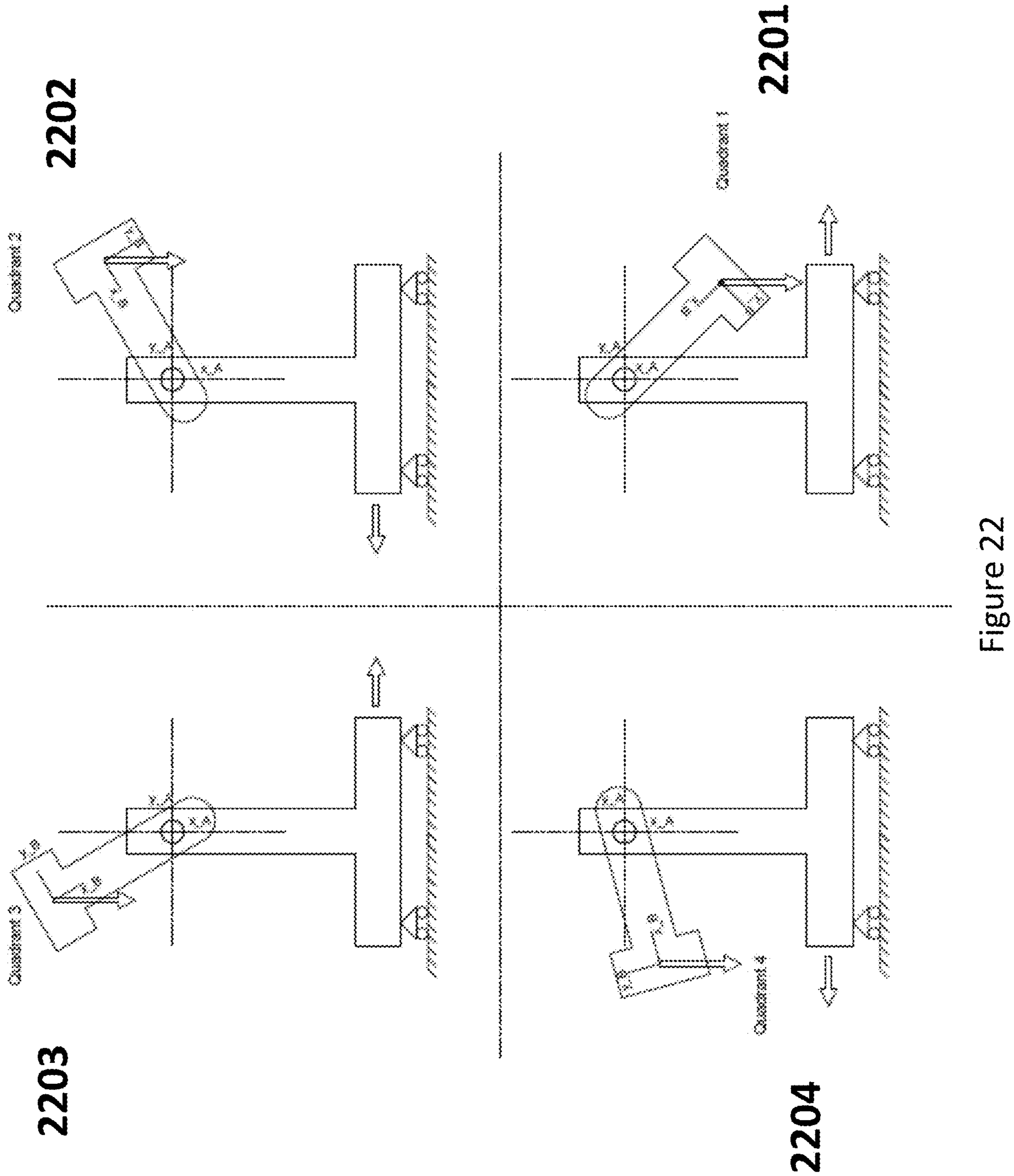
FIG. 22 is an illustration of a rigid body pendulum mounted on a base with rollers in four different quadrants according to one embodiment of the present disclosure.

Referring to FIG. 22, the direction of the pendulum base's linear acceleration will be dependent on the quadrant the pendulum bob is moving through. When the bob is in quadrant 1 there will be motion in the +Y direction 2201. When the bob is in quadrant 2 there will be motion in the −Y direction 2202. When the bob is in quadrant 3 there will be motion in the +Y direction 2203. When the bob is in quadrant 4 there will be motion in the −Y direction 2204.

Figure 23:
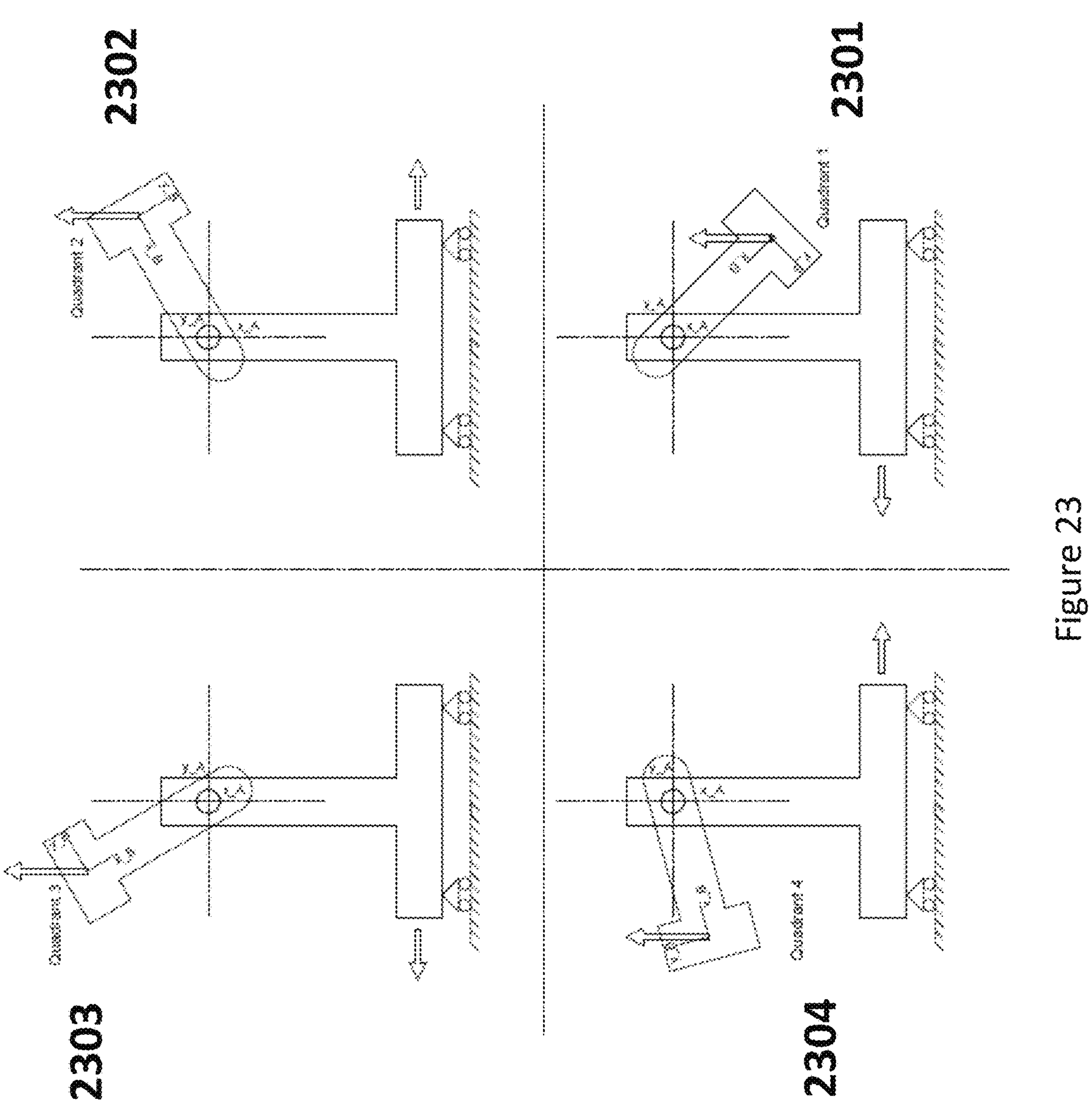
FIG. 23 is an illustration of a rigid body pendulum mounted on a base with rollers in four different quadrants according to one embodiment of the present disclosure.

Referring to FIG. 23 if the direction of force acting on the bob is reversed; the motion of the base will reverse as well. When the bob is in quadrant 1 there will be motion in the −Y direction 2301. When the bob is in quadrant 2 there will be motion in the +Y direction 2302. When the bob is in quadrant 3 there will be motion in the −Y direction 2303. When the bob is in quadrant 4 there will be motion in the +Y direction 2304.

Figure 24:
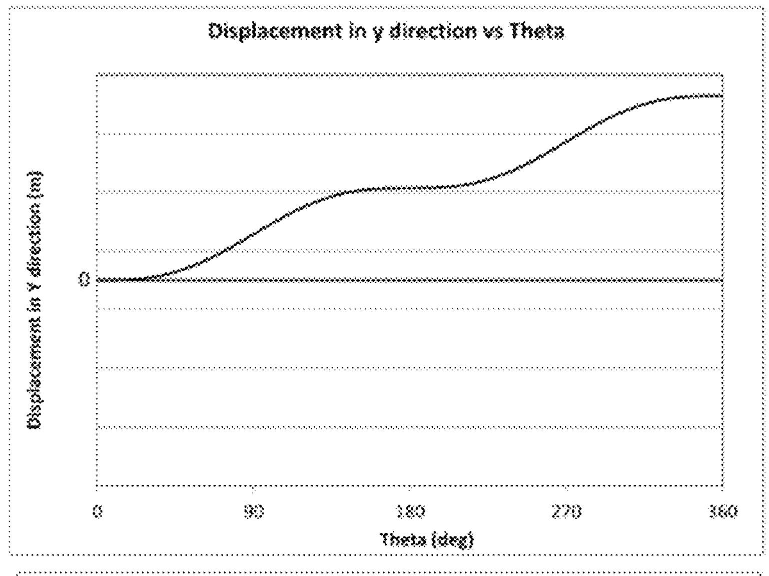
FIG. 24 is a set of graphs illustrating rigid pendulum torque, pendulum base velocity ang pendulum base displacement according to one embodiment of the present disclosure.
Figure 24:
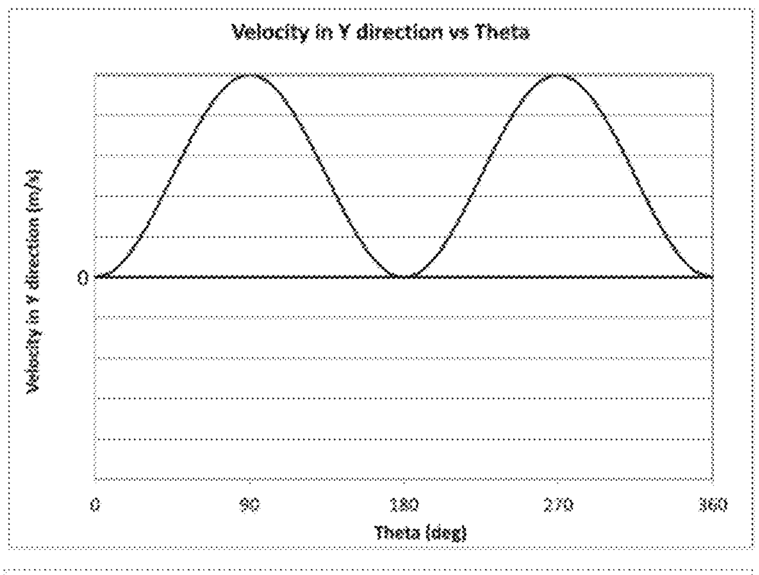
Figure 24:
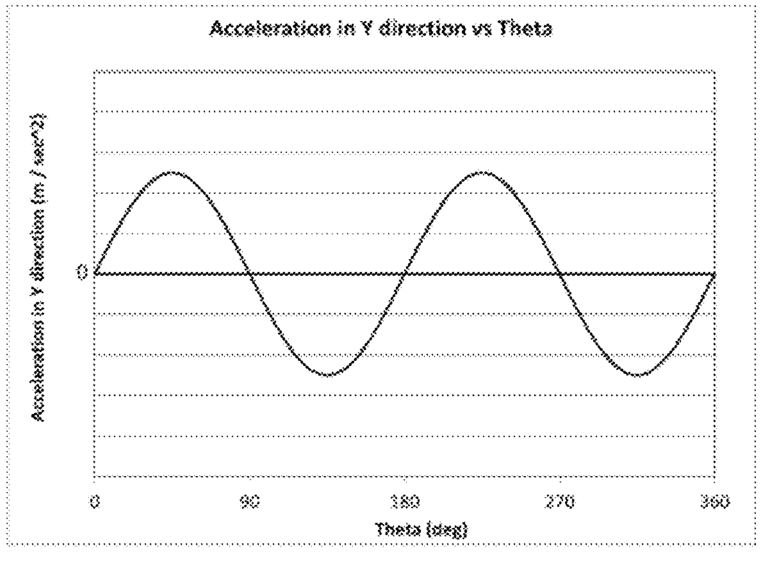

A set of graphs relating the torque acting on the bob 2401, velocity 2402 and displacement 2403 all as function of reference angle theta experienced by the base as a function of rotation angle theta is shown in FIG. 24. Because this configuration is symmetric, at the end of each half cycle the velocity becomes zero and the base has been displaced a distance delta_d. This cyclic behavior repeats for every revolution.

Figure 25:
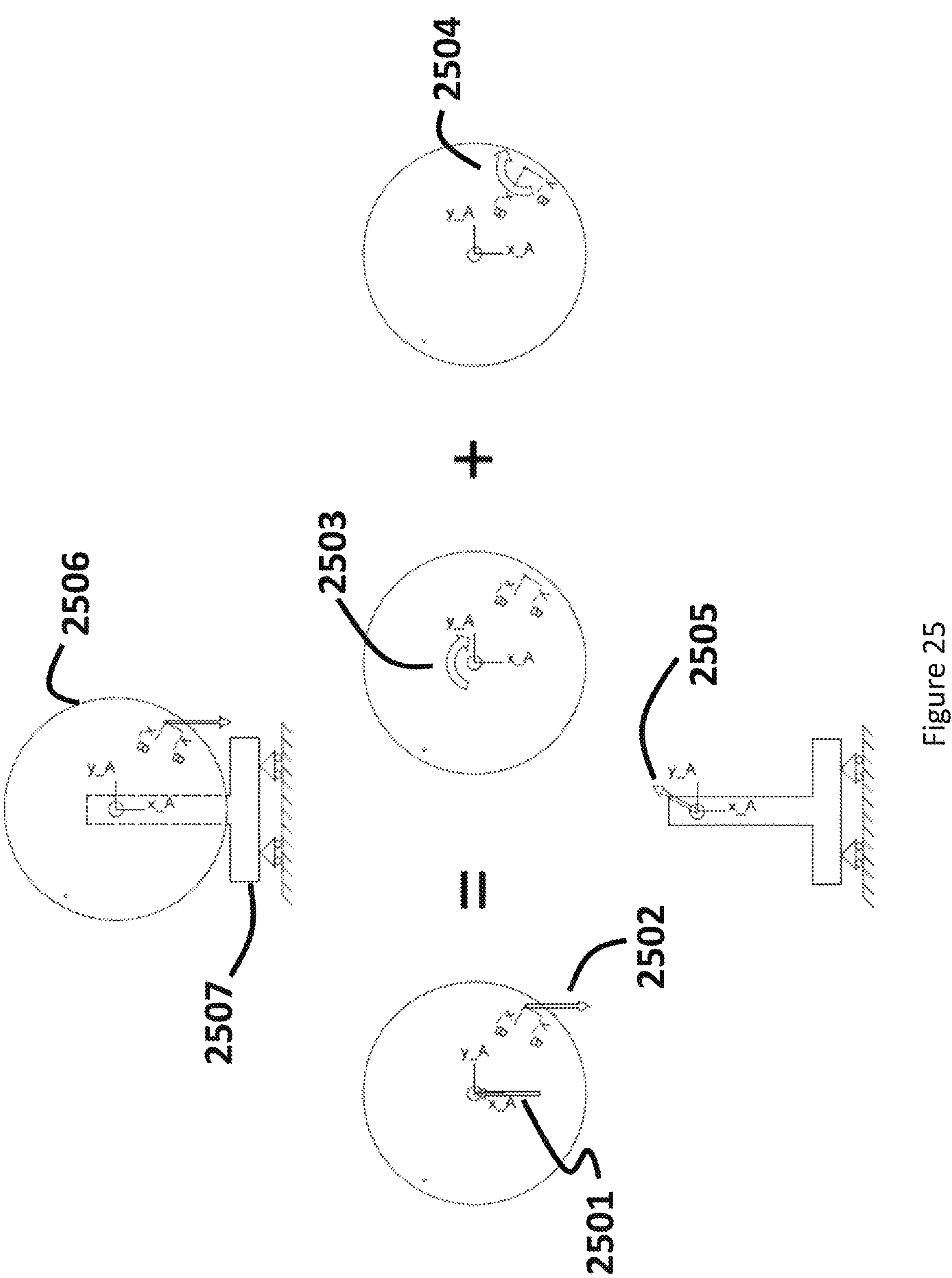
FIG. 25 is a free body diagram of a rigid disk mounted on a base with rollers according to one embodiment of the present disclosure.

An embodiment based on the rigid pendulum system discussed above is seen in FIG. 25 in which a rigid disk 2506 is mounted on a base with rollers 2507 which experiences two equal forces that are in line but separated by a distance. One of the forces is a constraining reaction force that acts through the center of mass 2501 while the other force 2502 acts on a pin mounted close to the disk's edge. Like the rigid pendulum system this system will experience two rotations, one about the center of mass 2503 and one about the point at which the second force is acting 2504. The rigid disk base will experience linear motion like the rigid pendulum base shown as 2505. This intuitive extension is shown in FIG. 20 by two forces 2005 and 2006 acting on a rigid body 2009. Where the rotation about the center of mass is shown as 2007 and rotation about the edge force is shown as 2008.

Figure 26:
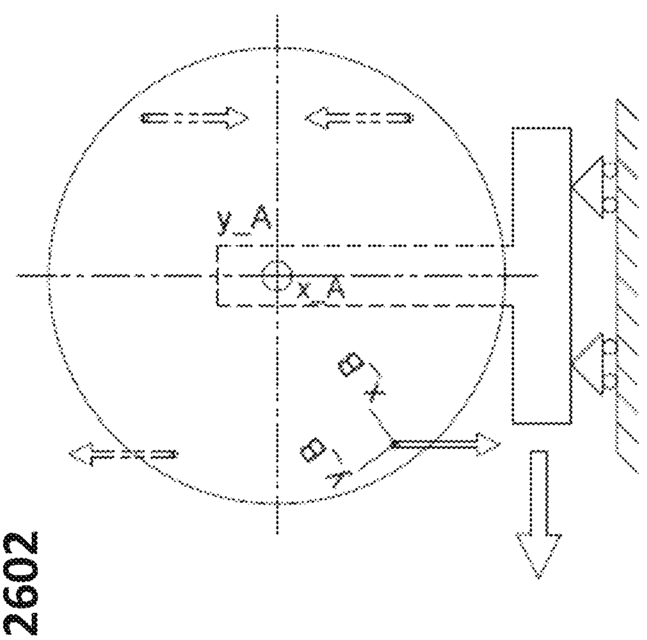
FIG. 26 is an illustration of a rigid disk mounted on a base with rollers under various quadrant loads according to one embodiment of the present disclosure.
Figure 26:
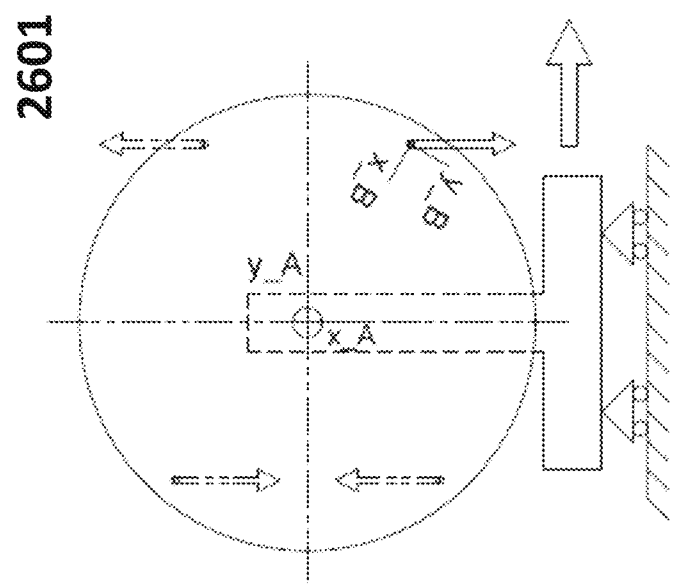

FIG. 26 illustrates this pinned disk system when the edge point force is in either the +X or −X direction and in different quadrants. Like the pendulum configuration this base of the pinned disk's linear motion in the Y direction will be dependent on the quadrant the edge point force acts. The set of quadrants and point force directions that will result in +Y motion of the base is seen in 2601. While the set of quadrants and point force directions that will result in-Y motion of the base is seen in 2602.

The rigid rotor disk 1602 in FIGS. 16 and 1802 in FIG. 18 in the hybrid tethered ring rotor embodiment will produce thrust due to pendulum like mechanism during operation when the magnetic interaction occurs between the rotors. The magnets mounted on the rigid disk rotors will act as points of rotation as they are attracted or repelled by the magnets or electromagnets on the neighboring ring rotor. In order to account for unwanted torques during operation of a hybrid tethered ring rotor embodiment at least two units 302 should be installed per spacecraft as shown in FIG. 3.

As the rotor permanent magnets or powered electromagnets separate and come together their potential energy in changing. This energy is being converted into kinetic energy that is seen as changes to each rotors angular speed and to linear speed of the apparatus. These energies can be expressed as Potential Energy=magnetic_force*change in distance.

Rotational Kinetic Energy about rotor shaft=½*I_A*$\omega^2$; where I_A is moment of inertia of each rotor abouts its shaft and $\omega$ is the rotor angular speed.

Linear Kinetic Energy of apparatus=½*mass_system*$v^2$; where mass_system is the system mass and v is linear velocity.

Alternate Rigid Rotor with Rigid Rotor Embodiment

Figure 28:
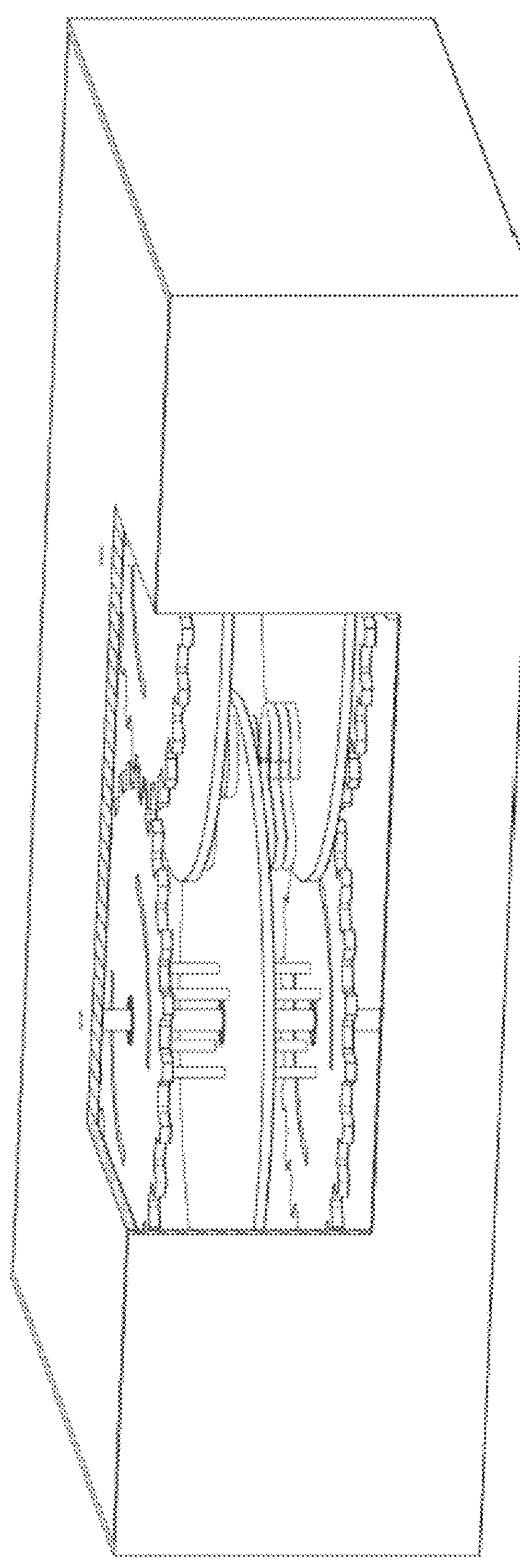
FIG. 28 is an isometric view with section cut of an alternate embodiment of a self-propelling apparatus utilizing a pair of rigid disk rotors one with a set of permanent magnets mounted along its perimeters and the other with a set of electro-magnets mounted along its perimeter according to one embodiment of the present disclosure.
Figure 29:
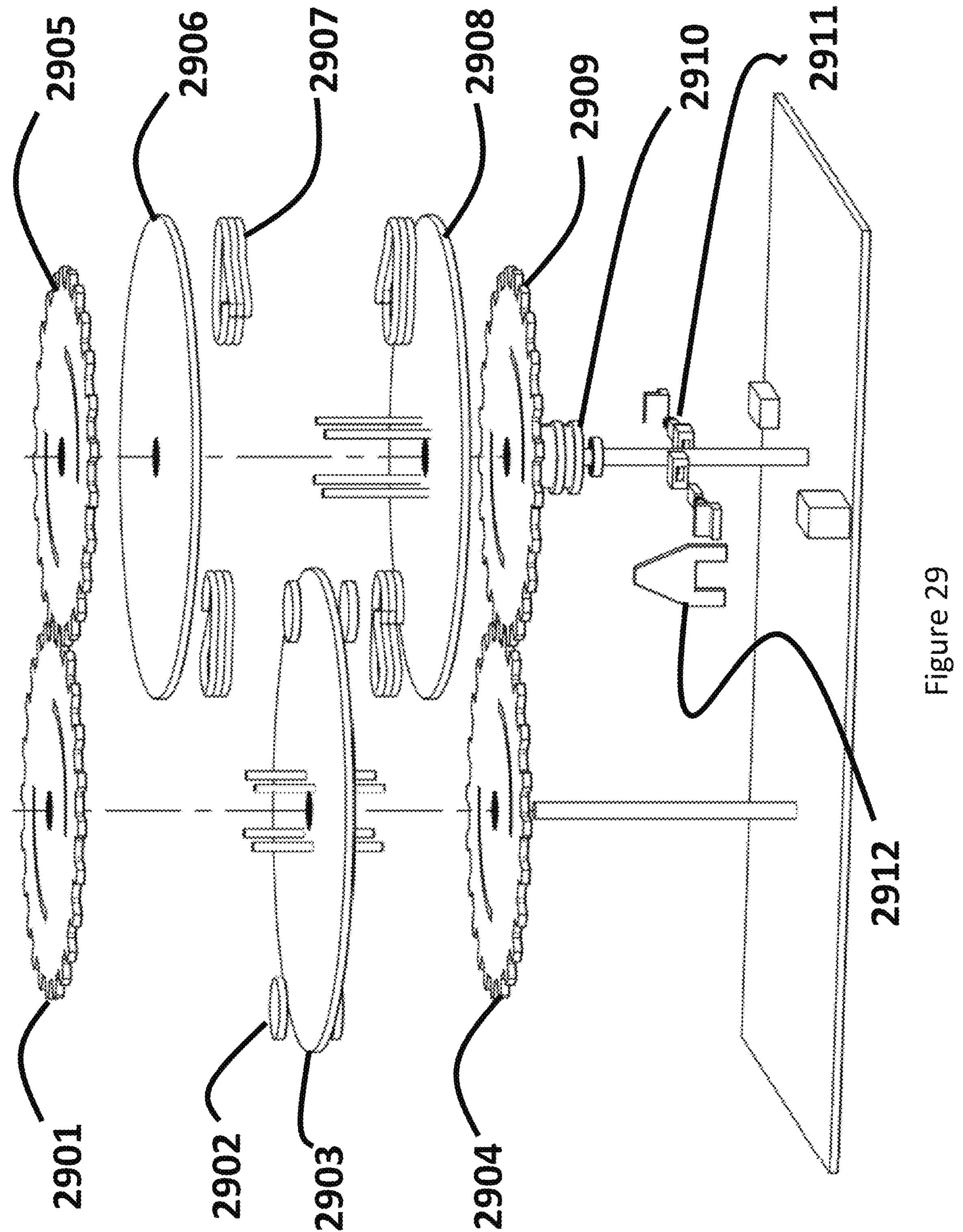
FIG. 29 is an isometric exploded view of a self-propelling apparatus utilizing a pair of rigid disk rotors one with a set of permanent magnets mounted along its perimeters and the other with a set of electro-magnets mounted along its perimeter. (enclosure not shown for clarity) according to one embodiment of the present disclosure.

An alternate embodiment utilizing the pendulum thrust mechanism is shown in FIG. 28 is a section cut in the enclosure for illustration purposes. An exploded view of this embodiment is shown in FIG. 29 showing a set of four electromagnetic coils mounted on one of the inter-acting rotors 2907, a pair of support plates for the electromagnetic coils 2906 and 2908, along with gear plates 2905, 2909 and 2901, 2904, a set of four permanent magnets 2902 and a support plate for the permanent magnets 2903. In this embodiment the electromagnet coils are powered through a pair of slip rings 2910 working in conjunction with optical sensor 2912 and a pair of carbon bushes and support elements 2911. The support plates for the electromagnetic coils and permanent magnets are oversized so that the magnetic force interaction is stronger during rotation.

Figure 27:
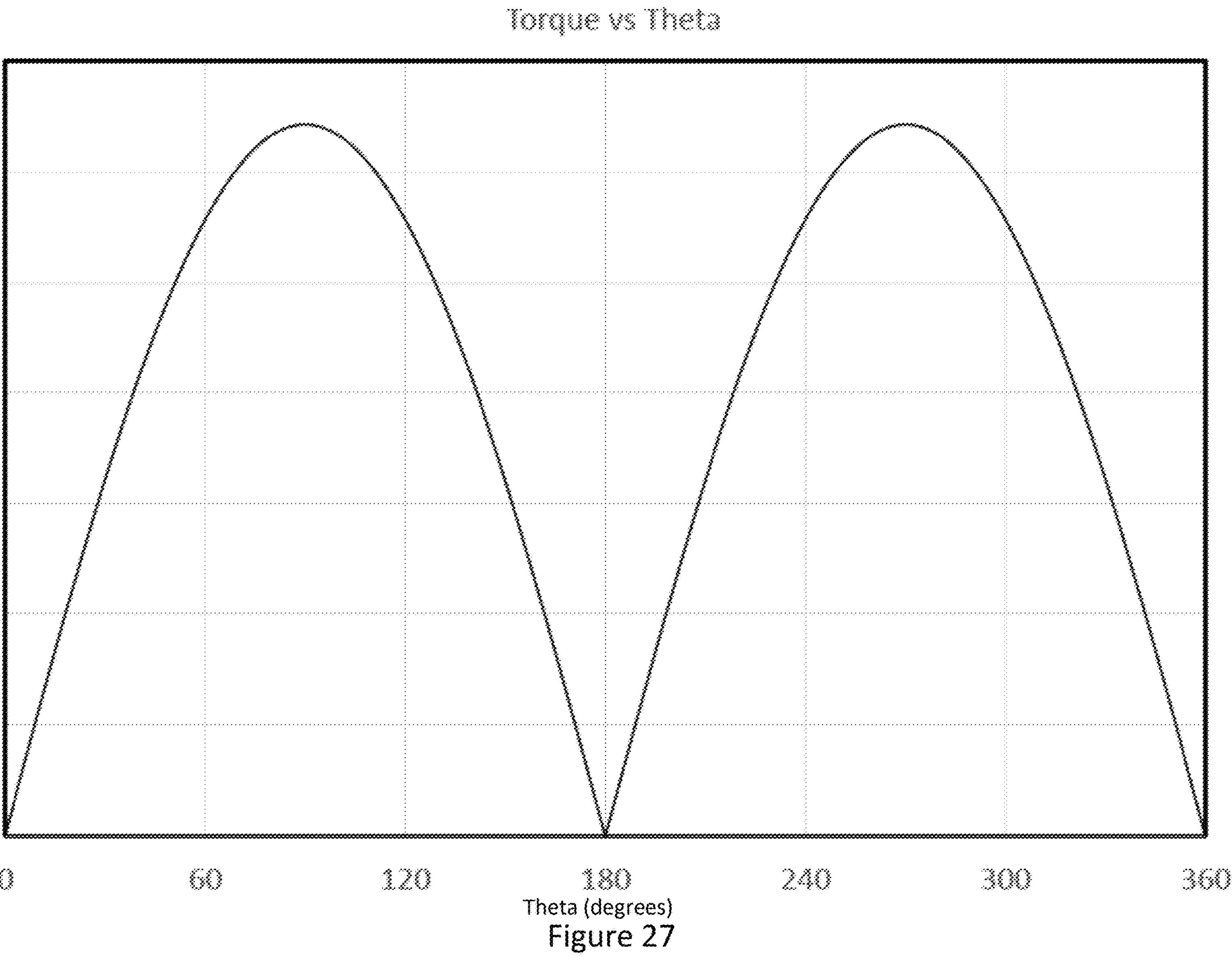
FIG. 27 is a graph of rotor to rotor torque as a function of reference angle theta according to one embodiment of the present disclosure.
Figure 30:
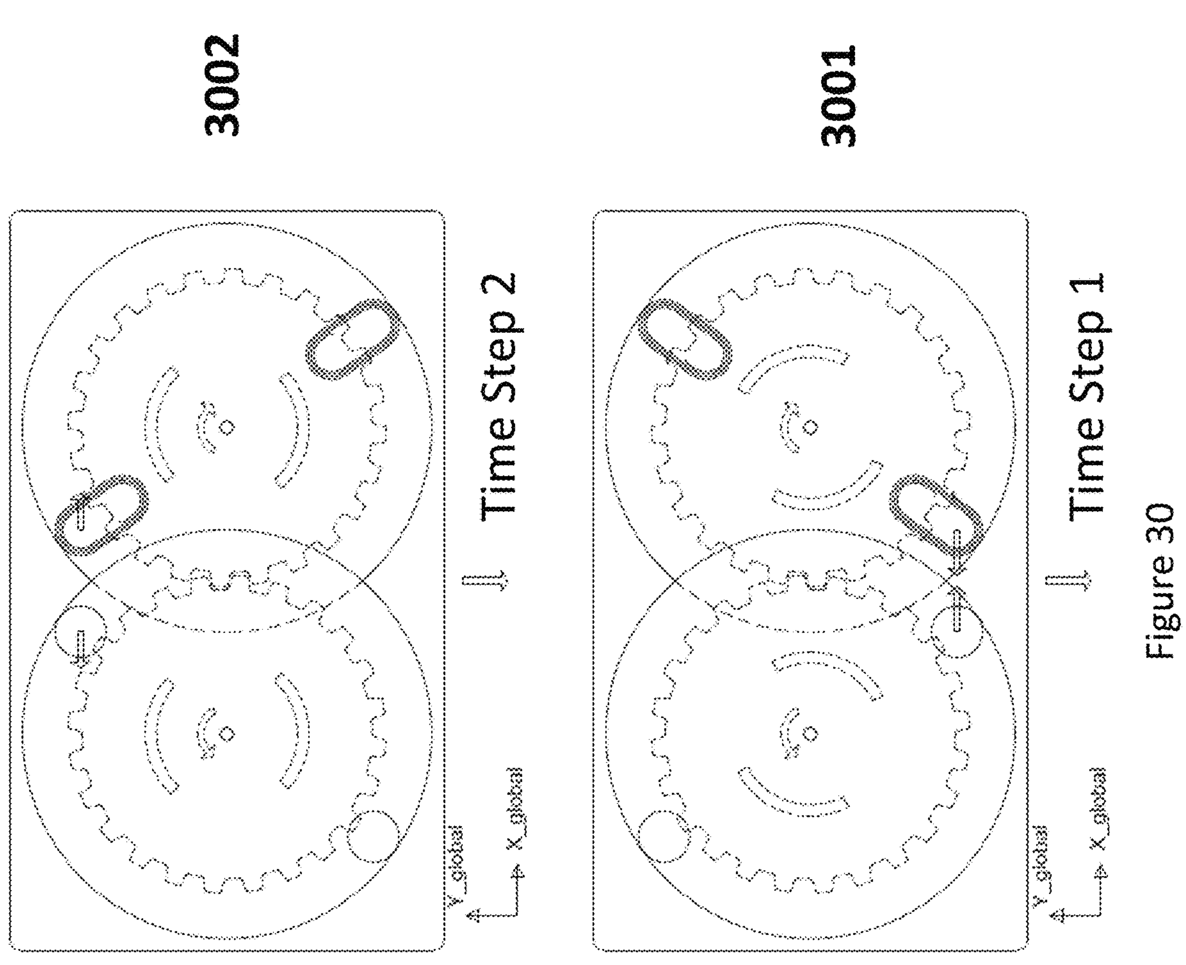
FIG. 30 is a schematic top view of an alternate embodiment of a self-propelling apparatus utilizing a pair of rigid disk rotors one with a set of permanent magnets mounted along its perimeters and the other with a set of electromagnets mounted along its perimeter at two different time steps according to one embodiment of the present disclosure.

FIG. 30 shows a top schematic view of this embodiment during two time steps. Time step one 3001 represents a quarter turn of each rotor in which the electromagnetic coils are attracting the permanent magnets on the neighboring rotor. Time step two 3002 represents the next quarter turn of the rotors in which the current in electromagnetic coils has been reversed and they are repelling the permanent magnets on the adjacent rotor. A plot of the torque created by this action as a function of reference angle theta is shown in FIG. 27. From the previous discussion of pendulum action thrust, having the ability to reverse magnetic force direction will allow the propelling action during a quarter turn to constructively add with next quarter turn of the rotor.

Figure 31:
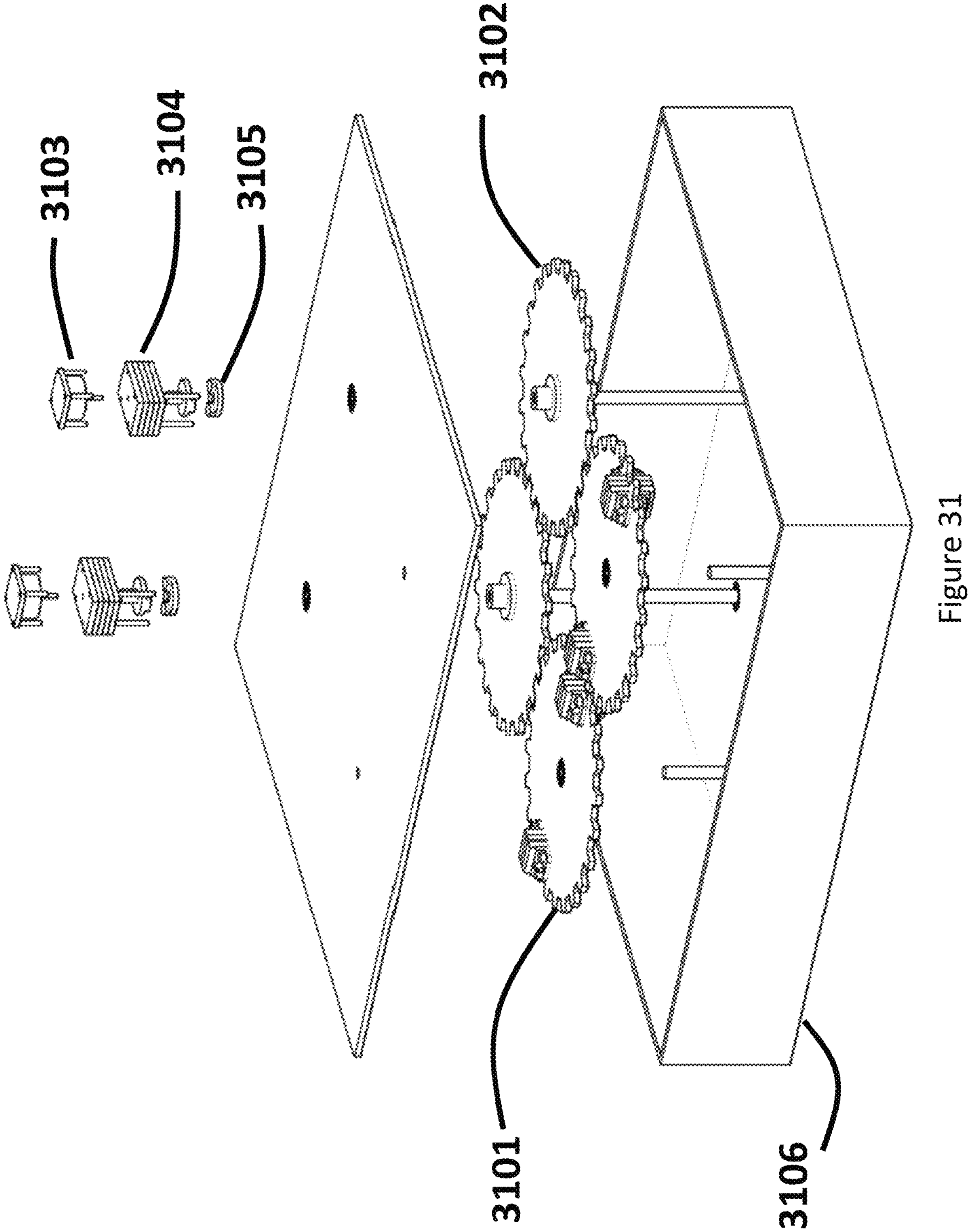
FIG. 31 is an isometric exploded view of an alternate embodiment of a self-propelling apparatus utilizing a pair of rigid disk rotors each with a pair of permanent magnet ferrous material sandwich arrangement mounted along their perimeters with external electrical motors according to one embodiment of the present disclosure.

FIG. 31 shows an exploded view of an alternate rigid rotor with rigid rotor pair embodiment that creates thrust based on a pendulum like behavior. Shown in FIG. 31 are rigid rotor with gear perimeter and permanent magnet sandwich 3101, a pair of gear drive plates 3102, a pair of electric motors 3103, a pair of planetary gear boxes 3104, a pair of spider hubs 3105 and an enclosure 3106.

Figure 32:
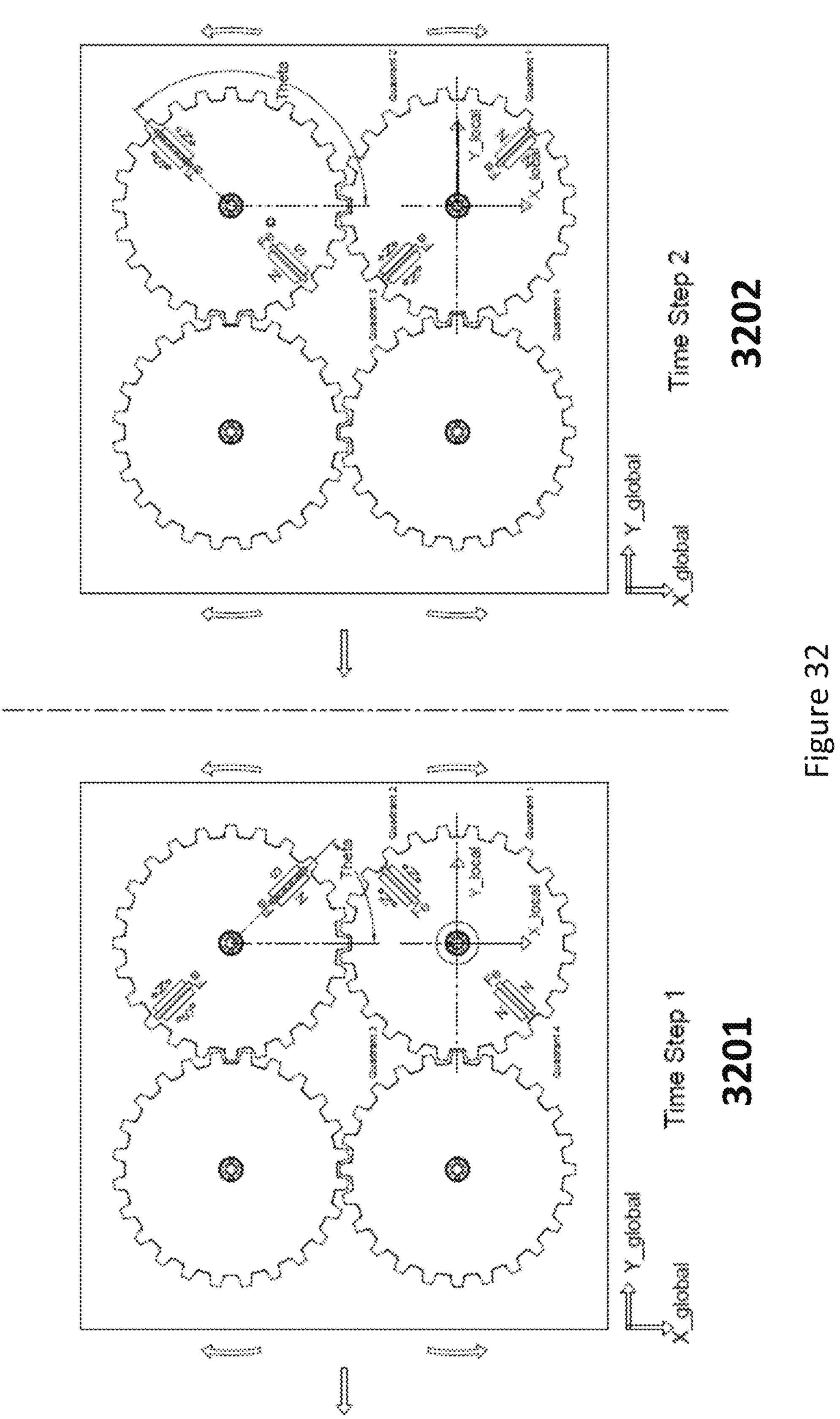
FIG. 32 is a schematic top view of an alternate embodiment of a self-propelling apparatus utilizing a pair of rigid disk rotors each with a pair of permanent magnet ferrous material sandwich arrangements mounted along their perimeters at two different time steps according to one embodiment of the present disclosure.

In this configuration, permanent magnets are mounted back-to-back with a piece of iron or other ferromagnetic material sandwiched in between them. The magnet ferrous material sandwich can be seen in FIG. 14. Referring to FIG. 32, one rotor permanent magnet sandwich has outwardly facing magnetic poles are north and north 3201 while the other rotor outwardly facing magnetic poles are north and south 3202. During operation as the rotors spin the magnets will alternatively attract and repel each other during each quarter turn. A plot of the torque created by this action as a function of reference angle theta is shown in FIG. 27. From the previous discussion of pendulum action thrust, having the as the magnetic force alternatively attracts and repels during each quarter turn the propelling action created by the pendulum like behavior will constructively add during each quarter turn of the rotors. In this embodiment because the magnets are permanent there will be a preferred direction of spin and associated preferred direction of thrust. In other embodiment operations the electric motors may be used in regenerative mode as rotors are spinning.

Figure 33:
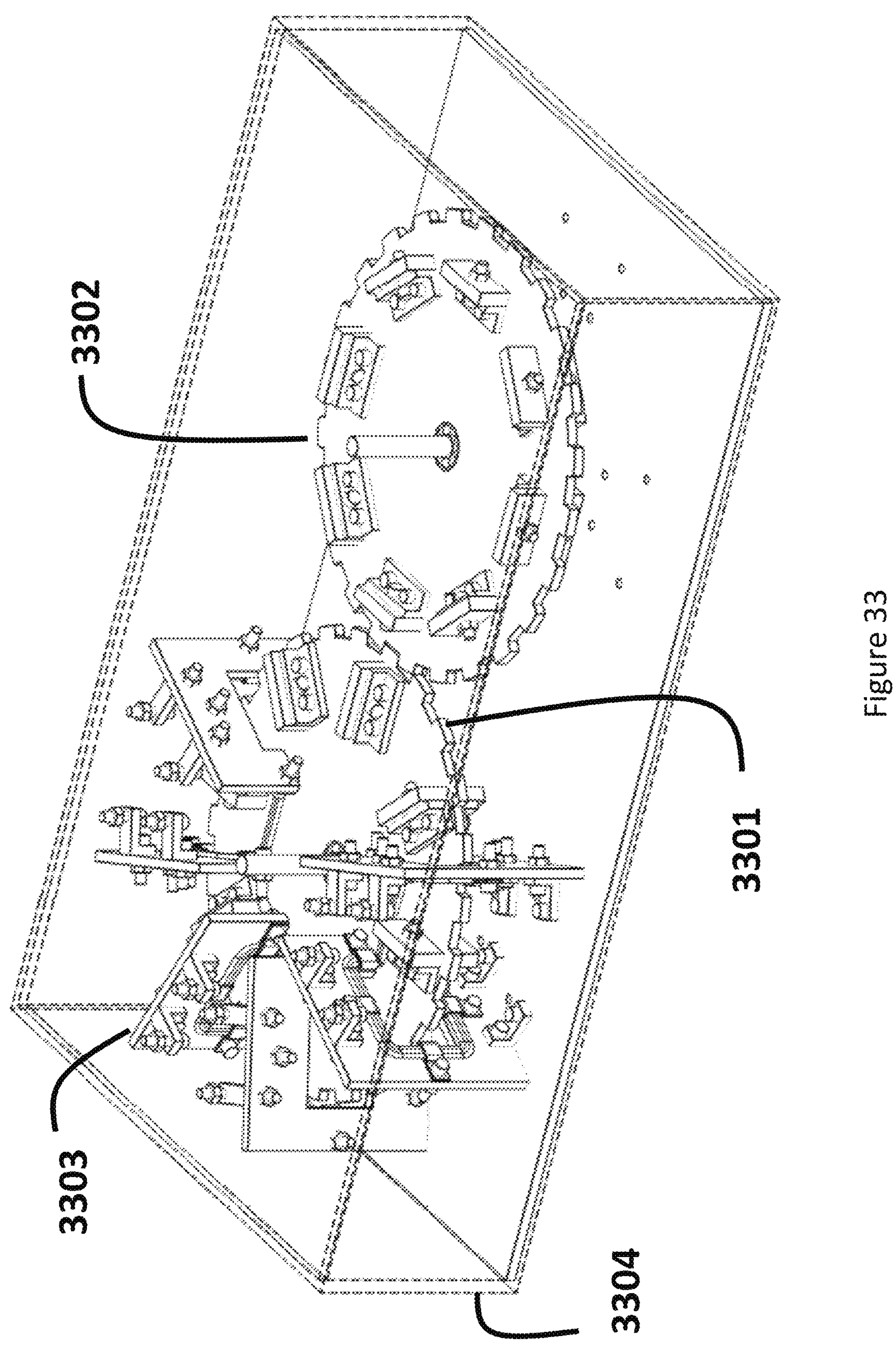
FIG. 33 is an isometric view of an alternate embodiment of a self-propelling apparatus utilizing a pair of rigid disk rotors each with a set of permanent magnets along their perimeters with integral electro-magnetic coils according to one embodiment of the present disclosure.
Figure 34:
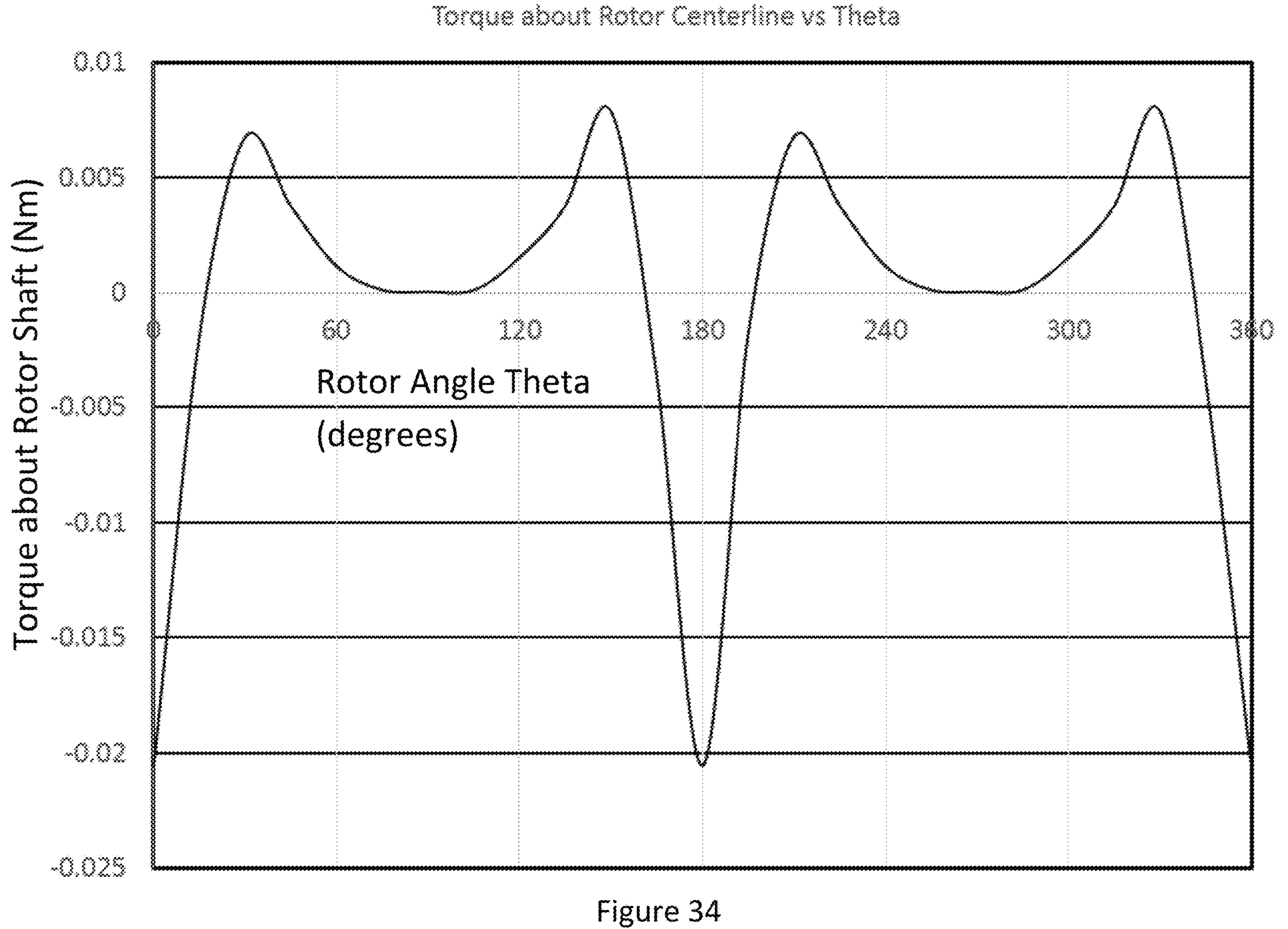
FIG. 34 is a graph of rotor to rotor torque as a function of reference angle theta for rotors with magnets at right angles according to one embodiment of the present disclosure.
Figure 35:
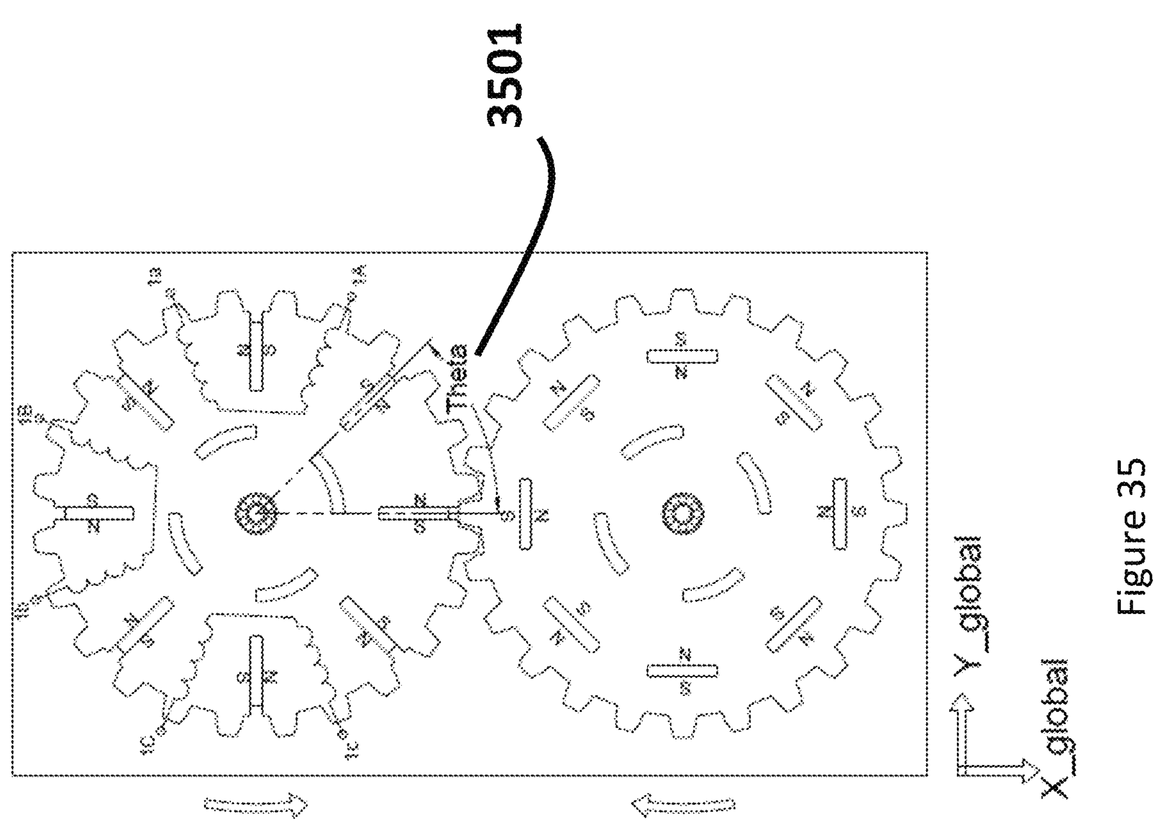
FIG. 35 is a schematic top view of an pair of rigid disk rotors each with a set of permanent magnets mounted along their perimeter according to one embodiment of the present disclosure.

FIG. 33 shows an assembly view of a rigid rotor pair embodiment with integral coils 3303 and permanent magnets mounted along each rotor perimeter. In this embodiment the magnet orientation is not mirrored with their neighboring rotor pair. The rotor pairs magnets are transversely oriented in 3301 and radially oriented 3302. In this figure enclosure 3304 is shown with a dotted outline for clarity. Torque interaction between a pair of magnets oriented in this arrangement during a single rotation is shown in FIG. 34 as a function of rotor angle theta 3501 (shown in FIG. 35). The torque created is not symmetric there will be a preferred direction of spin that will produce a net thrust due to pendulum like action. FIG. 35 shows a schematic top view of this rigid rotor to rigid rotor embodiment illustrating the orientation of the perimeter magnets.

Twisting Torque at Different Rotor Radii Mechanism

Figure 36:
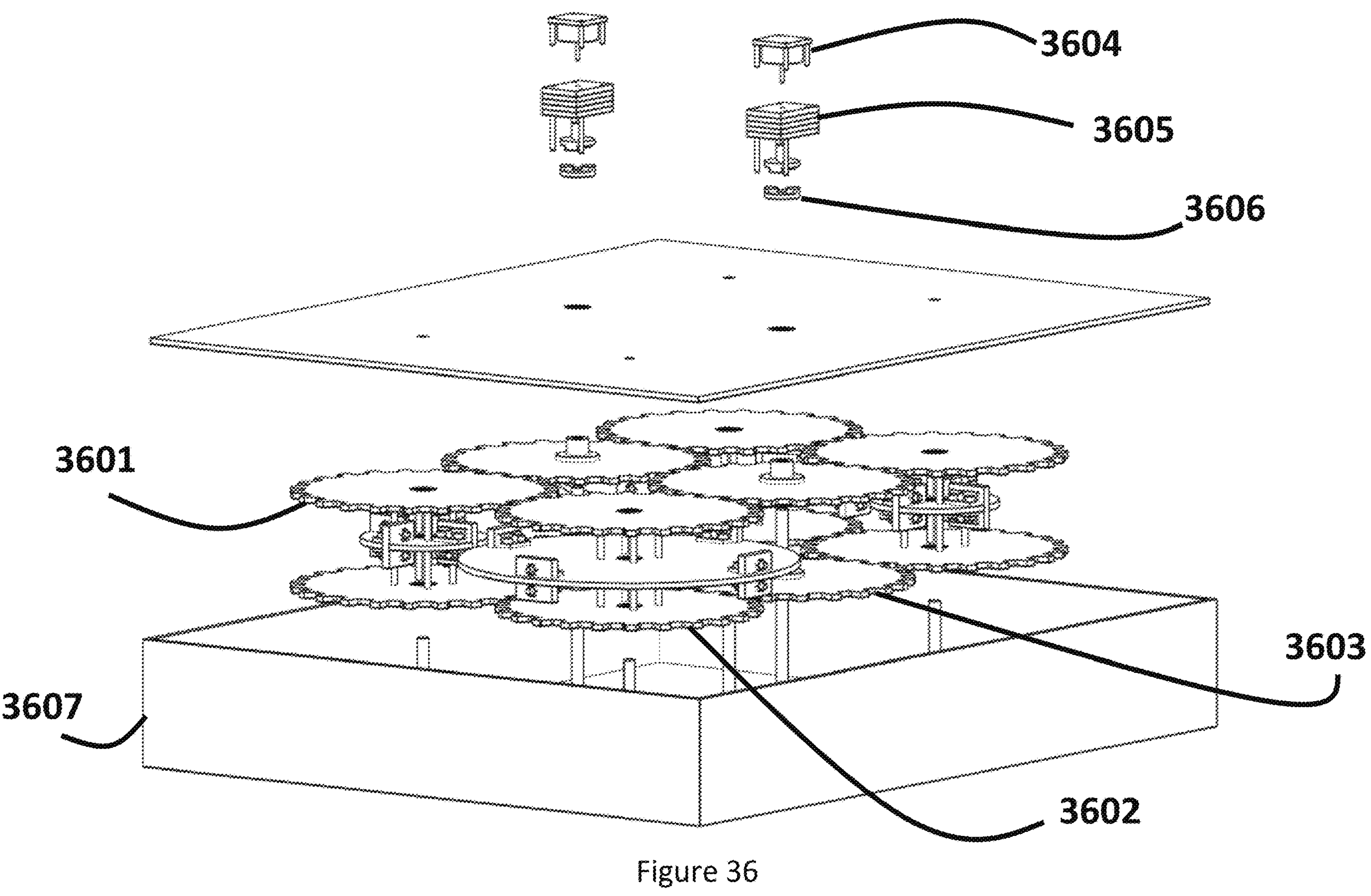
FIG. 36 is an isometric exploded view of an alternate embodiment of a self-propelling apparatus utilizing a set of four rigid disk rotors each with a set of permanent magnets along their perimeters with different radii with external electrical motors according to one embodiment of the present disclosure.
Figure 37:
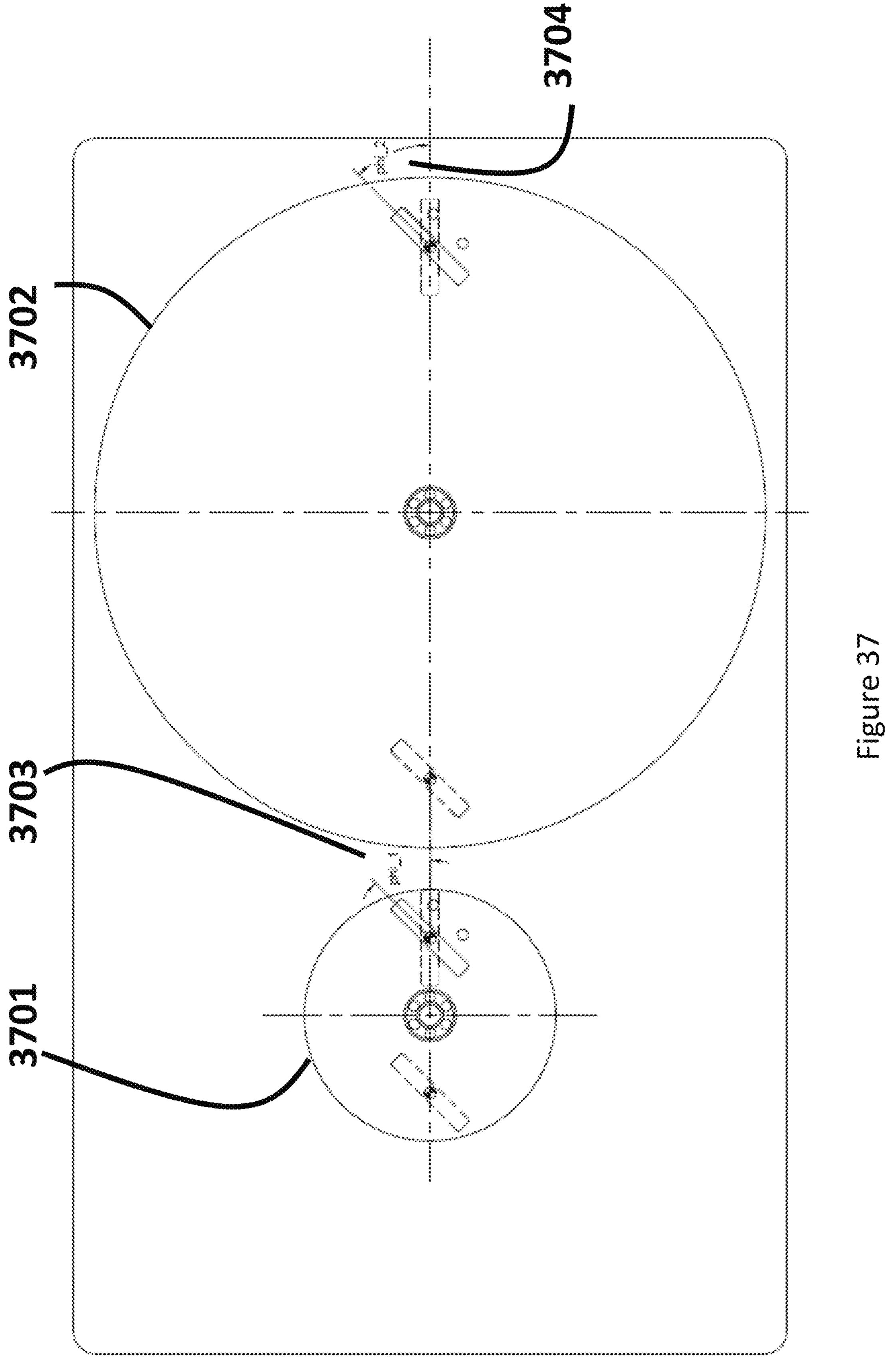
FIG. 37 is a top schematic view of a pair of rigid rotors illustrating magnet orientation angles phi1 and phi2 according to one embodiment of the present disclosure.

An alternate embodiment utilizing permanent magnets mounted at right angles to its pair on its mirrored rotor with different radii is shown in FIG. 36. Illustrated are permanent rotor support plate and gear plate subassembly 3601 and 3602 along with drive gear plates 3603. The drive plates are attached to a shaft driven by electric motors 3604 through a planetary gear box 3605 and spider hub joint 3606. This embodiment highlights another propulsion mechanism created by a twisting torque between interacting magnet pairs. An enclosure 3607 is shown in FIG. 36 as well. A schematic top view of rotors of different radii is shown in FIG. 37. For illustration purposes each rotor has a pair of permanent magnets each with an orientation about their own center of mass. This orientation is defined by angle phi1 3703 for rotor 1 3701 and angle phi2 3704 for rotor 2 3702.

Figure 38:
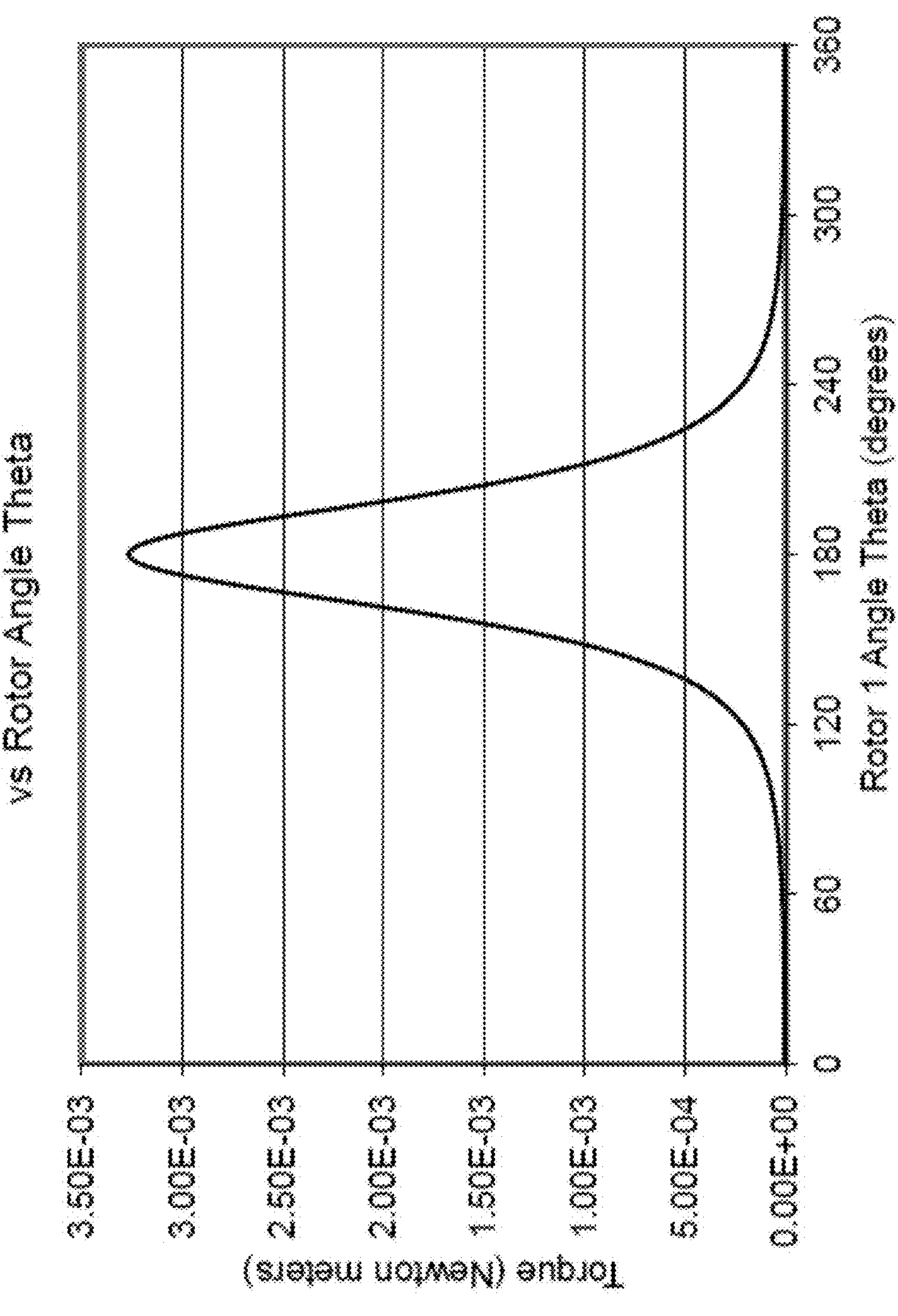
FIG. 38 is a graph of twisting torque about a rotor 1 perimeter permanent magnet's center of mass at angle phi1 due toa rotor2 permanent magnet at angle phi2 according to one embodiment of the present disclosure.
Figure 39:
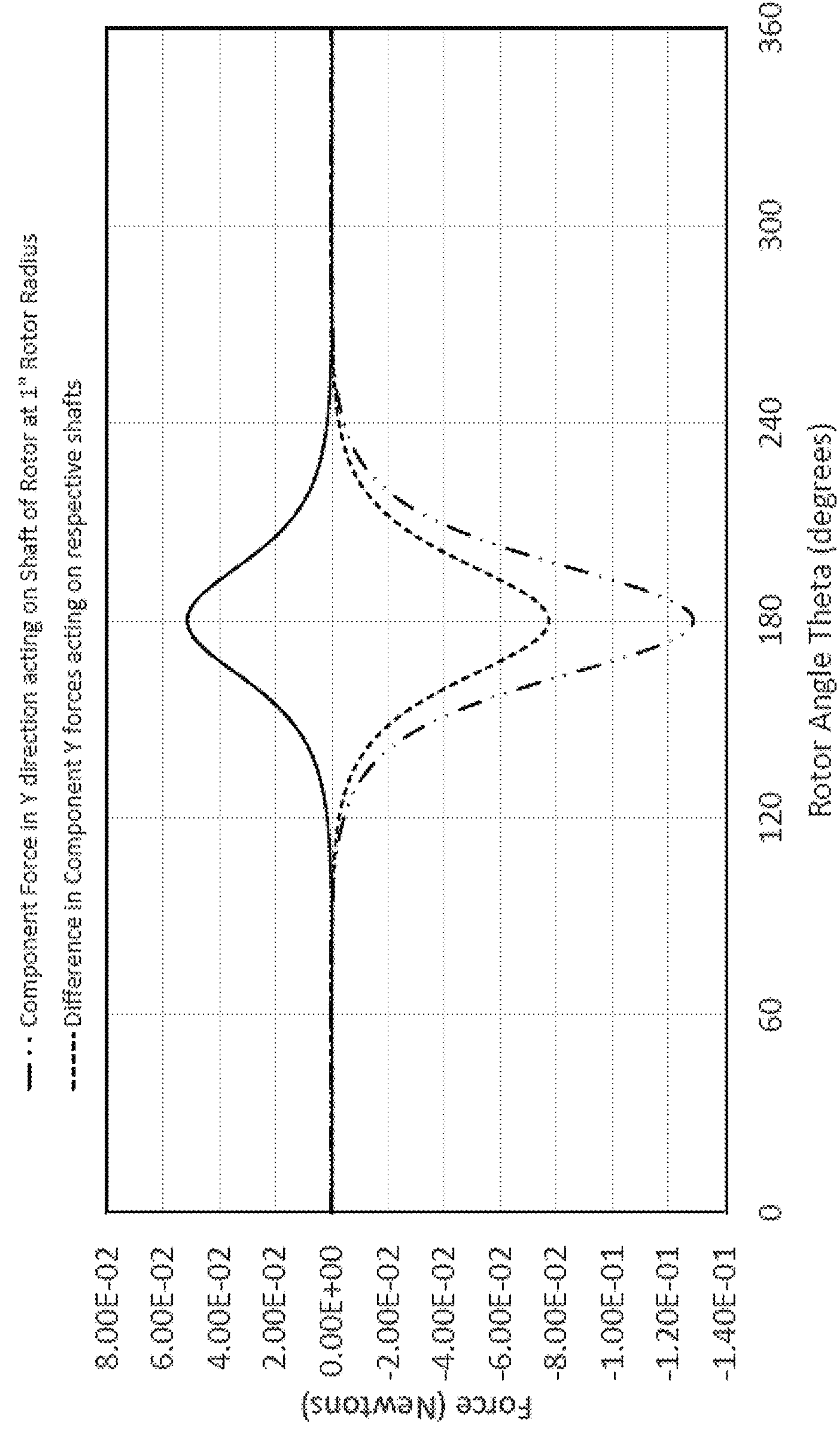
FIG. 39 is a graph of component y forces acting on rotor shafts with rotors of different radii along with the difference in their component y forces according to one embodiment of the present disclosure.
Figure 40:
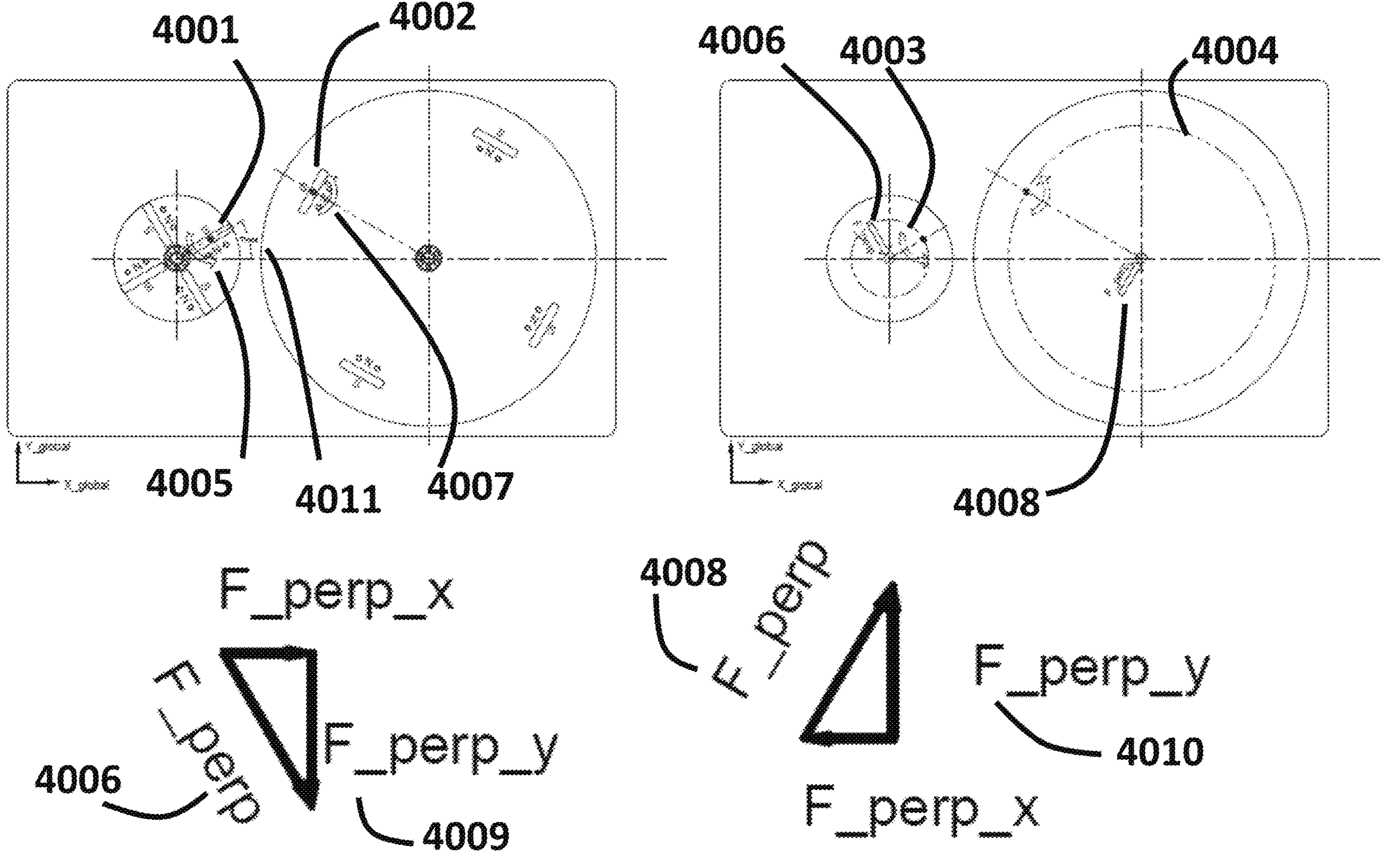
FIG. 40 is a free body diagram of rotors with different radii with magnets mounted at different orientation angles illustrating twisting torques and associated forces acting on their respective shafts according to one embodiment of the present disclosure.

FIG. 40 is a schematic top view illustrating forces and torques acting between two rigid rotors of different radii. Shown in FIG. 40 are Rotor 1 Magnet 3 4001 and Rotor 2 Magnet 1 4002. FIG. 38 shows a plot of the magnitude of the twisting torque acting on Rotor 1 Magnet 3 4001 due to Rotor 2 Magnet 1 4002 as a function of rotor angle theta 4011. The center of mass of Rotor 1 Magnet 3 is mounted at a radius of r1 4003 from its rotor shaft center line while Rotor 2 magnet 1 center of mass is mounted at a radius of r2 4004 from its rotor shaft center line. The twisting torque of each magnet about its own center of mass will create a force acting on their respective shafts perpendicularly the vector radius from the rotor center to the magnet center of mass. For Rotor 1 the twisting torque is shown as 4005 and its associated perpendicular force as 4006. For Rotor 2 the twisting torque is shown as 4007 and its associated perpendicular force as 4008. For this configuration rotor 1 phi1 is 180 degrees and rotor 2 phi2 is 90 degrees. The twisting torque on rotor 1 is positive or counterclockwise while the twisting torque on rotor 2 magnets are negative or clockwise. The perpendicular force will vary in direction and magnitude as the rotors spin. The y components of the perpendicular forces are shown in FIG. 40 as 4009 for Rotor 1 magnets and 4010 for rotor 2 magnets. While the magnitudes of the twisting torque will be equal the magnitude of the perpendicular forces will scale depending on radius of each magnets center of mass Magnet Twisting Torque=Magnet center of mass radius*perpendicular force FIG. 39 shows the magnitude of the y component of each perpendicular force acting on each respective rotor along with the difference in magnitude between y components force of rotor 1 and rotor 2. This graph is for a pair of rotors where center of mass of Rotor 1 Magnet 3 is mounted at a radius of roughly 1 inch 4003 from its rotor shaft center line while Rotor 2 magnet 1 center of mass is mounted at a radius of roughly 2.5 inches 4004 from its rotor shaft center line. Because rotor 1 has a smaller radius its component y magnitude is larger than rotor 2 and there is a net force acting in the negative y direction. The embodiment shown in FIG. 36 creates a matched net force in the −y direction on the second pair of interacting rotors. These matched y-component forces constructively add together. During operation each rotating disk has matching counter rotating disk which along with counter rotating electric motors results will cancel torques throughout the device.

Because the magnets are permanent and the orientation if fixed during its operation this embodiment will have a preferred direction of thrust.

Tug of War at Right Angles Thrust Mechanism

Figure 41:
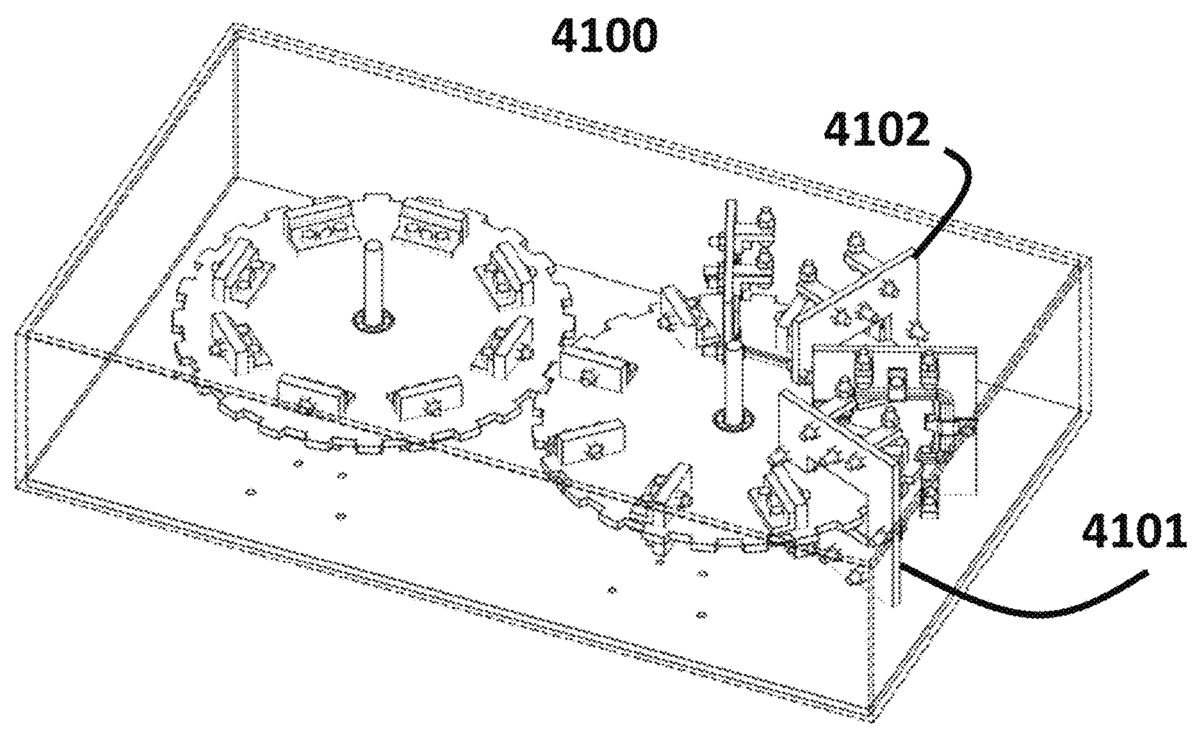
FIG. 41 is an isometric view of an alternate embodiment of a self-propelling apparatus with a pair of rigid disk rotors each with a set of permanent magnets along their perimeters with integral electromagnetic coils around one rotor in configuration A to illustrate "tug of war at right angles" thrust mechanism according to one embodiment of the present disclosure.
Figure 42:
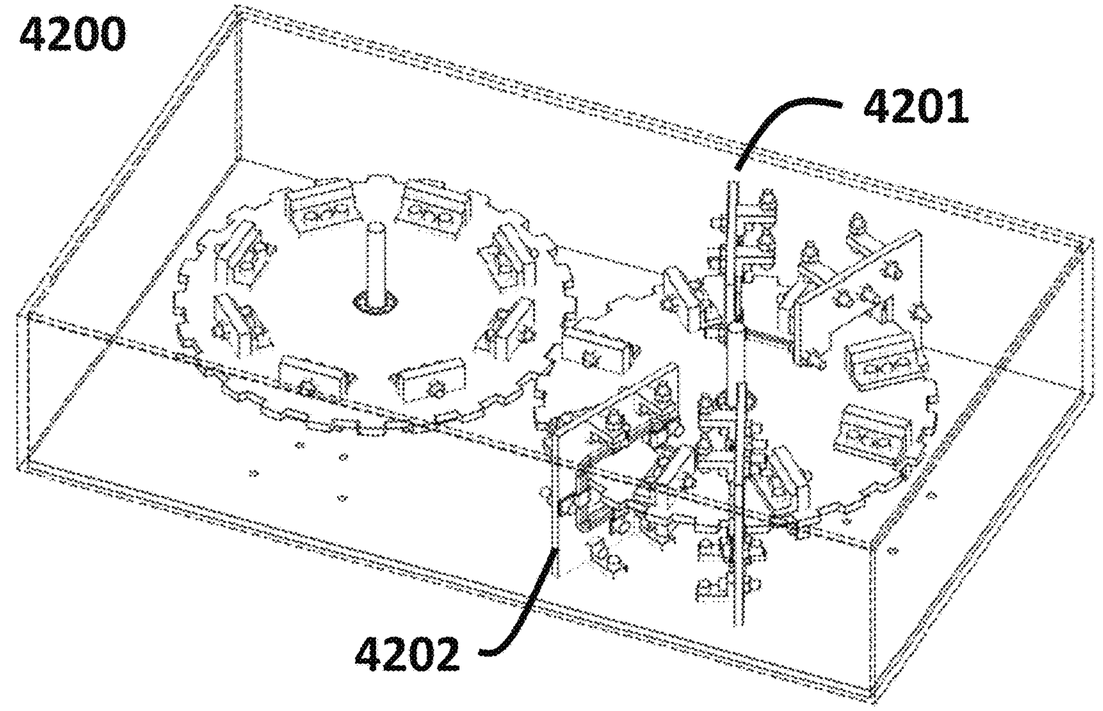
FIG. 42 is an isometric view of an alternate embodiment of a self-propelling apparatus with a pair of rigid disk rotors each with a set of permanent magnets along their perimeters with integral electromagnetic coils around one rotor in configuration B to illustrate "tug of war at right angles" thrust mechanism according to one embodiment of the present disclosure.
Figure 43:
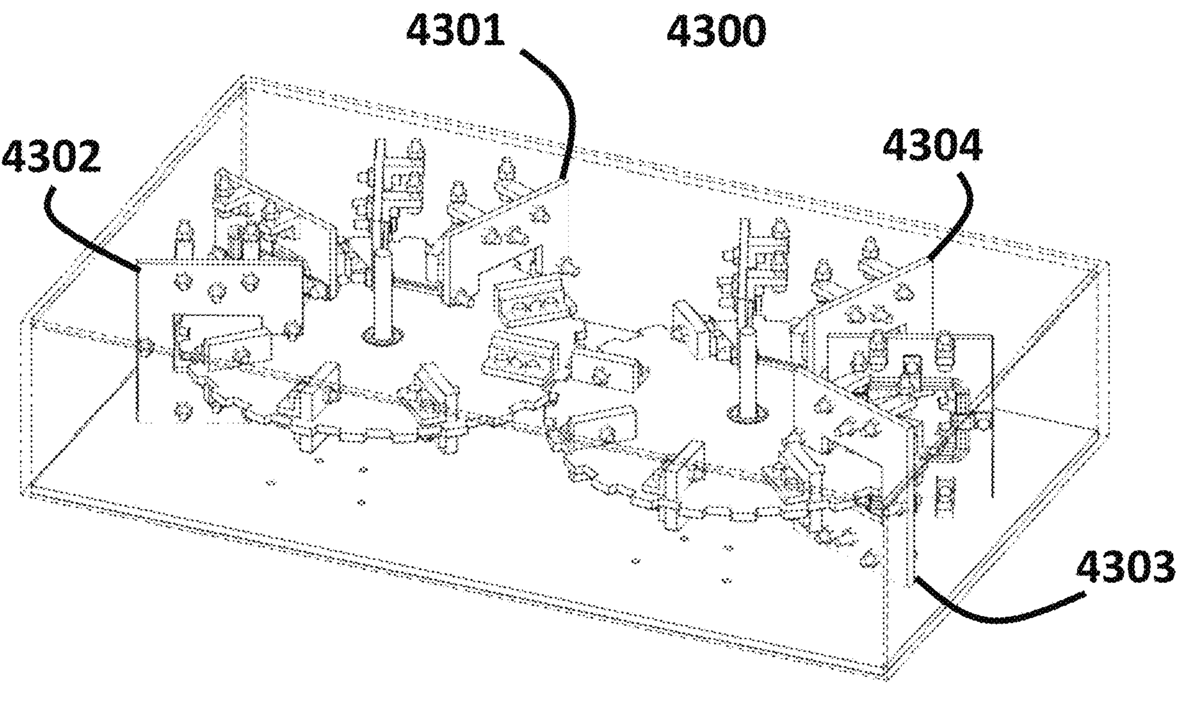
FIG. 43 is an isometric view of an alternate embodiment of a self-propelling apparatus with a pair of rigid disk rotors each with a set of permanent magnets along their perimeters with integral electromagnetic coils around one rotor in configuration A1 to illustrate "tug of war at right angles" thrust mechanism according to one embodiment of the present disclosure.
Figure 44:
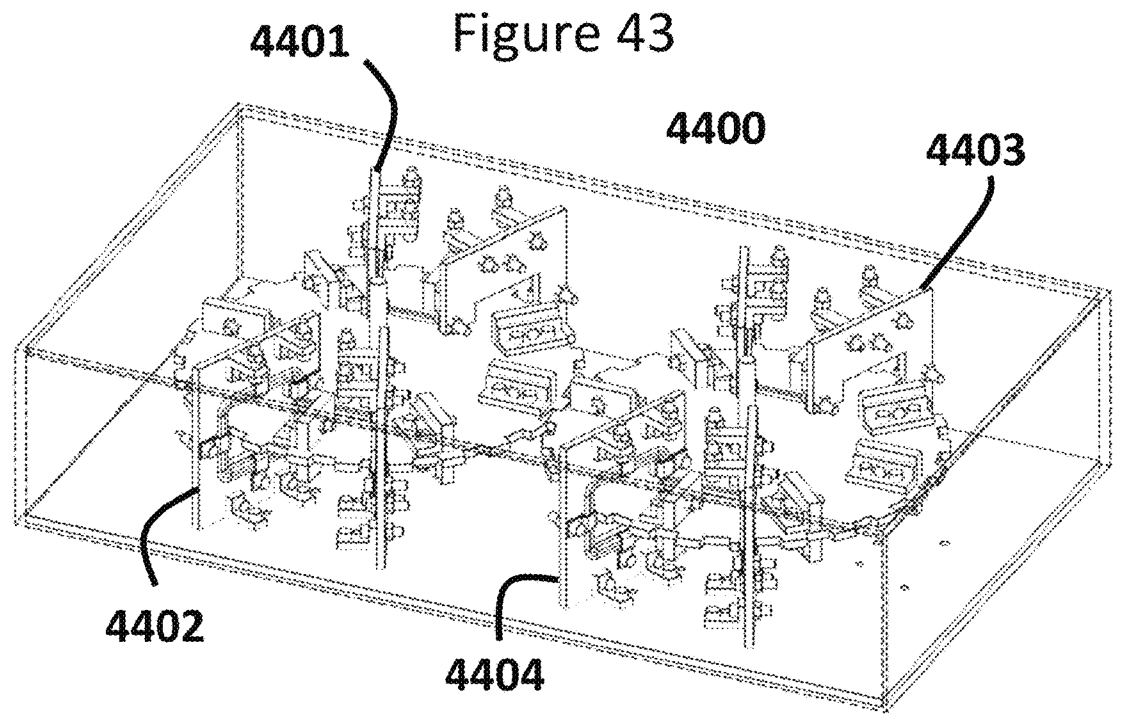
FIG. 44 is an isometric view of an alternate embodiment of a self-propelling apparatus with a pair of rigid disk rotors each with a set of permanent magnets along their perimeters with integral electromagnetic coils around one rotor in configuration B1 to illustrate "tug of war at right angles" thrust mechanism according to one embodiment of the present disclosure.

Embodiments of the rigid rotor to rigid rotor configuration are shown in FIGS. 41-44 to illustrate the tug of war at right angles thrust mechanism created between rotor to rotor magnet interaction and integral electro-magnetic coil rotor interaction. In FIG. 41 two rigid rotors with magnets oriented at different angles are shown along with two integral coils are shown at positions 0 degrees 4101 and 90 degrees 4102. In FIG. 42 two rigid rotors with magnets oriented at different angles are shown along with two integral coils are shown at positions 90 degrees 4201 and 270 degrees 4202. In FIG. 43 two rigid rotors with magnets mirrored on both rotors are shown along with two integral coils are shown at positions 90 degrees 4301 and 180 degrees 4302 around rotor 1 and 0 degrees 4303 and 90 degrees 4304 around rotor 2. In FIG. 44 two rigid rotors with magnets mirrored on both rotors are shown along with two integral coils are shown at positions 90 degrees 4401 and 270 degrees 4402 around rotor 1 and 90 degrees 4403 and 270 degrees 4404 around rotor 2

Figures 45, 46:
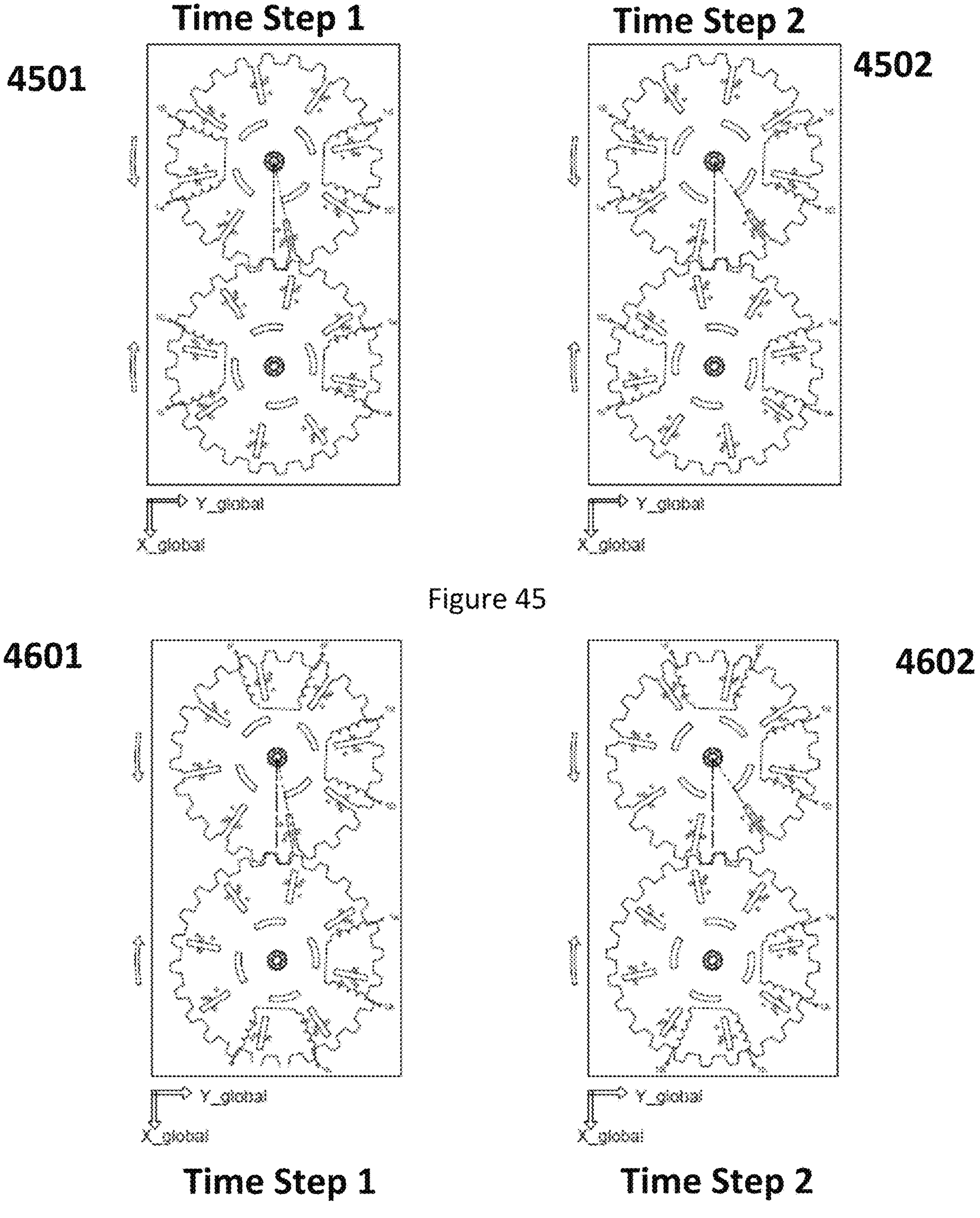
FIG. 45 is a schematic top view of embodiment shown in FIG. 44 at two different time steps according to one embodiment of the present disclosure.
FIG. 46 is a schematic top view of embodiment shown in FIG. 43 at two different time steps according to one embodiment of the present disclosure.

A top view schematic of the embodiment 4400 is seen in FIG. 45 during time step 1 as 4501 and time step 2 as 4502. The change in rotation between these two time steps is denoted by rotor 1 reference angle theta.

A top view schematic of the embodiment 4300 is seen FIG. 46 during time step 1 as 4601 and time step 2 as 4602. The change in rotation between these two time steps is denoted by rotor 1 reference angle theta.

Figure 47:
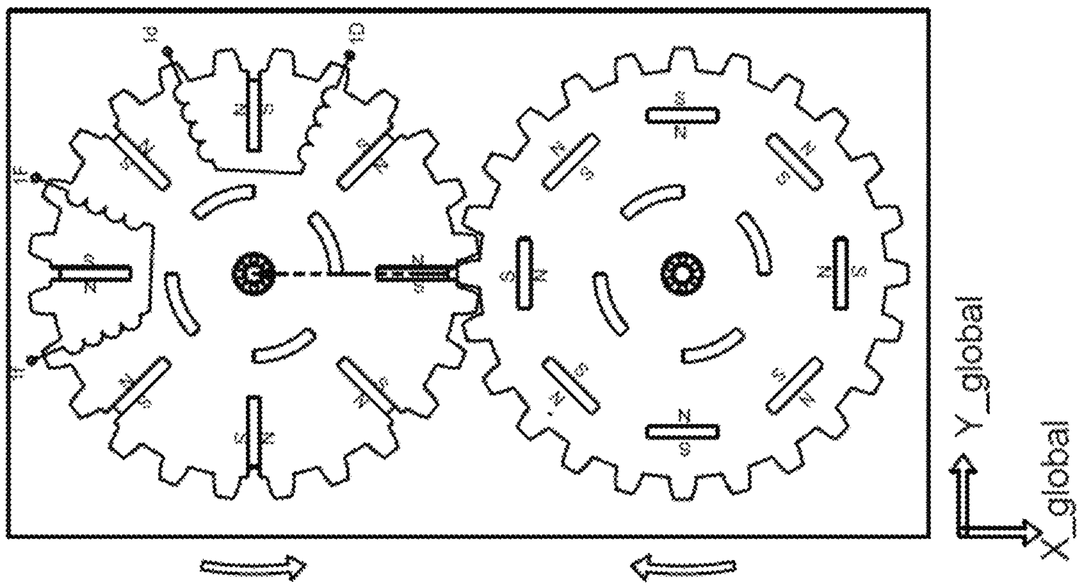
FIG. 47 is a schematic top view of embodiments shown in FIG. 41 and FIG. 42 according to one embodiment of the present disclosure.
Figure 47:
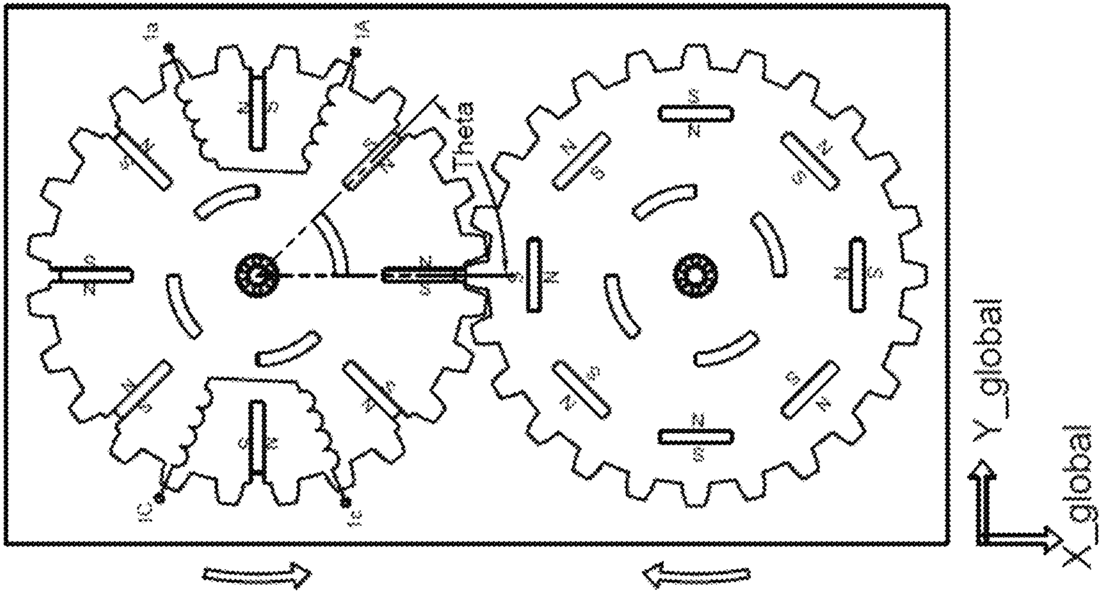

A top view schematic of the embodiment 4200 is shown in FIG. 47 as 4701.

A top view schematic of the embodiment 4100 is shown in FIG. 47 as 4702

Figure 48:
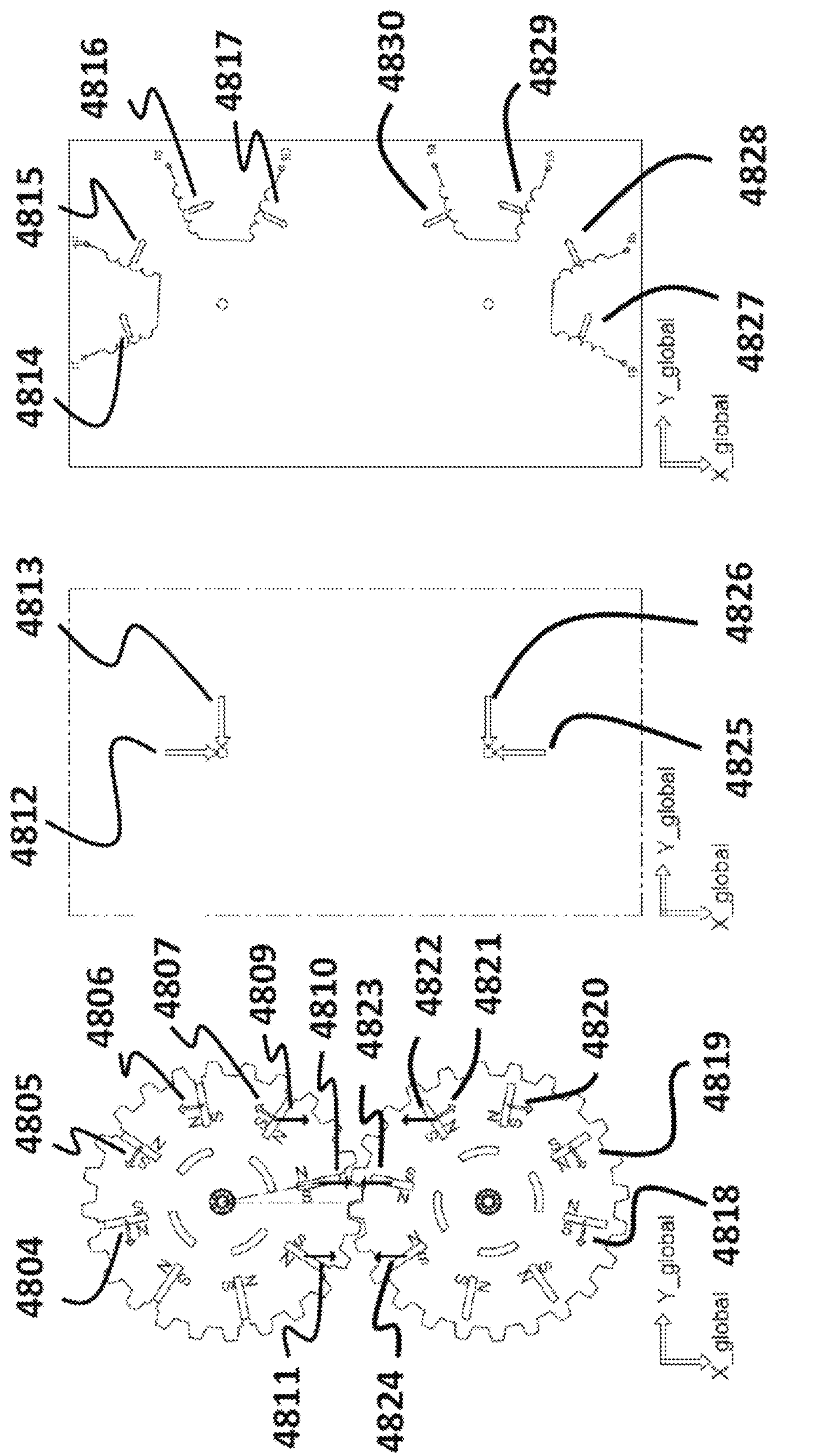
FIG. 48 is a free body diagram of embodiment shown in FIG. 43 according to one embodiment of the present disclosure.

FIG. 48 shows the free body diagram of configuration 4300 during time step 1 4601. The direction of force acting on rotor 1 magnets due to electromagnetic coils are shown as 4804, 4805, 4806 and 4807 while the action against the electromagnetic coils due to rotor 1 magnets are shown as 4814, 4815, 4816 and 4817. The magnitude of the force per magnet and coil is F_mag_i_coil j. The direction of force acting on rotor 2 magnets due to electromagnetic coils are shown as 4818, 4819, 4820 and 4821 while the action against the electromagnetic coils due to rotor 2 magnets are shown as 4827, 4828, 4829 and 4830. The direction of force acting on rotor 1 magnets due to rotor 2 magnets are shown as 4809, 4810 and 4811 while the direction of force acting on rotor 2 magnets due to rotor 1 magnets are shown as 4822, 4823 and 4824. The magnitude of the magnet to magnet forces per magnet is F_mag_i_mag_j. There will be a torque created about each rotor shaft because of the magnet to magnet force interaction. The torque about rotor 1 axis can be written as $$\text{Torque\_rotor1}=\Sigma \text{radius}\_mag \times F\_mag\_i\_mag\_j$$

Figure 50:
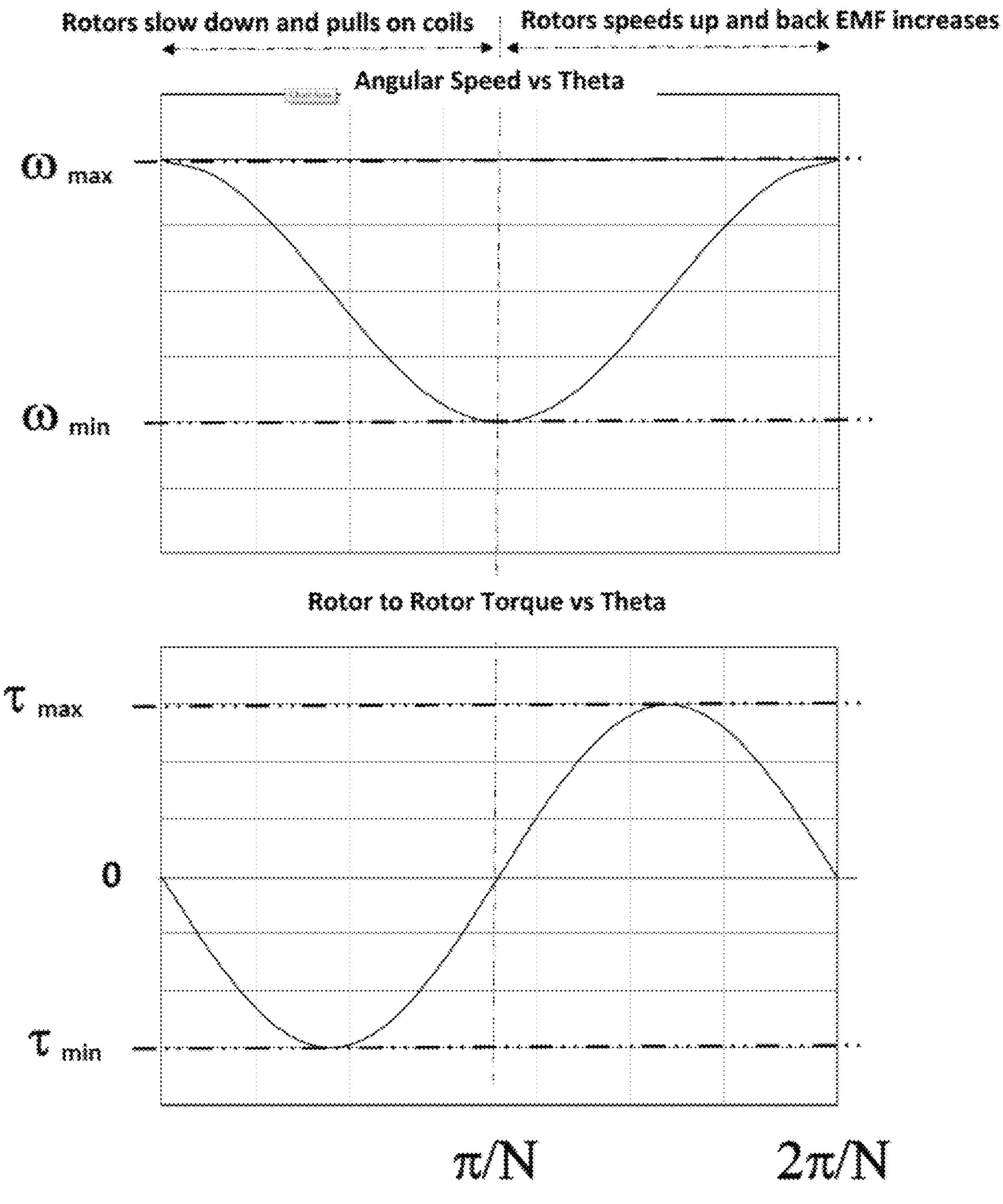
FIG. 50 is a set of plots showing rotor angular speed and rotor to rotor torque a function of reference angle theta according to one embodiment of the present disclosure.

The graph of torque created about the rotor 1 central shaft as a function of theta is shown in FIG. 50B for eight Neodymium Boron magnets grade N42 strength per rotor with dimension one inch tall by one inch wide by 3/16 inches thick each mounted with orientations shown in FIG. 46. From this graph it is shown that during a portion of each rotation the torque will act against the direction of rotation and for a portion it will act in the direction of rotation. When the rotor to rotor torque due to magnet to magnet interaction acts against the rotor spinning direction the rotor will decelerate. FIG. 50A shows the rotor speed as a function of rotor 1 reference angle theta. During this deceleration the magnets of each rotor will pull on the electromagnetic coils they are interacting with. The pulling force will be evenly distributed among the electromagnetic coils. The force per coil for rotor 1 can be written as $$\text{Force\_pulling}=(\text{Torque\_rotor1}/\text{radius\_mag})/\text{number of coil interactions}$$

The rotor 1 magnet to rotor 2 magnet forces are in the x direction and will be carried by the shafts shown as 4812 and 4825. The net force between the coils mounted at 90 degrees and rotor 1 and rotor 2 magnets will also be in the x direction. They will also be carried by shafts 4812 and 4825. The net force acting in the y direction due to electromagnetic coil action on the rotor magnets is shown by 4813 and 4826. The magnitude of the electromagnetic force on rotor 1 is $$F\_\text{shaft1\_net}=\Sigma F\_\text{mag}\_i\_\text{coil}\_j$$

The net force between the coils mounted at 0 degrees and 180 degrees are in the y-direction and will be carried by the enclosure top and bottom plate and are shown by 4814, 4815, 4827 and 4828. The magnitude of the force on the coils will be $$\text{Force\_on\_coils}=F\_\text{mag}\_i\_\text{coil}\_j+\text{Force\_pulling}$$

Since these forces are at right angles the force in the y direction will constructively add for both rotor coils while the force in the x direction will cancel out. This unbalanced force in the y direction will generate thrust which will be transmitted to anybody (ie. Spacecraft) attached to the enclosure. When the rotor 1 magnet to rotor 2 magnet attracting forces act to accelerate rotors the energy shown as 4602 time step 2 in FIG. 46 is transmitted onto the coils as an increase in back emf.

Figure 49:
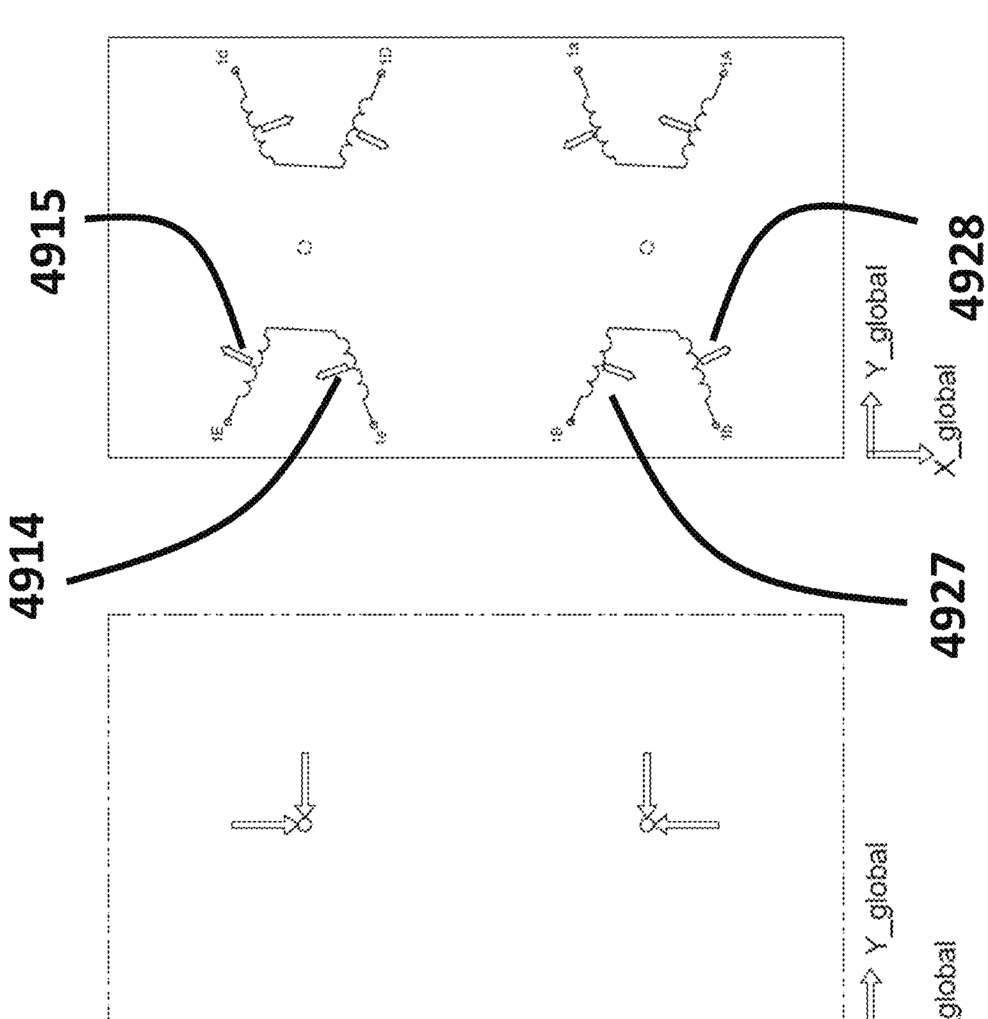
FIG. 49 is a free body diagram of embodiment shown in FIG. 44 according to one embodiment of the present disclosure.
Figure 49:
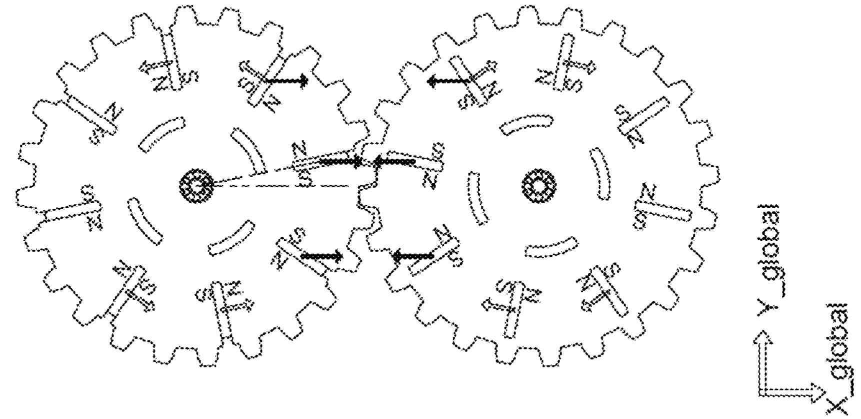

FIG. 49 shows the free body diagram of configuration 4400 during time step 1 4501. The free body elements of configuration 4400 are similar to configuration 4300. The important difference is the position of coils at 270 degrees around both rotors vs 0 deg and 180 degrees. This difference results in the action against the electromagnetic coils due to rotor 1 magnets shown as 4914 and 4915 and rotor 2 magnets shown as 4927 and 4928 being in primarily in the x direction. The tug of war at right angles pulling effect will not increase thrust in configuration 4400.

Figure 51:
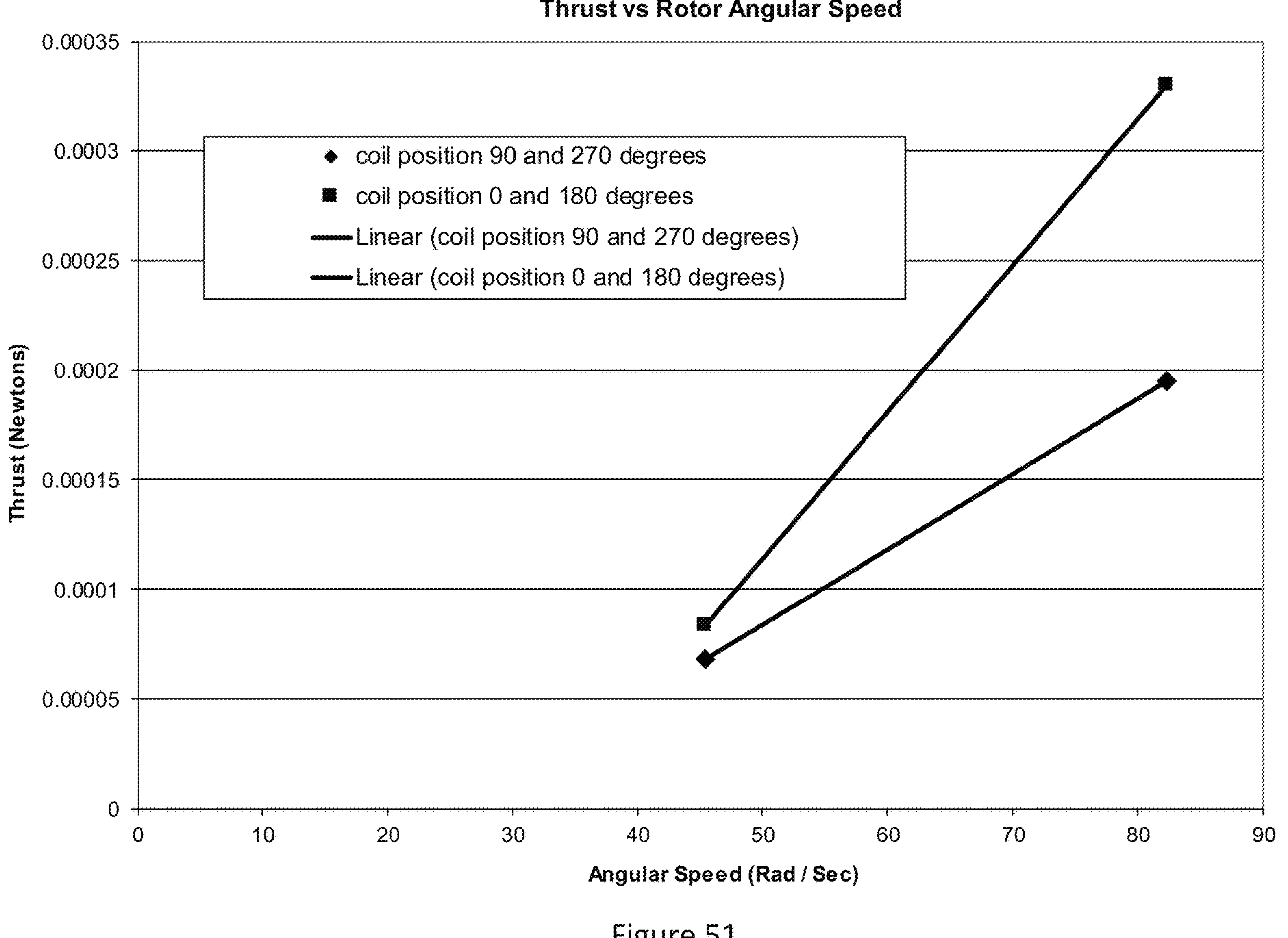
FIG. 51 is a plot of thrust vs rotor angular speed for embodiments shown in FIG. 43 and FIG. 44 according to one embodiment of the present disclosure.
Figure 52:
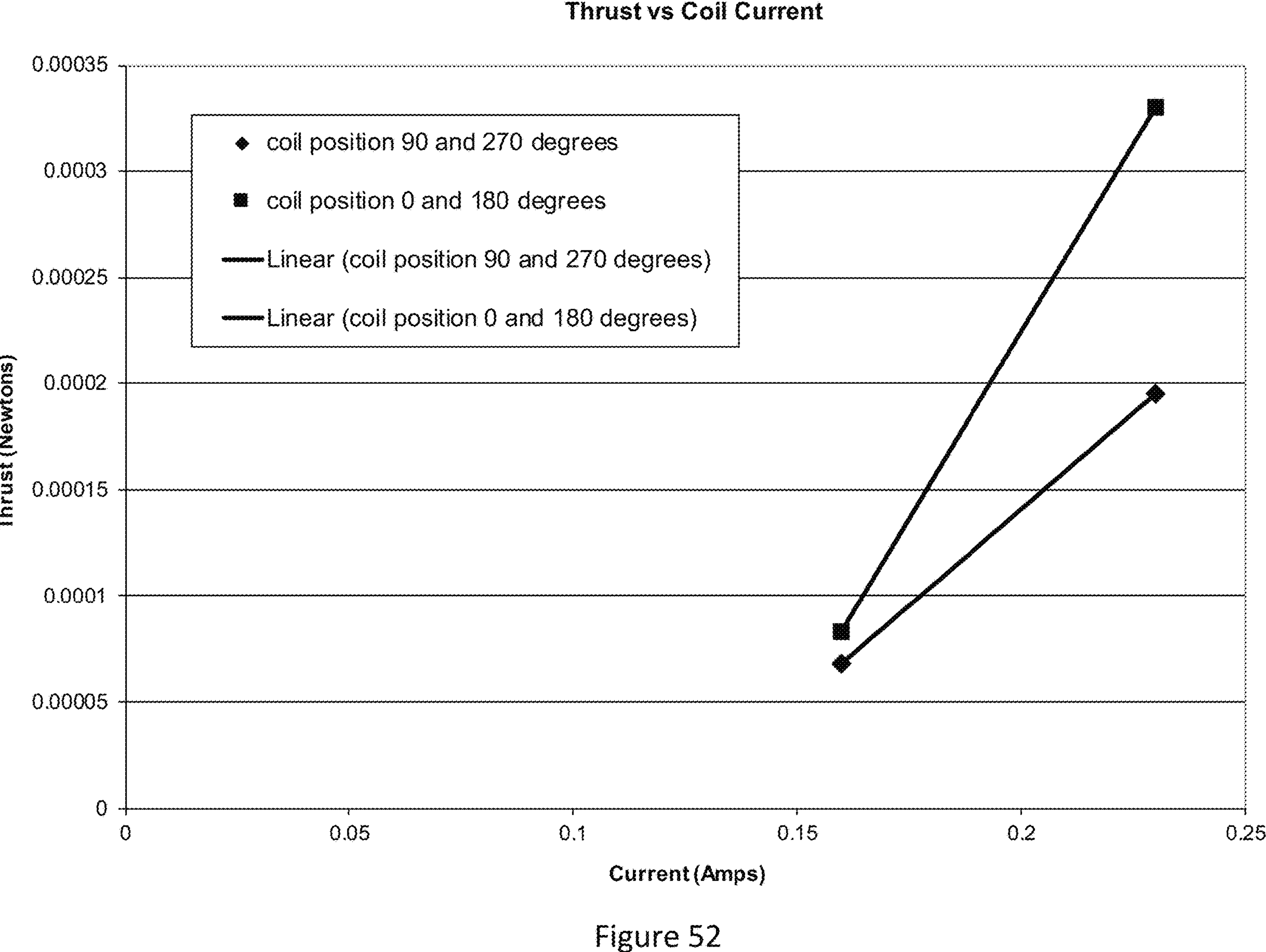
FIG. 52 is a plot of thrust vs electromagnetic coil current for embodiments shown in FIG. 43 and FIG. 44 according to one embodiment of the present disclosure.

The direction and magnitude of thrust generated is controllable by changing the direction of rotor spinning direction and the rotor angular speed. FIG. 51 shows a graph relating the rotor angular speed in radians per second to the measured thrust in Newtons for configurations 4300 and 4400 shown in FIGS. 43-44. FIG. 52 shows a graph relating the coil current to thrust for the same two configurations 4300 and 4400. Alternate embodiments can employ different coil wire gauge and length and or voltage power and speed control settings to adjust propulsion unit thrust range. During operation control algorithms can leverage speed control settings to achieve desired maneuvers.

Thrust Generation—Friction as Traction Mechanism Embodiments

Figure 53:
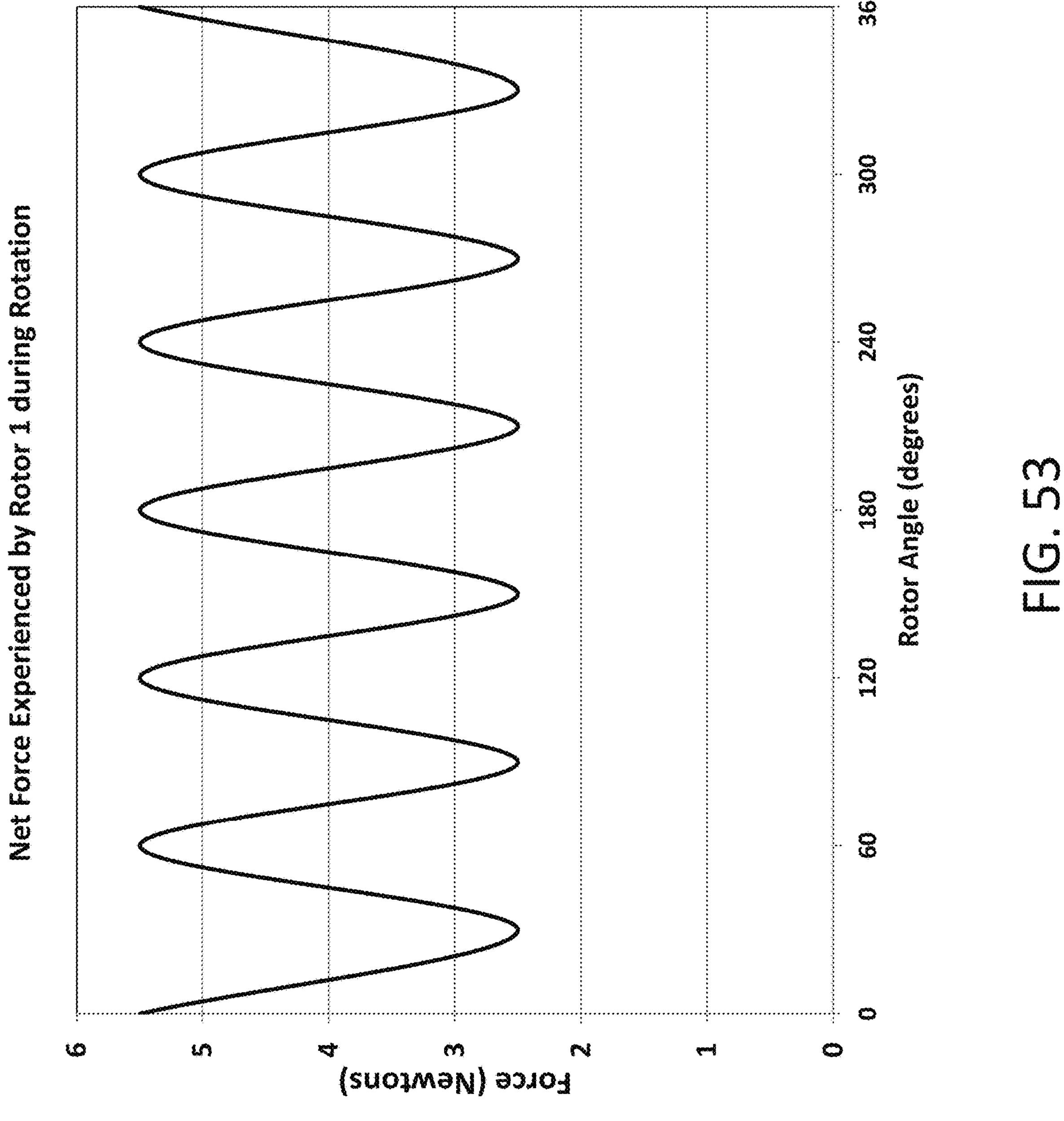
FIG. 53 is a plot of rotor 1 load due to attraction forces with rotor 2 vs reference angle theta for embodiments shown in FIG. 43 and FIG. 44 according to one embodiment of the present disclosure.
Figure 54:
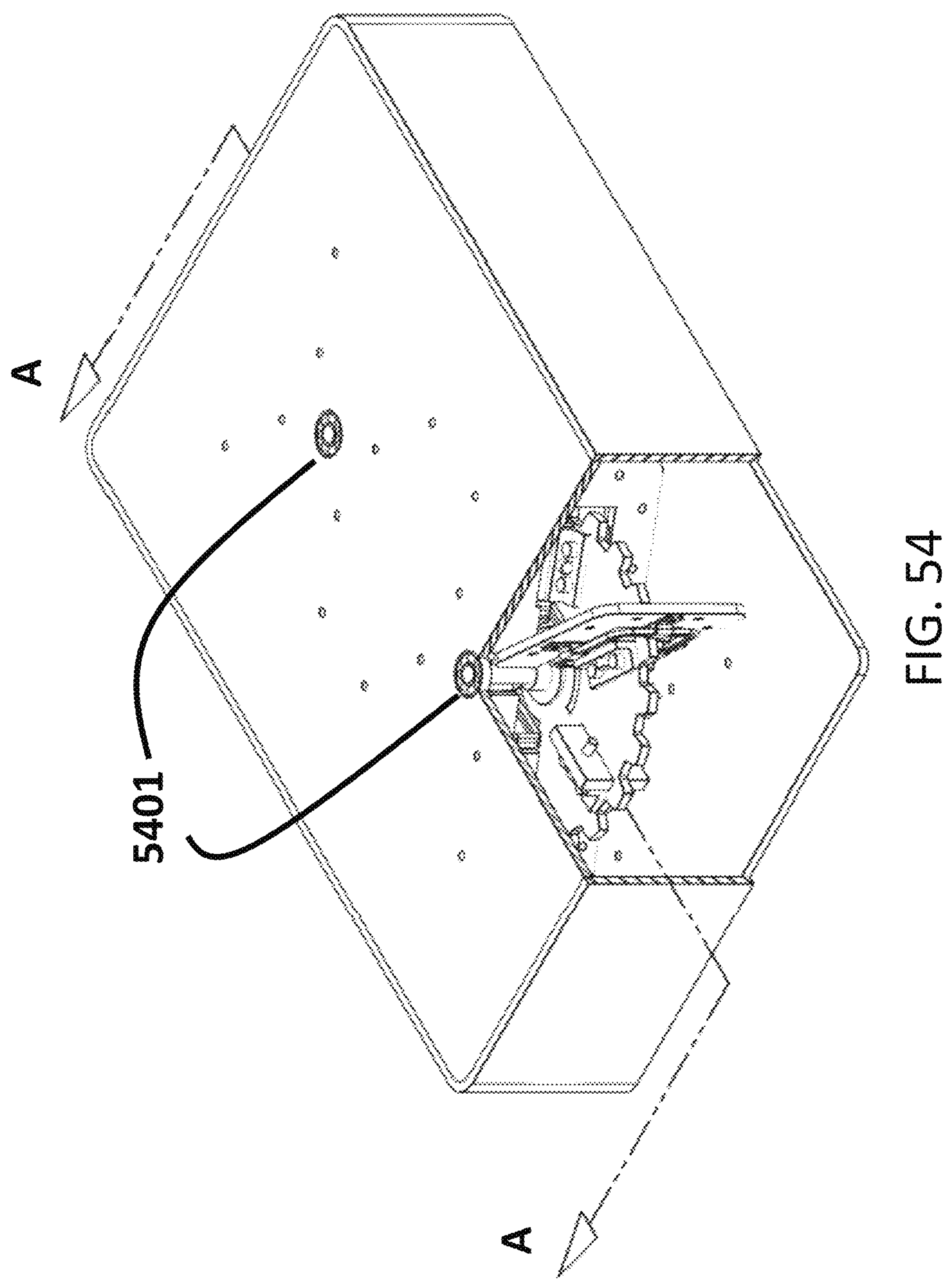
FIG. 54 is an isometric view of an alternate embodiment with ball bearing mounted to top and bottom enclosure plates according to one embodiment of the present disclosure.
Figures 55, 56:
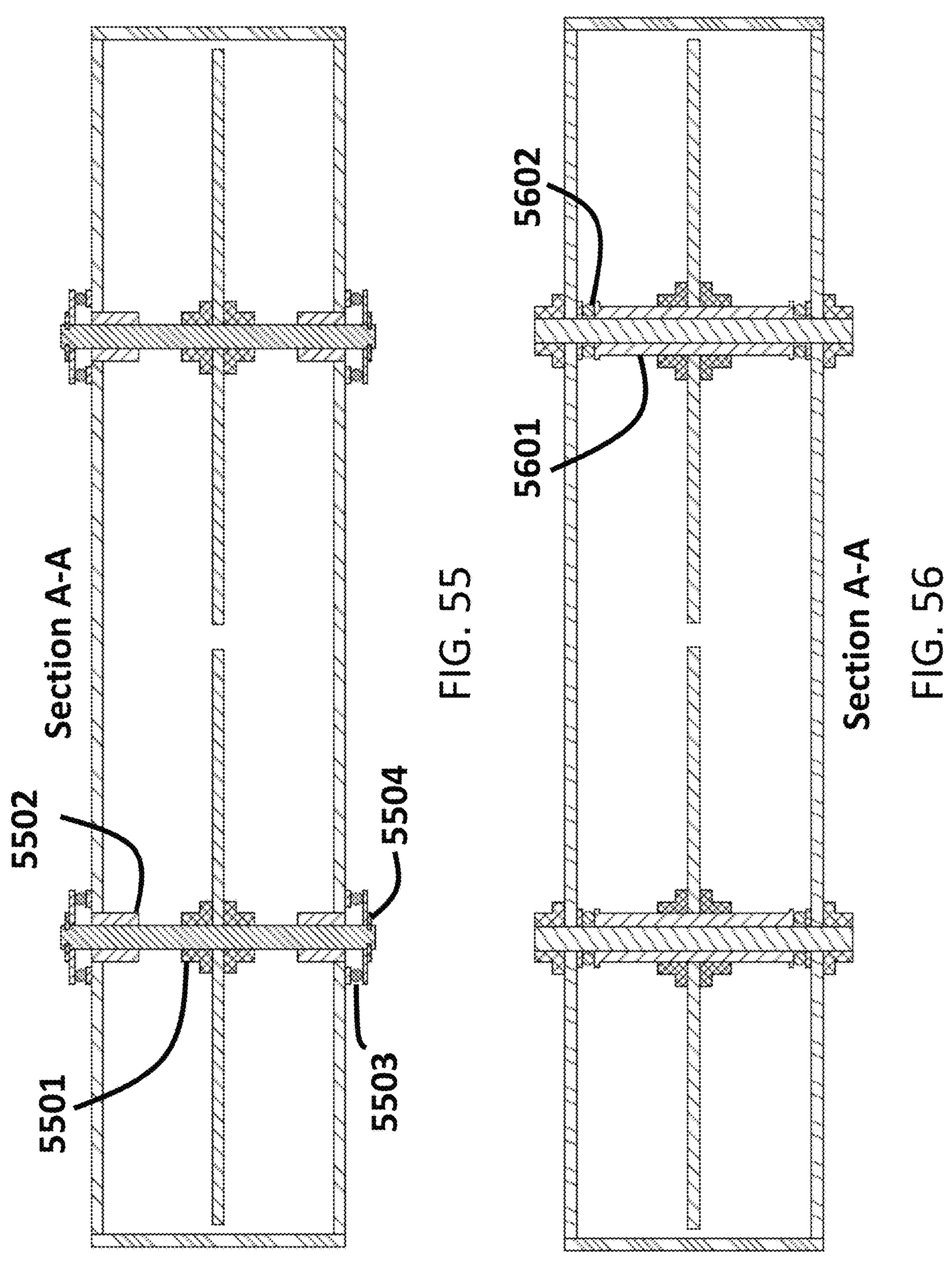
FIG. 55 is a section view of the alternate embodiment shown in FIG. 54 with rotors fixed to shaft and shaft sliding in bushing attached to top and bottom enclosure plates according to one embodiment of the present disclosure.
FIG. 56 is a section view of the alternate embodiment shown in FIG. 54 with rotors attached to bushings sliding around their shafts according to one embodiment of the present disclosure.

FIG. 53 shows the variation of force carried by rotor 1 in the X direction of FIG. 43 during a single revolution. FIG. 54 shows an alternate embodiment of that shown in FIG. 43. In FIG. 54 the embodiment is shown with ball bearings mounted on the top 5401 and bottom plates of the device enclosure. In this embodiment the shafts are fixed to each rotor. Each shaft and the inner bearing race will spin along with each rotor. The rotor loading will be carried by individual bearing balls. The bearing balls will transfer a frictional force to the outer bearing race that is fixed with respect to the top and bottom plates they are mounted each mounted to. The magnitude of the frictional force transferred will be Force_friction=$\mu_s$*Force_normal_$i$; for each bearing ball carry part of the rotor load and $\mu_s$ is the static coefficient of friction FIGS. 55-56 show a cross sectional view of embodiments identical to FIG. 54 except for how each rotor is attached to its shaft (magnets are not shown in these figures for clarity). In FIG. 55 the rotor is attached to its shaft with a flanged mounting collar 5501 and each shaft is held in place with a pair of bushings 5502 and a pair of thrust bearings 5503 and D-clips 5504. In FIG. 56 each rotor is attached to a bushing 5601 that is free to slide around its shaft. Each bushing rests on a pair of thrust bearings 5602.

Figures 57A, 57B:
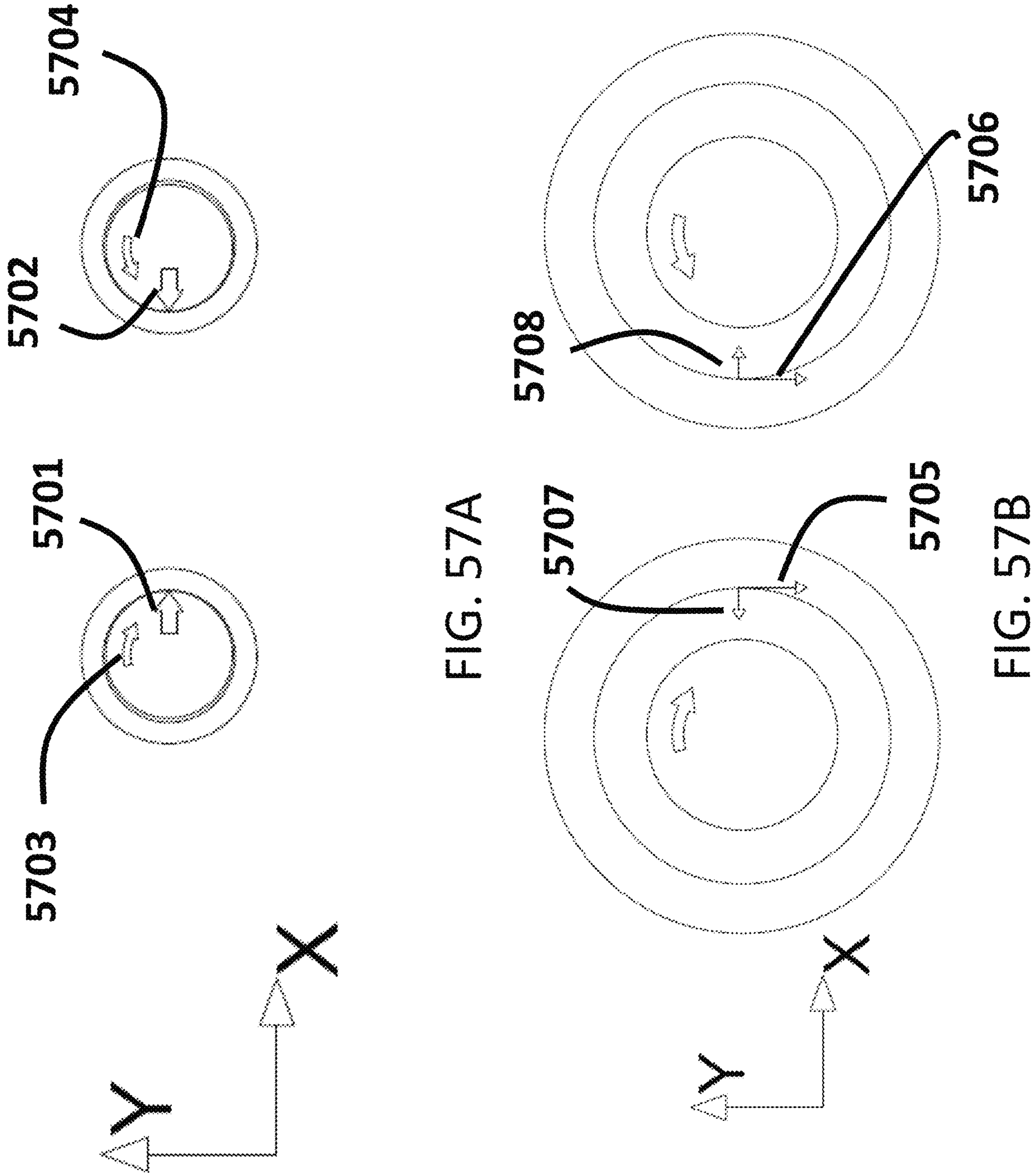
FIG. 57A is a free body diagram of bushing and shaft elements of embodiment shown in FIG. 55 according to one embodiment of the present disclosure.
FIG. 57B is a free body diagram of bushing and shaft elements of embodiment shown in FIG. 55 according to one embodiment of the present disclosure.

FIG. 57A shows the free body diagram for a rotating shaft mounted inside a bushing. The rotor load is shown as 5701 and 5702 and the rotor rotation is clockwise 5703 for rotor 1 and counterclockwise for rotor 2 5704. In this embodiment there will be a transfer of frictional forces transferred due to loads normal to each bushing's inner surface shown by arrows 5707 and 5708 to each shaft shown by arrows 5705 and 5706 in FIG. 57B. The magnitude per shaft will be Force_friction==$\mu_d$*Force_normal; $\mu_d$ is the dynamic coefficient of friction The direction of the frictional force will be in the −Y direction for both shafts. This friction as traction forces will add constructively and create thrust.

Figures 58A, 58B:
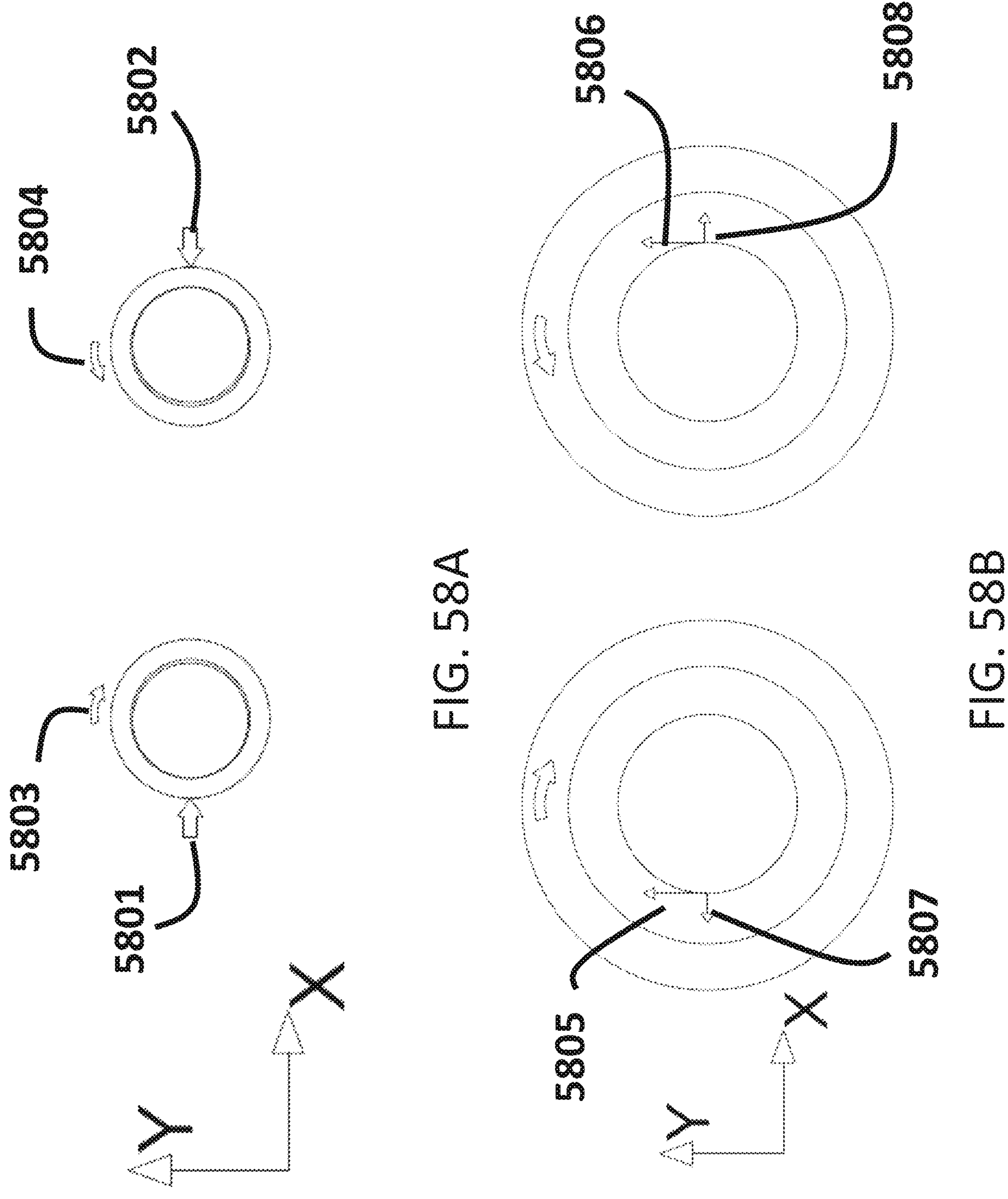
FIG. 58A is a free body diagram of bushing and shaft elements of embodiment shown in FIG. 56 according to one embodiment of the present disclosure.
FIG. 58B is a free body diagram of bushing and shaft elements of embodiment shown in FIG. 56 according to one embodiment of the present disclosure.

FIG. 58A shows the free body diagram for a rotating bushing sliding around its shaft. The rotor load is shown as 5801 and 5802 and the rotor rotation is clockwise 5803 for rotor 1 and counterclockwise for rotor 2 5804. In this embodiment there will be a transfer of frictional forces shown as 5805 and 5806 in FIG. 58B due to normal forces acting on the fixed shafts shown as 5807 and 5808. The magnitude per shaft will be as above, but now the it will act in the +Y direction. As before this effect will add constructively to create thrust.

Table 1, Table 2, and Table 3 summarize frictional effects a function of mounting type and rotor spinning direction for embodiments in which rotors attract one another during rotation.

Table 1 is a summary of Rotor 1 loading, spin direction, pinned joint style and thrust direction.

TABLE 1

| | Rotor 1 | Rotor 1 Shaft/Frame joint | | Rotor 1 Friction Mode and Direction | |
|---|---|---|---|---|---|
| Case | Spin Direction | Rotating Component | Fixed Component | Friction Mode | Direction of action |
| 1 | CW | Rotor/Outer Race of bearing | Shaft | Rolling bearing ball | −Y |
| 2 | CW | Shaft/inner race of bearing | Frame top and bottom plate | Rolling bearing ball | +Y |
| 3 | CW | Shaft | Sleeve | Slipping shaft | −Y |
| 4 | CW | Rotor Sleeve | Shaft | Slipping Sleeve | +Y |

Table 2 is a summary of Rotor 2 loading, spin direction, pinned joint style and thrust direction.

TABLE 2

| | Rotor 2 | Rotor 2 Shaft/Frame joint | | Rotor 2 Friction Mode and Direction | |
|---|---|---|---|---|---|
| Case | Spin Direction | Rotating Component | Fixed Component | Friction Mode | Direction of action |
| 1 | CCW | Rotor/Outer Race of bearing | Shaft | Rolling bearing ball | −Y |
| 2 | CCW | Shaft/inner race of bearing | Frame top and bottom plate | Rolling bearing ball | +Y |
| 3 | CCW | Shaft | Sleeve | Slipping shaft | −Y |
| 4 | CCW | Rotor Sleeve | Shaft | Slipping Sleeve | +Y |

Table 3 is a summary of Rotor 1 & 2 loading direction, spin direction, pinned joint style and thrust direction.

TABLE 3

| Case | Friction Mode | Rotor 1 Spin Direction | Rotor 1 Loading Direction | Rotor 2 Spin Direction | Rotor 2 Loading Direction | Thrust direction on Frame |
|---|---|---|---|---|---|---|
| 1 | Rolling bearing ball on inner race | CW | +X | CCW | −X | −Y |
| 2 | Rolling bearing ball on outer race | CW | | CCW | | +Y |
| 3 | Slipping shaft on sleeve | CW | | CCW | | −Y |
| 4 | Slipping Sleeve on shaft | CW | | CCW | | +Y |

TABLE 3-continued

| Case | Friction Mode | Rotor 1 Spin Direction | Rotor 1 Loading Direction | Rotor 2 Spin Direction | Rotor 2 Loading Direction | Thrust direction on Frame |
|---|---|---|---|---|---|---|
| 5 | Rolling bearing ball on inner race | CCW | | CW | | +Y |
| 6 | Rolling bearing ball on outer race | CCW | | CW | | −Y |
| 7 | Slipping shaft on sleeve | CCW | | CW | | +Y |
| 8 | Slipping Sleeve on shaft | CCW | | CW | | −Y |

Ring Rotor with Rigid Rotor Configuration

Figure 59:
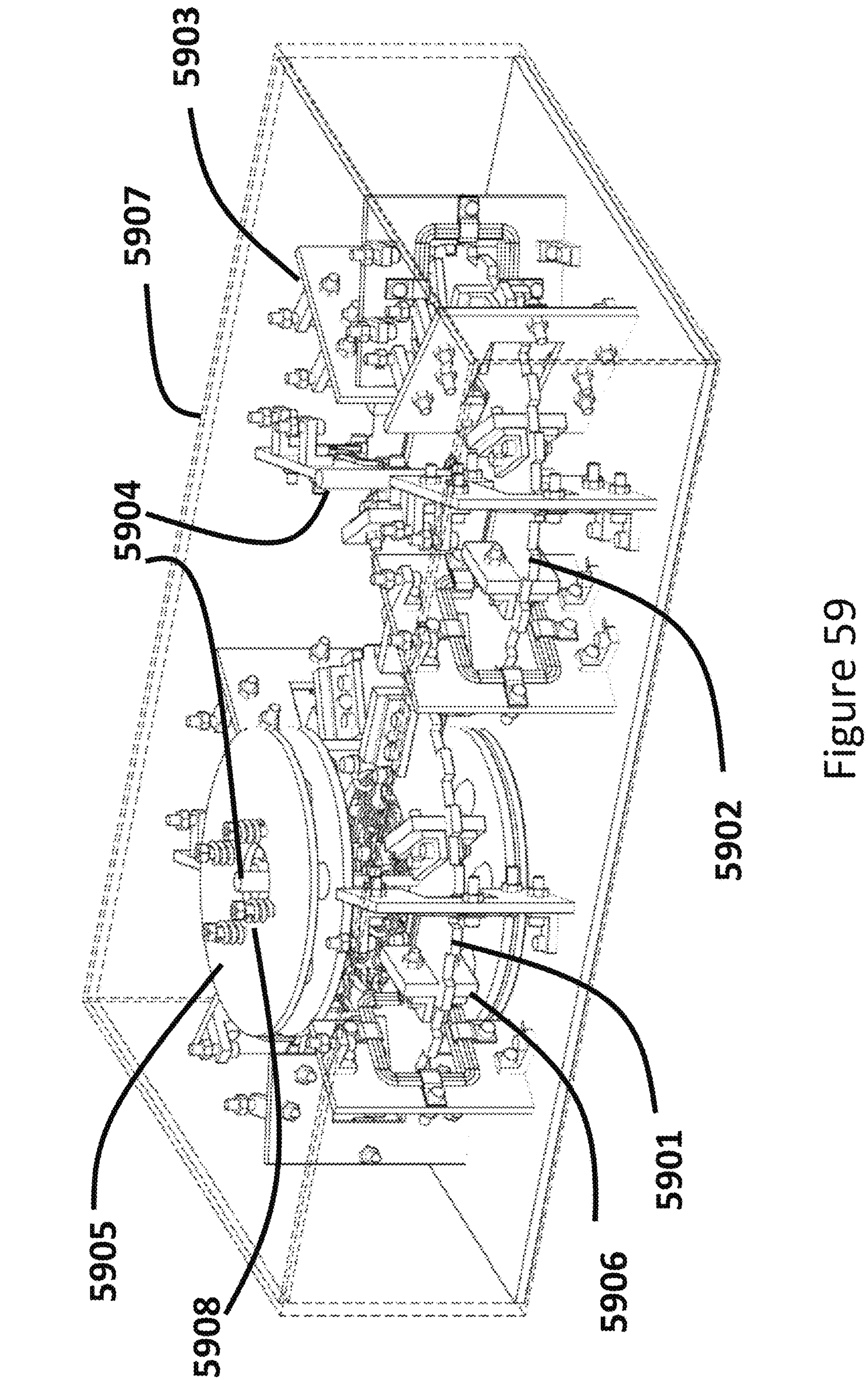
FIG. 59 is an isometric view of an alternate embodiment of a ring rotor with rigid rotor according to one embodiment of the present disclosure.

FIG. 59 shows an iso view of a ring rotor 5901 coupled with a rigid rotor 5902 assembly 5900. Both rotors have permanent magnets 5906 mounted along their perimeters. In this embodiment their magnet poles are oriented transversely. The ring rotor 5901 is connected to a shaft 5904 through a set of tethers that may be chain elements, carbon fiber or wire braid which are in turn joined to a central hub with a bearing. The ring rotor also has a pair of thrust bearings attached to it. The thrust bearings sit on a pair of plates 5905. The plates 5905 are mounted to the top and bottom of an enclosure 5907 with bolts and spring elements 5908. These spring elements 5908 ensure contact between the thrust bearing rolling elements when in zero gravity environments while also minimizing stress during launch. A set of electro-magnetic coils and support plates 5903 surround each rotor.

Figure 64:
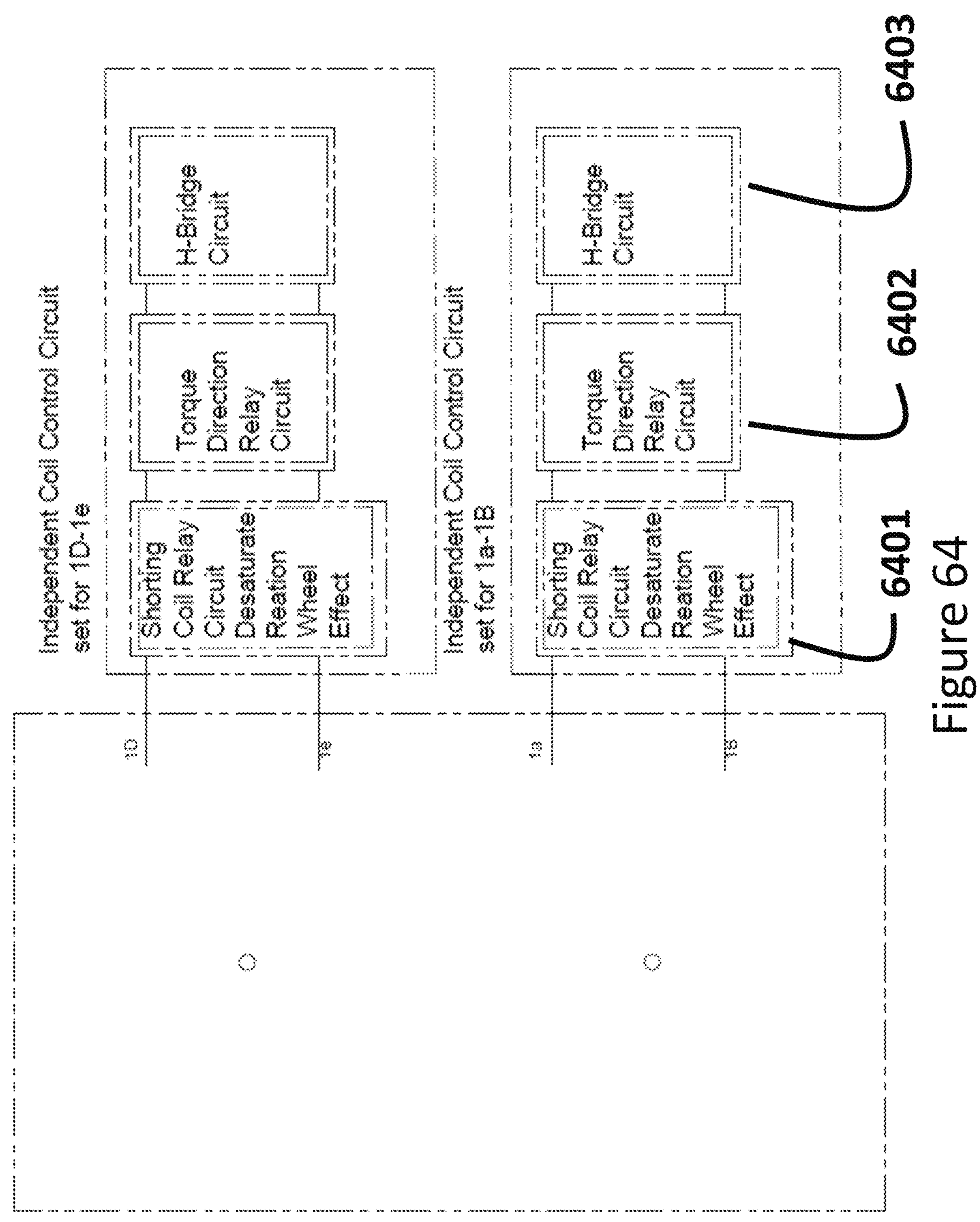
FIG. 64 is a circuit schematic illustrating independent elements of ring rotor with rigid rotor electromagnetic coils commutator control according to one embodiment of the present disclosure.

In addition to generating thrust, embodiments described herein can also be used as a reaction wheel to generate torque on a vehicle. By wiring each rotors' electromagnetic coils to an independent control circuit saturation may be prevented. When power is switched off, the rotors will de-spin due to elastic strain losses in each set of bearings due to the compression loads they are carrying. Each set of rotor coils may be connected in series or parallel which in turn may be connected to the circuit elements shown in FIG. 64. First circuit control element 6401 is a relay that will short the rotor coils together to create reactionary torque which will prevent saturation and enhance a desired torque action. One embodiment of this circuit 1100 is seen in FIG. 11. The next circuit element 6402 is a relay that allows the leads to be reversed providing rotational directional control of each rotor. One embodiment of this circuit 1000 is shown in FIG. 10. The last element of control 6403 is an H-bridge circuit that works in conjunction with an optical or magnet position sensor to switch the direction of current flow through the coils to create and maintain rotation of each rotor. One embodiment of this circuit 900 is shown in FIG. 9.

Figure 60:
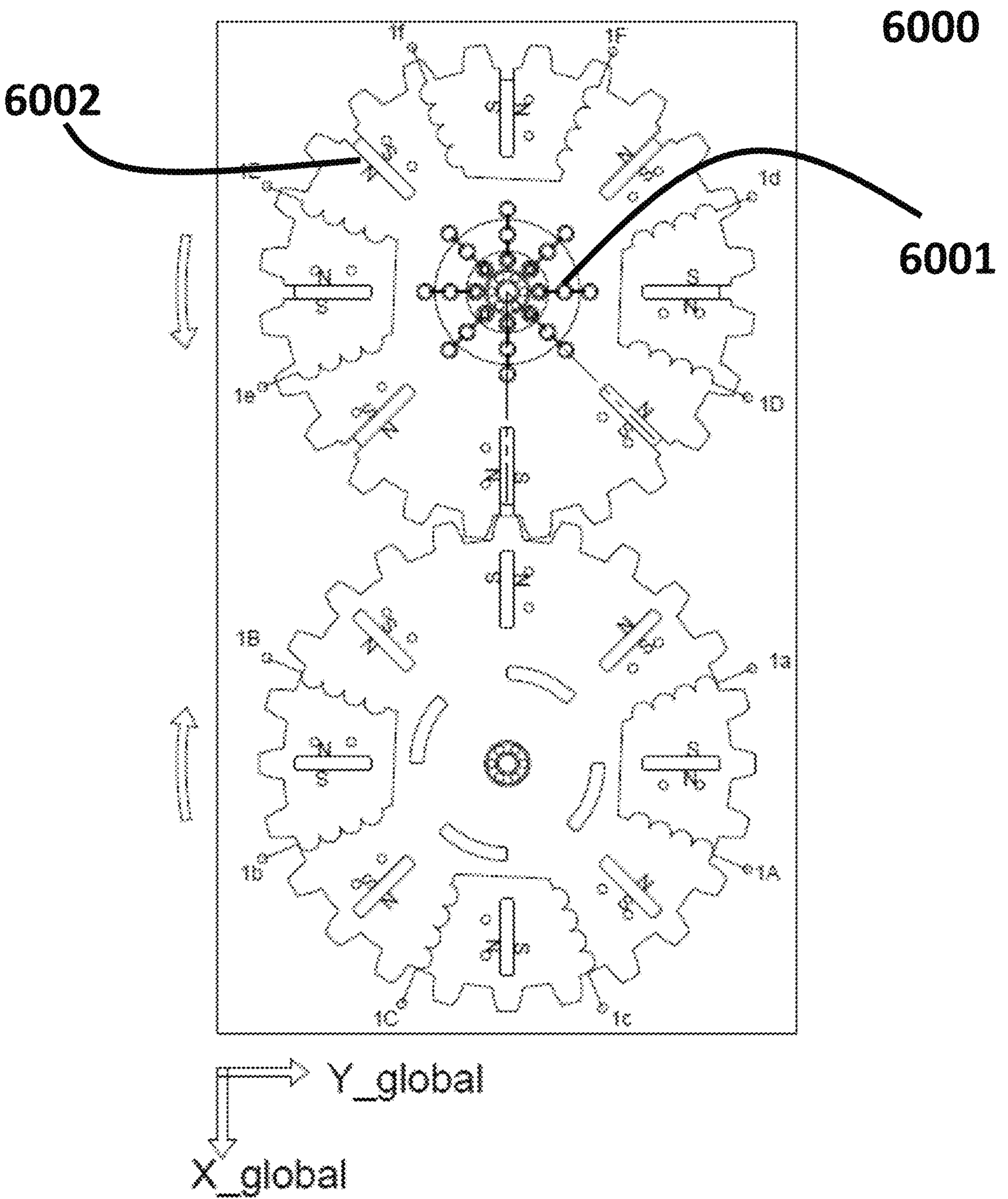
FIG. 60 is a top view schematic of a ring rotor with rigid rotor embodiment according to one embodiment of the present disclosure.

FIG. 60 shows a top schematic view of the Rigid Rotor with Ring Rotor assembly 6000. The schematic illustrates how the ring rotor in this embodiment has an equivalent number of tethers 6001 and magnets 6002 and that they are mounted in alignment. This view also illustrates the permanent magnet pole orientation and that in this embodiment there will be attraction between the rotors.

Figures 61A, 61B:
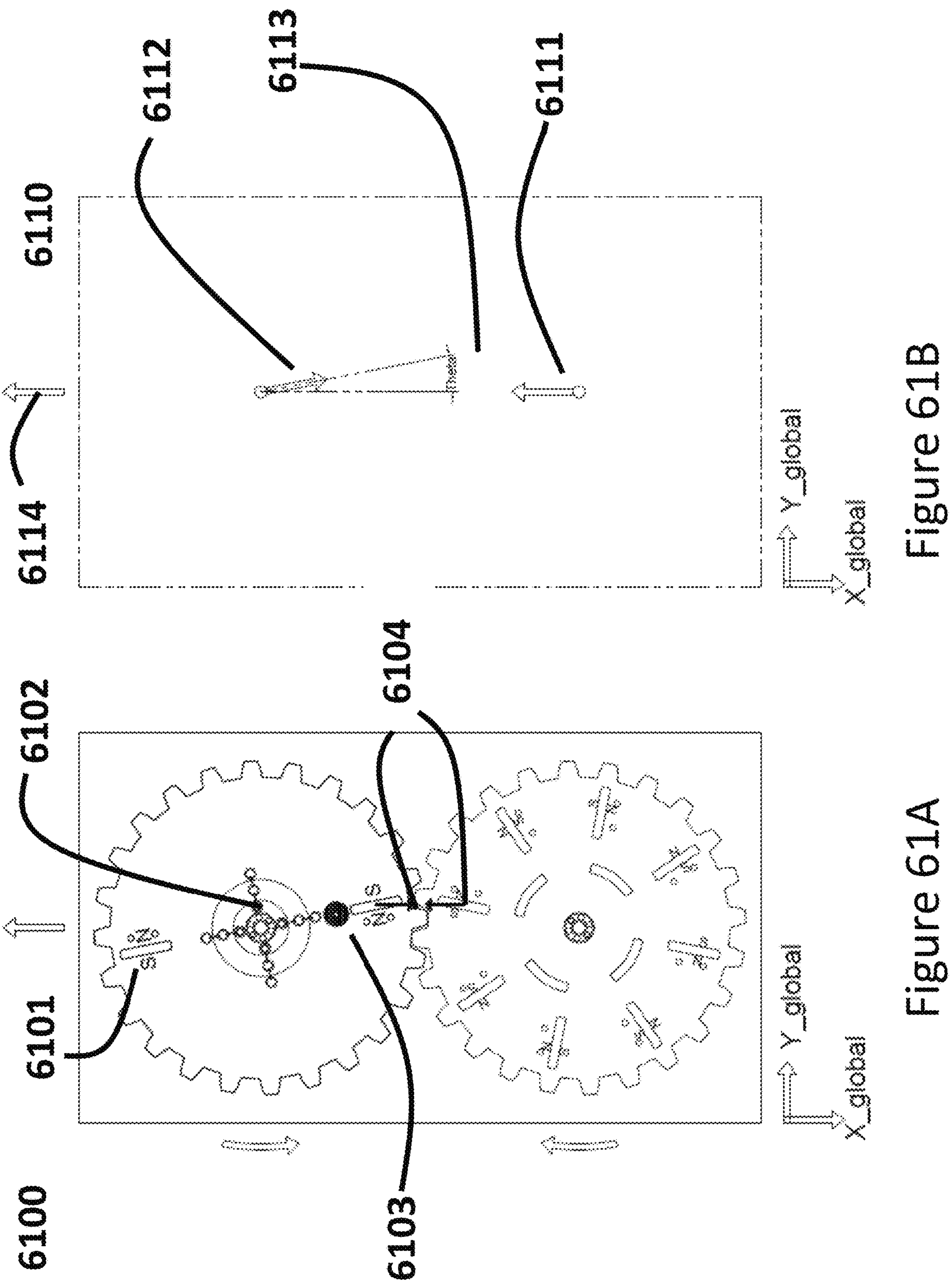
FIG. 61A is top view schematic of a ring rotor with rigid rotor embodiment illustrating two magnets on ring rotor and eight magnets on rigid rotor in alignment according to one embodiment of the present disclosure.
FIG. 61B is a free body diagram of the embodiment shown in FIG. 61A according to one embodiment of the present disclosure.

FIG. 61A shows a top view schematic of a ring rotor with rigid rotor in embodiment 6100 in which there are only two magnets 6101 mounted on the ring rotor while there are eight magnets mounted on the rigid rotor. It also shows that are four tethers 6102 on the ring rotor that are evenly space and have two are aligned with the perimeter magnets.

FIG. 61B shows a free body diagram of the ring rotor with rigid rotor embodiment 6110 shown in FIG. 61A. Arrows 6104 are shown to illustrate the direction in which the attractive forces between the rotor magnets act. These forces are seen as a load 6111 which is transferred to the rigid rotor shaft in the x direction with magnitude Fb. The magnet force of attraction is transferred to the ring rotor shaft as load 6112 through tension in the tether. This tension has magnitude Fb*cos (theta) where theta 6113 is a reference angle one of the aligned tethers makes with the x-axis. The tension acts in line with the tether as it swings around the shaft creating a variable load in the x-direction of Fb*cos^2(theta) and Fb*cos(theta)*sin(theta) in the y-direction. The net force 6114 acting in the x-direction on the enclosure and the body it is attached to is $$Fb\_net = Fb - Fb*\cos\hat{}2(\text{theta}) = Fb*\sin\hat{}2(\text{theta}) \text{ in } x\text{-direction}$$

For the orientation shown in FIG. 61A the thrust is in the −x direction.

Also shown in FIG. 61A is an optional mass 6103 which may be fixed to the rotor with a bolt or adhesive. This mass can be seen as a point mass which will create an unbalanced centripetal force as the ring rotor spins. The magnitude of this force is F_centripetal=mass*velocity^2/radius. The point mass centripetal force will also act through a tether on the ring rotor shaft and it will create loads in the x and y directions which can be described as $$\text{Centripetal force acting in } x\text{-direction} = F\_\text{centripetal}*\cos(\text{theta}) = \text{mass}*vel\hat{}2*\cos(\text{theta})/\text{radius}$$

$$\text{Centripetal force acting in } y\text{-direction} = F\_\text{centripetal}*\sin(\text{theta}) = \text{mass}*vel\hat{}2*\sin(\text{theta})/\text{radius}$$

For the orientation shown in FIG. 61A we expect the thrust to be in the −x direction when $$Fb\_\text{net} > F\_\text{centripetal}*\cos(\text{theta})$$

And we expect the thrust to be in the +x direction when $$F\_\text{centripetal}*\cos(\text{theta}) > Fb\_\text{net}$$

Figures 62A, 62B:
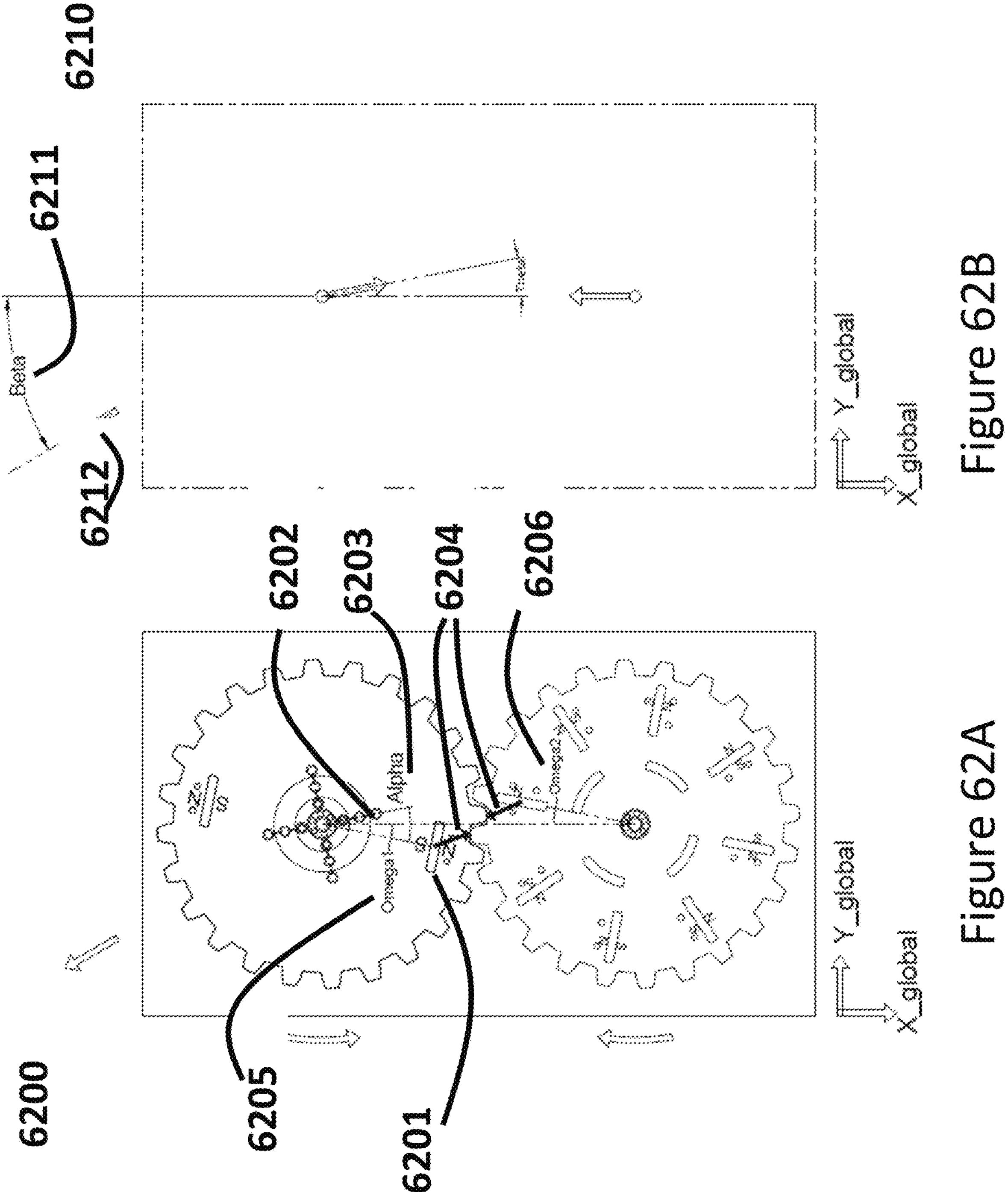
FIG. 62A is a top view schematic of a ring rotor with rigid rotor embodiment illustrating two magnets on ring rotor and eight magnets on rigid rotor with offset alignment between ring and rigid rotors, and offset between ring rotor magnets and ring rotor tethers according to one embodiment of the present disclosure.

FIG. 62A shows a schematic top view of another ring rotor with rigid rotor embodiment 6200 in which the magnets on the ring rotor poles are not oriented or aligned with the rigid rotor pair. The offset between the ring rotor magnets and the rigid rotor magnets can be described by two angles omega1 6205, the angle between a reference ring rotor magnet and the x-axis and omega2 6206, the angle between a reference rigid rotor magnet and the x-axis. The ring rotor magnets are also not aligned with the tethers. The offset between a reference tether 6202 and a reference magnet 6201 can be described by a reference angle alpha 6203. Arrow 6204 illustrate the force acting in between a ring rotor magnet and rigid rotor magnet for reference.

FIG. 62B shows a free body diagram 6210 for the embodiment shown in FIG. 62A. In this configuration the component force in the y direction may not cancel and the Fb_net 6212 or thrust may be in a direction not aligned with either the x or y axis and can be characterized with the angle beta 6211.

Figure 63:
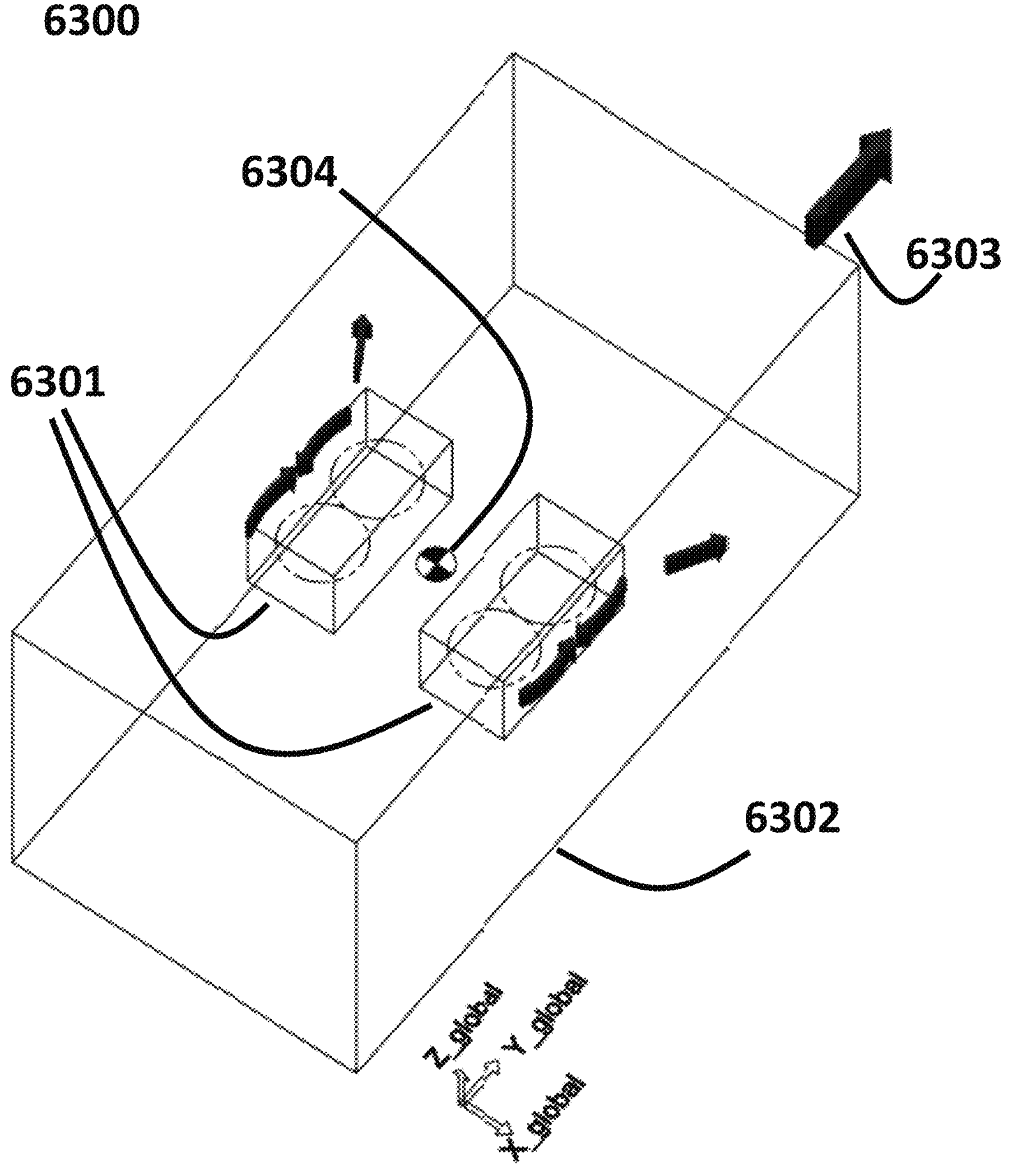
FIG. 63 is an isometric view of a system configuration with two ring rotor rigid rotor embodiments inside a satellite vehicle according to one embodiment of the present disclosure.

For a ring rotor with rigid rotor embodiments at least a pair of units 6301 would need to be used in a vehicle to cancel unwanted torques and generate thrust 6303. A possible system level arrangement 6300 is seen in FIG. 63. A satellite vehicle 6302 is shown for reference along with its center of mass 6304.

What is claimed is:

1. A propulsion assembly comprising:
a housing;
a first central shaft mounted to the housing;
a first ring rotor;
a first central hub rotatably mounted on the central shaft;
a plurality of tethers positioned between the central hub and the first ring rotor such that the first ring rotor is mounted to the central hub with the plurality of tethers;
a drive mechanism mounted on the housing, the drive mechanism positioned to impart a force on a portion of the first ring rotor;
wherein a thrust is imparted on the housing by the first ring rotor through unbalanced centripetal forces transmitted through one or more of the plurality of tethers, the first ring rotor rotating at a substantially constant radius from the central hub via the tethers, wherein a direction of thrust corresponds to a location on the first ring rotor on which the drive mechanism imparts a force.

2. The propulsion system of claim 1, further comprising:
one or more permanent magnets mounted around the first ring rotor;
the drive mechanism comprising a plurality of electromagnetic coils mounted to the housing and located around the first ring rotor, each of the electromagnetic coils in electronic communication with a coil control element;
wherein the thrust is imparted on the housing by the first ring rotor through one or more of the plurality of tethers when one of the plurality of electromagnetic coils is activated by the coil control element.

3. The propulsion system of claim 1, wherein the plurality of tethers are formed of a pliant material that carries a load in tension.

4. The propulsion system of claim 1, further comprising:
a second central shaft mounted to the housing;
a second ring rotor;
a second central hub rotatably mounted on the central shaft;
a plurality of tethers positioned between the second central hub and the second ring rotor such that the first ring rotor is mounted to the central hub with the plurality of tethers;
one or more driving gears located between the first ring rotor and the second ring rotor and mechanically synchronizing the first ring rotor and the second ring rotor.

5. The propulsion system of claim 4, further comprising:
a first permanent magnet assembly on the first ring rotor, the first permanent magnet assembly having a central ferrous material, a north facing pole magnet on a first side of the central ferrous material, and a south facing pole on a second side of the central ferrous material;
a second permanent magnet assembly on the second ring rotor, the second permanent magnet assembly having one of a north facing pole magnet on a first side of a central ferrous material and a north facing pole magnet on a second side of the central ferrous material;
wherein thrust is generated in a desired direction based on interaction of the first magnet assembly on the first ring rotor and the second magnet assembly on the second ring rotor, the thrust imparted through the plurality of tethers between the first ring rotor and the first central shaft and the second ring rotor and the second shaft.

6. The propulsion system of claim 1:
the drive mechanism comprising a rigid second rotor rotabably mounted to a second central shaft attached the housing, the second rotor including one or more magnets located towards an edge of the second ring rotor;
one or more permanent magnet assemblies mounted on the first ring rotor towards an edge of the first ring rotor;
wherein thrust is generated by interaction of the one or more magnets of the second rotor with the one or more permanent magnet assemblies mounted on the first ring rotor.

7. The propulsion system of claim 6, wherein the one or more magnets of the second rotor comprises electromagnets, the electromagnets in electronic communication with an electromagnet control element.

8. The propulsion system of claim 1:
the drive mechanism comprising a second rigid rotor rotatably mounted to a second central shaft attached on the housing, the second rigid rotor including one or more magnets located towards an edge of the second rigid rotor;
one or more permanent magnet assemblies mounted on the first ring rotor towards an edge of the first ring rotor;
at least one mass mounted on the first ring rotor towards an edge of the first ring rotor; the at least one mass acting against a net attractive force between the one or more magnets of the second rigid rotor and the one or more permanent magnet assemblies of the first ring rotor;
wherein thrust is generated by a difference between the centripetal force of the mass mounted on the first ring rotor acting against a net attractive force between the one or more magnets of the second rigid rotor and the one or more permanent magnet assemblies of the first ring rotor.

9. A spacecraft comprising:
a first propulsion assembly, the first propulsion assembly having
a first ring rotor rotatably mounted on a shaft, the first ring rotor comprising one or more tethers located between the first ring rotor and a mount of the first ring rotor to the shaft;
a drive mechanism proximate the first ring rotor, the drive mechanism positioned to impart a force on a portion of the first ring rotor;
wherein a thrust is imparted on the spacecraft by the first ring rotor through unbalanced centripetal forces transmitted through one or more of the plurality of tethers, the first ring rotor rotating at a substantially constant radius from the shaft via the tethers, wherein a direction of thrust corresponds to a location on the first ring rotor on which the drive mechanism imparts a force.

10. The spacecraft of claim 9, further comprising:
a second propulsion assembly, the second propulsion assembly having
a first ring rotor rotatably mounted on a shaft, the first ring rotor comprising one or more tethers located between the first ring rotor and a mount of the first ring rotor to the shaft;
a drive mechanism proximate the first ring rotor, the drive mechanism positioned to impart a force on a portion of the first ring rotor.

* * * * *